Oct. 4, 1966
A. M. SQUIRES
3,276,203
TOP HEAT POWER CYCLE
Filed Jan. 15, 1964
23 Sheets-Sheet 1
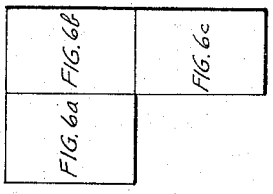
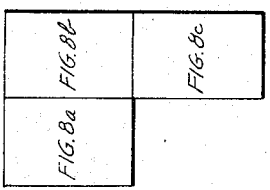
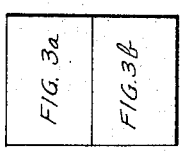
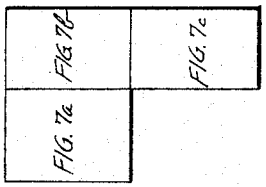
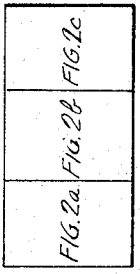
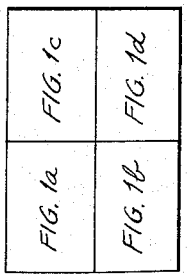
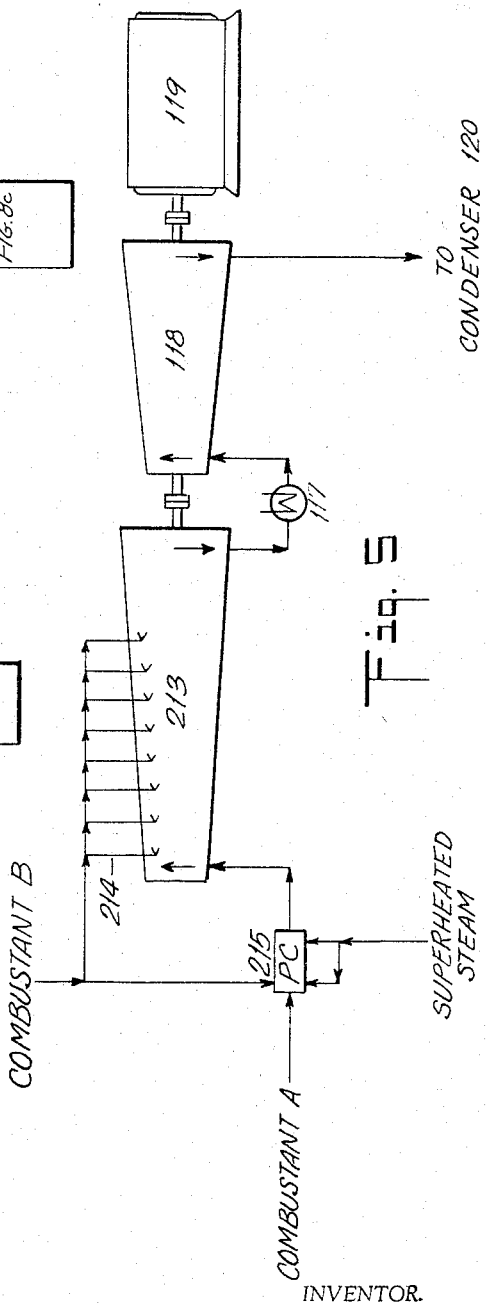
INVENTOR.
ARTHUR M. SQUIRES
BY
ATTORNEY

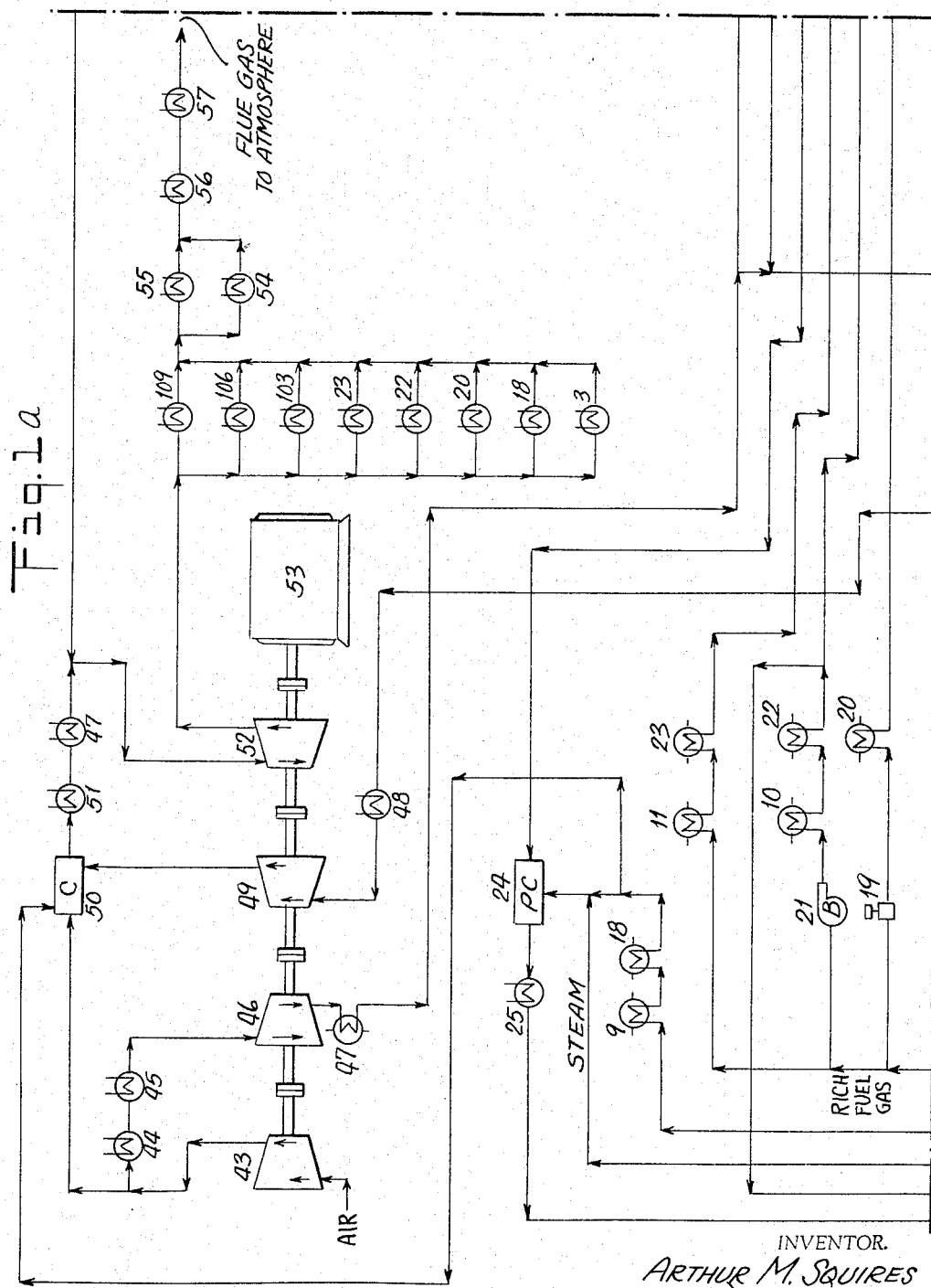

Oct. 4, 1966  A. M. SQUIRES  3,276,203
TOP HEAT POWER CYCLE
Filed Jan. 15, 1964  23 Sheets-Sheet 3
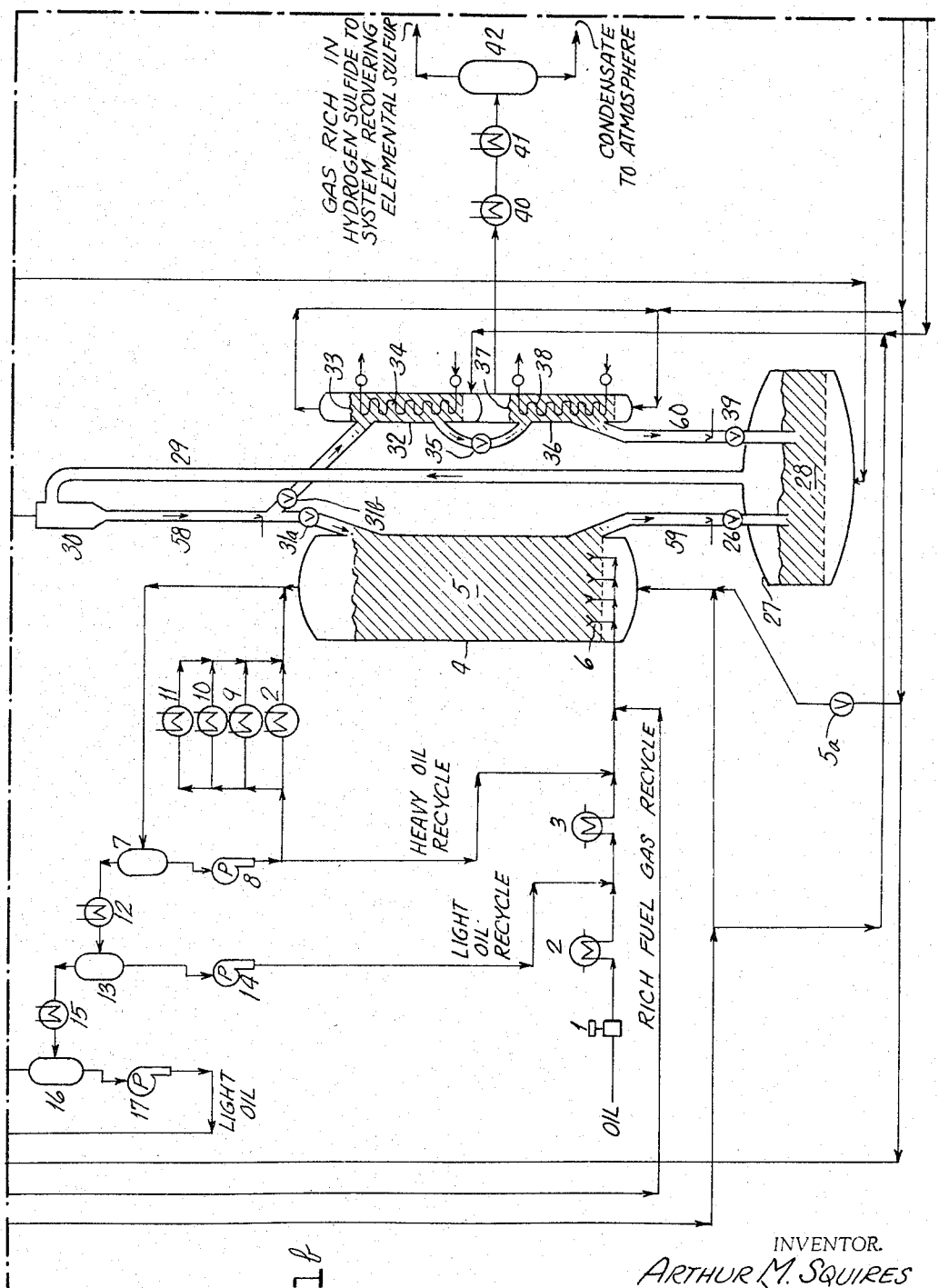
Fig. 1f
INVENTOR.
ARTHUR M. SQUIRES
BY
ATTORNEY

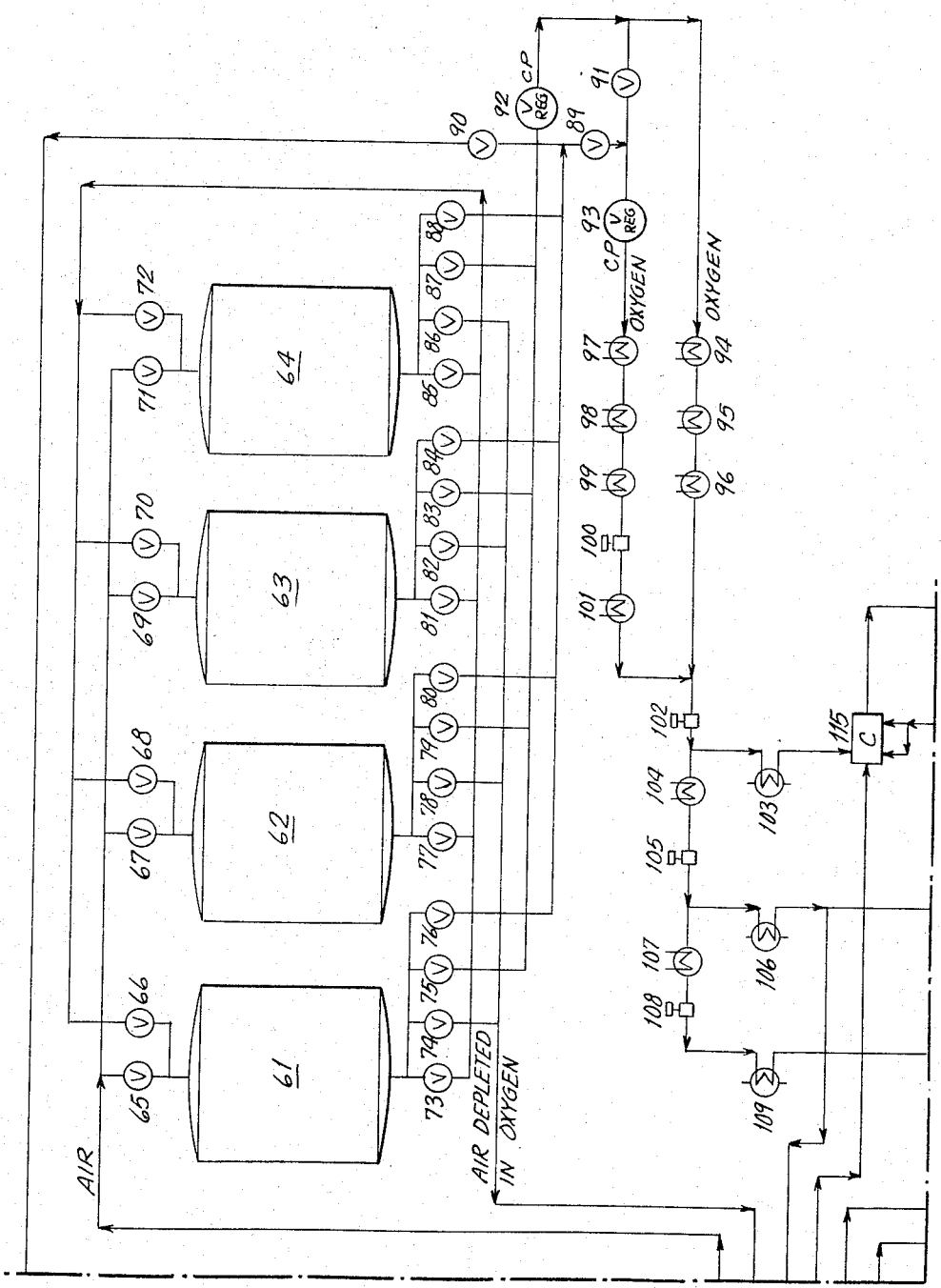

Oct. 4, 1966    A. M. SQUIRES    3,276,203
TOP HEAT POWER CYCLE
Filed Jan. 15, 1964    23 Sheets-Sheet 5

INVENTOR.
ARTHUR M. SQUIRES
BY
ATTORNEY

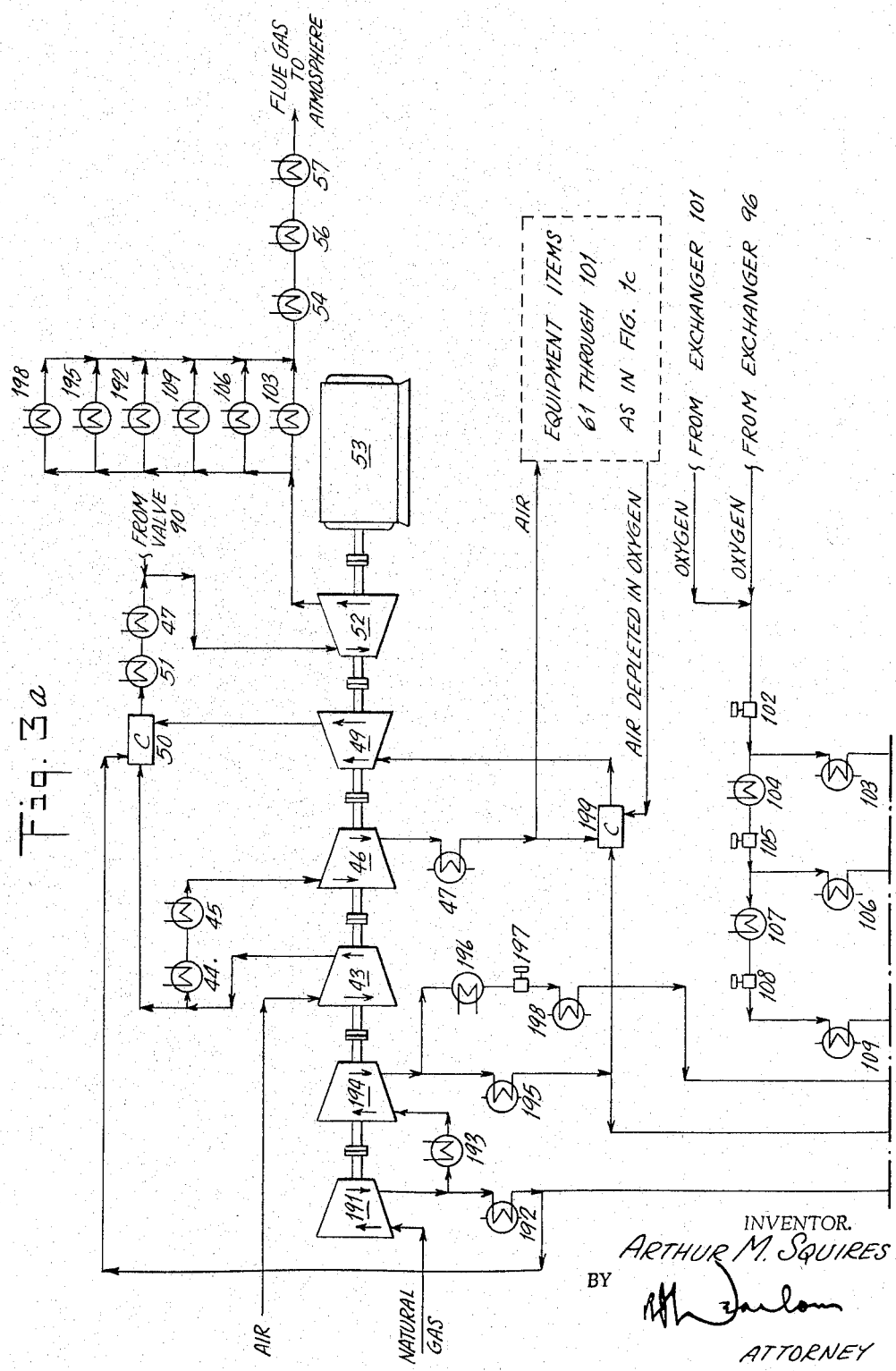

Oct. 4, 1966  A. M. SQUIRES  3,276,203
TOP HEAT POWER CYCLE
Filed Jan. 15, 1964  23 Sheets-Sheet 11

INVENTOR.
ARTHUR M. SQUIRES
BY
ATTORNEY

Oct. 4, 1966

A. M. SQUIRES 3,276,203

TOP HEAT POWER CYCLE

Filed Jan. 15, 1964

INVENTOR.
ARTHUR M. SQUIRES
BY
ATTORNEY

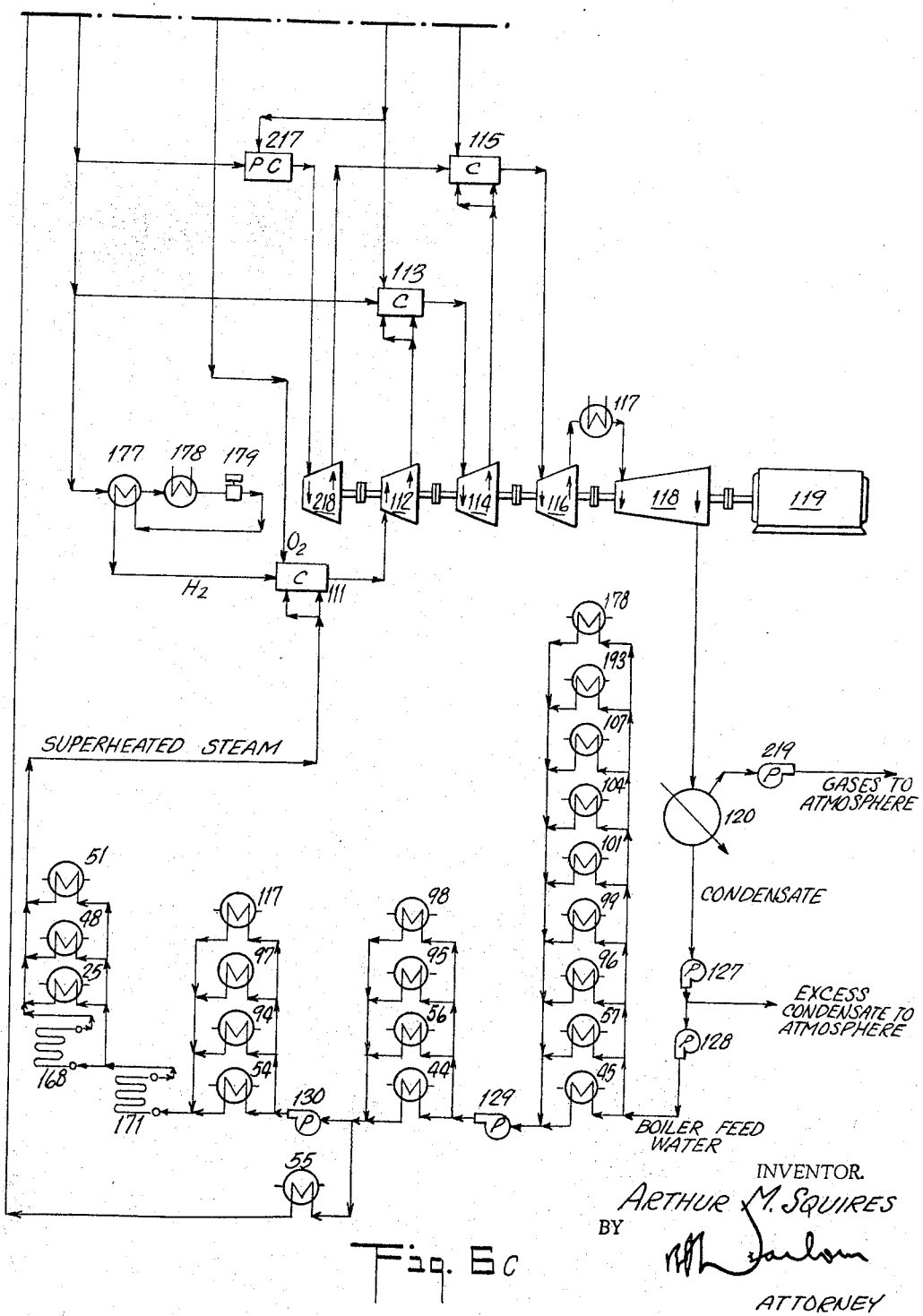

Oct. 4, 1966  A. M. SQUIRES  3,276,203
TOP HEAT POWER CYCLE
Filed Jan. 15, 1964  23 Sheets-Sheet 15
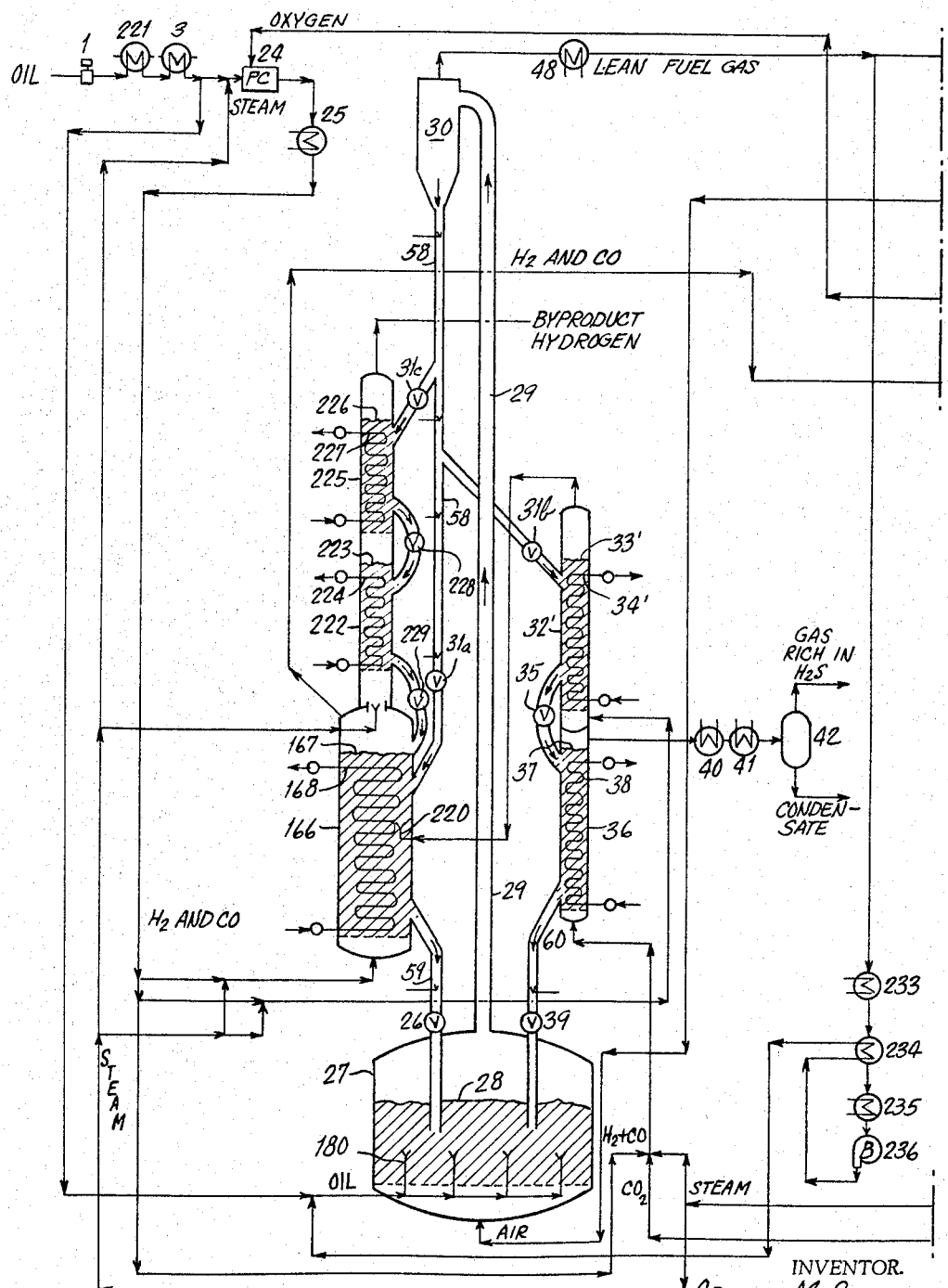
Fig. 7a
INVENTOR.
ARTHUR M. SQUIRES
BY
ATTORNEY Oct. 4, 1966          A. M. SQUIRES            3,276,203
                    TOP HEAT POWER CYCLE
Filed Jan. 15, 1964                      23 Sheets-Sheet 16

INVENTOR.
ARTHUR M. SQUIRES
BY
ATTORNEY

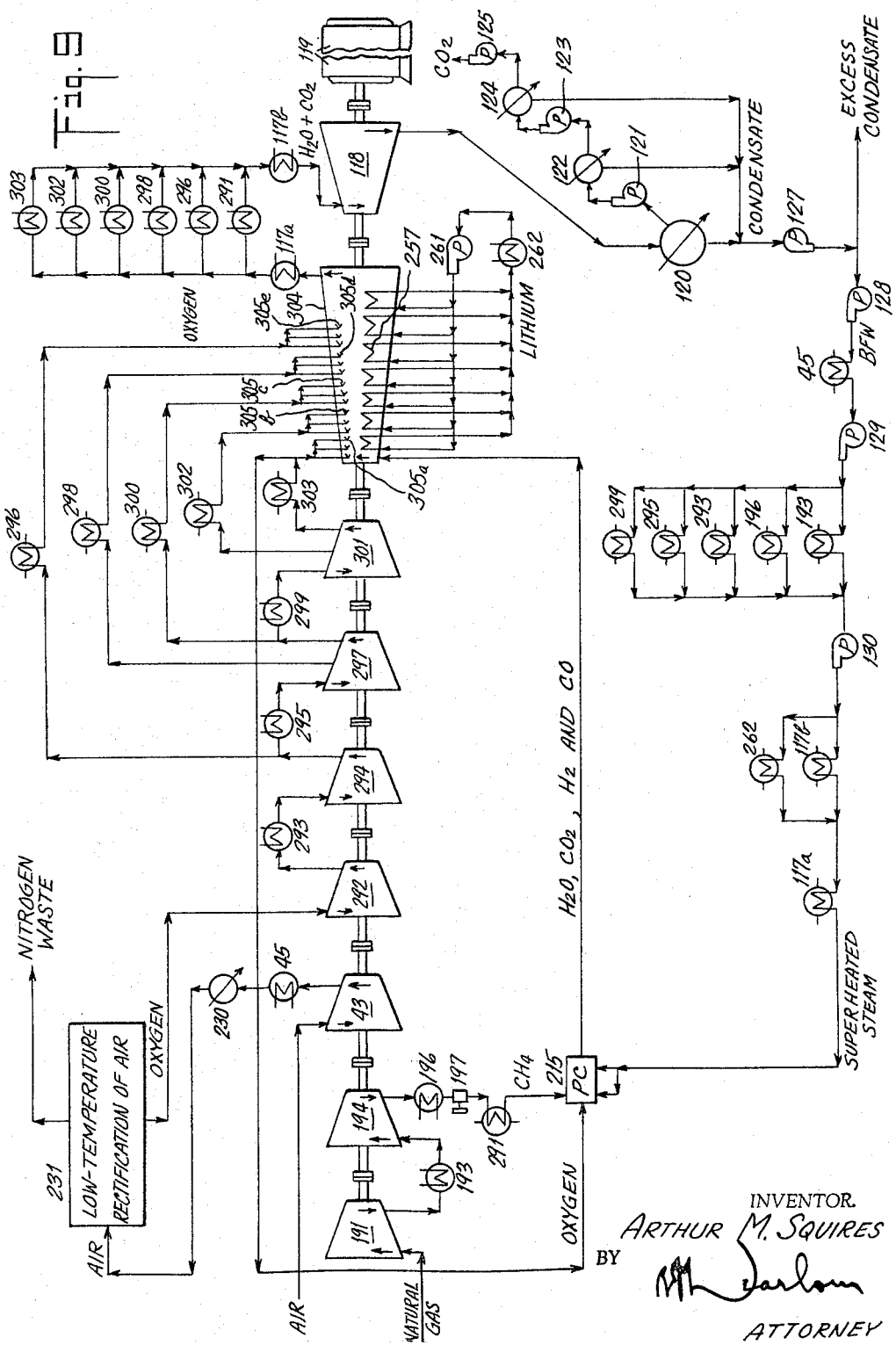

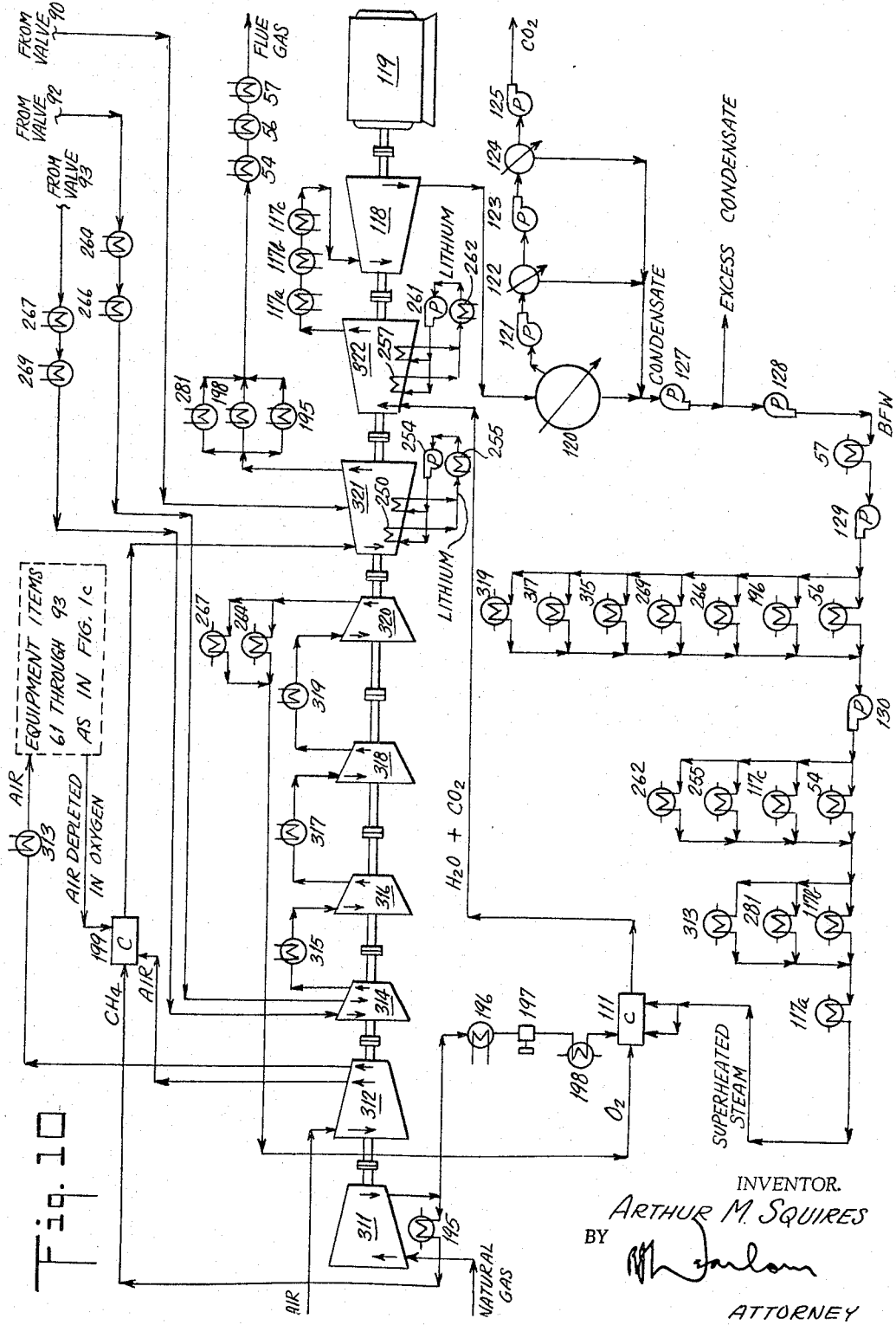

Oct. 4, 1966  A. M. SQUIRES  3,276,203
TOP HEAT POWER CYCLE
Filed Jan. 15, 1964  23 Sheets-Sheet 23
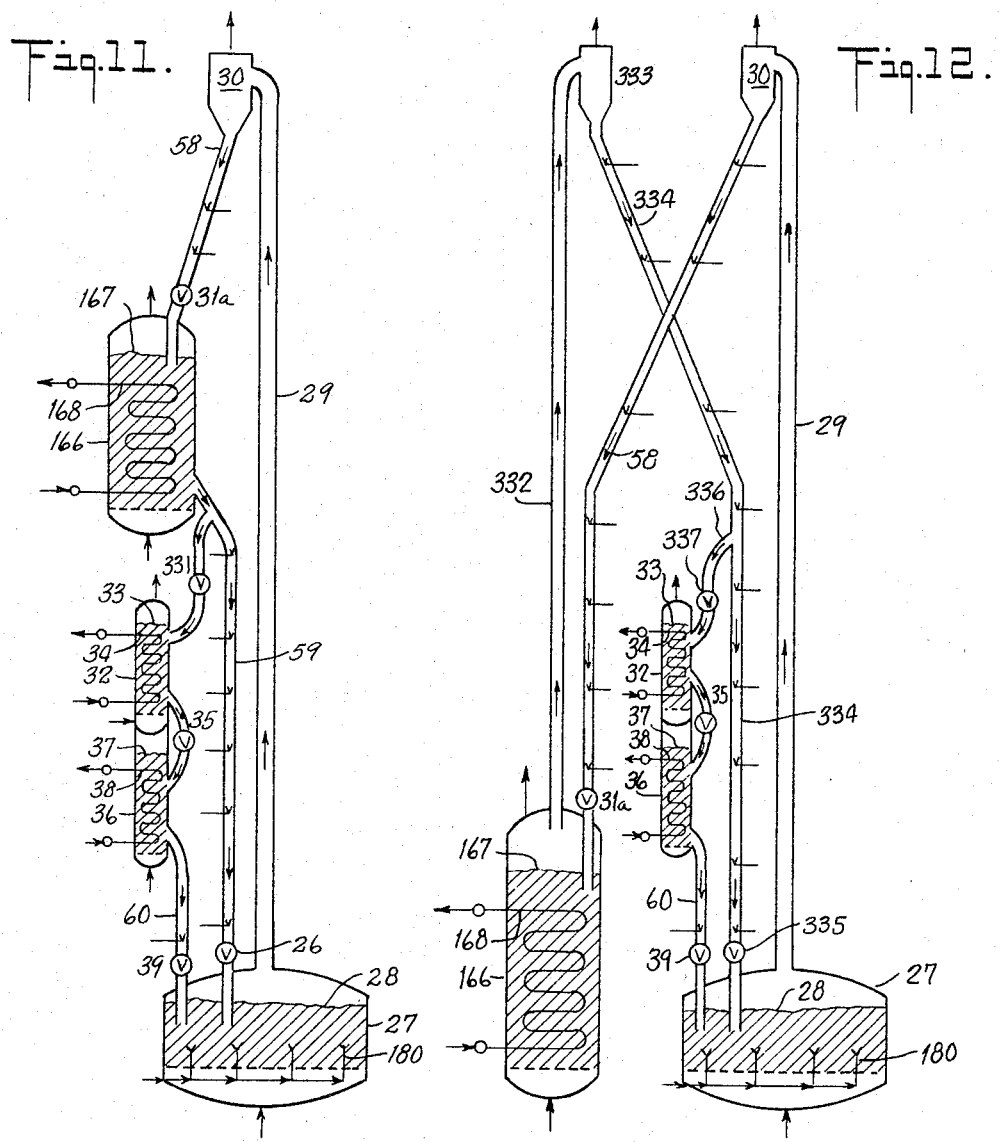
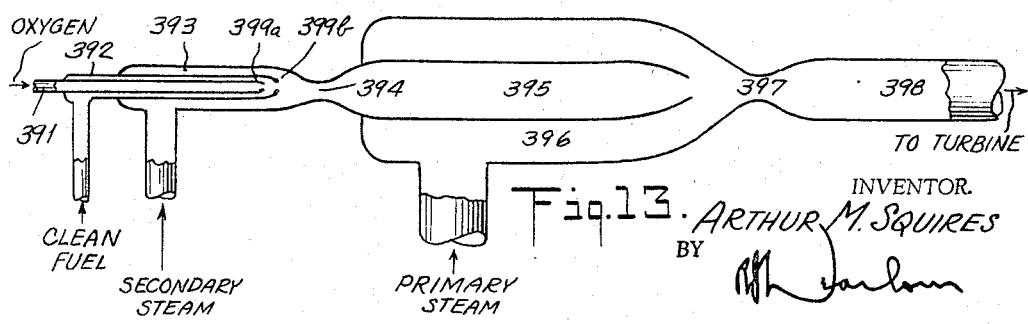
INVENTOR.
ARTHUR M. SQUIRES
BY
ATTORNEY across solid-flow-regulating valve 31a. Additional heat may be supplied by adding a small amount of steam to the fluidizing gas to reactor 4 by opening control valve 5a, thereby increasing Reaction 2. This may be preferred as a means of fine control over the temperature in reactor 4.

Vapor effluent from reactor 4, at about 550 p.s.i.a., is quenched to about 700° F. by the addition of a heavy recycled oil from pump 8 at about 600° F. The resulting oil-vapor mixture is separated in drum 7. Heavy oil is pumped from drum 7 by pump 8. A minor portion of this heavy recycled oil is added to the fresh oil. A major portion is cooled to about 600° F. in heat-exchangers 2 (against oil feed), 9 (against light oil), and 10 and 11 (against rich fuel gas) and is used to quench reactor 4 vapor effluent.

Vapor from drum 7 is cooled in heat-exchanger 12 (against BFW). Light oil, to be recycled, is separated from vapor in drum 13, is pumped by pump 14, and blended with fresh oil feed to reactor 4. Drum 13 operates between about 300° F. and 600° F., and preferably at about 450° F.

Vapor from drum 13 is cooled to about 125° F. in heat-exchanger 15 (against BFW). Light hydrocarbon liquid is separated from vapor in drum 16. This light oil is pumped to about 650° p.s.i.a. in pump 17, and is heated to about 700° F. in heat-exchangers 9 and 18 (against heavy oil recycle and flue gas respectively). A minor portion of the light oil is sent to combustor 50. A major portion is blended with steam and reacted with oxygen in partial combustor 24. The quantity of oxygen is adjusted so that the final reaction temperature of combustion products leaving partial combustor 24 is about 2600° F. Contact time in partial combustor 24 is about 3 seconds based on products. Products of combustion consist primarily of hydrogen and carbon monoxide, with lesser amounts of water vapor and carbon dioxide. Partial combustor 24 is operated at a discharge pressure of about 600 p.s.i.a. Effluent from partial combustor 24 is cooled to about 1200° F. in heat-exchanger 25 (against steam). A major portion of this gas is sent to reactor 4, where it serves as the fluidizing gas, and a minor portion is added to carbon dioxide which serves as fluidizing gas to reactor 32.

Vapor from drum 16 consists of a rich fuel gas containing hydrogen, carbon monoxide, methane, and higher light gaseous hydrocarbons. A portion of the rich fuel gas is compressed by compressor 19 to between about 1500 and about 6000 p.s.i.a., is heated to about 700° F. in heat-exchanger 20 (against flue gas), and is committed to combustor 111. A second portion is compressed by blower 21 to about 600 p.s.i.a., is heated to about 700° F. in heat-exchangers 10 and 22 (against heavy oil recycle and flue gas respectively), and is then partly used at combustor 113 and partly admixed with oil feed to reactor 4. A third portion of the rich fuel gas is heated to about 700° F. in heat-exchangers 11 and 23 (against heavy oil recycle and flue gas respectively), and is sent to combustor 115.

Solid from reactor 4 consists of the species CaO·MgO, CaS·MgO and $CaCO_3$·MgO, together with coke. This solid leaves reactor 4 via aerated standpipe 59, and enters fluidized-bed 28 housed in reactor 27 across solid-flow-regulating valve 26. Pressure of gaseous effluent from reactor 27 is a few p.s.i. higher than pressure of gaseous effluent from reactor 4. The "hydraulic" head exerted by fluidized solid in reactor 4 and in standpipe 59 provides the pressure differential necessary to cause solid to flow from reactor 4 into reactor 27.

Fluidizing gas to reactor 27 is air depleted in oxygen, the effluent from one of the four oxygen absorber-desorbers 61, 62, 63 or 64, to which a relatively small amount of air has been added.

Partial combustion of coke occurs in fluidized-bed reactor 27, which preferably operates at about 1750° F. and at an outlet pressure a few p.s.i. above about 550 p.s.i.a.

Carbon dioxide is expelled from the solid in reactor 27, and solid effluent from this reactor consists primarily of the species CaO·MgO and CaS·MgO. The total quantity of oxygen available to fluidized-bed reactor 27 is adjusted so that it is insufficient for complete combustion of the coke. Accordingly, a portion of the coke is gasified by reaction with carbon dioxide and water vapor, to form carbon monoxide and hydrogen. These gases are present in effluent from reactor 27 in an amount sufficient to prevent oxidation of CaS to $CaSO_3$. Hydrogen sulfide is formed during the partial combustion of coke, and this material largely reacts with CaO·MgO according to Reaction 1. Hence, gaseous effluent from reactor 27 contains only a small amount of hydrogen sulfide. This gaseous effluent constitutes a lean fuel gas.

Gaseous effluent from reactor 27 carries along with it solid entrained from fluidized-bed 28. The stream of solid-laden gas moves upward through riser 29 into cyclone-separator 30, which substantially separates solid from gas. Solid from cyclone-separator 30 passes downward through aerated standpipe 58. A major portion of the solid flows across solid-flow-regulating valve 31a into reactor 4, and a minor portion of solid flows across solid-flow-regulating valve 31b into reactor 32. Cyclone-separator 30 operates at substantially the same pressure as effluent from both reactors 4 and 32. The "hydraulic" head exerted by fluidized solid in aerated standpipe 58 provides the pressure differential necessary to cause solid to flow from cyclone-separator 30 into reactors 4 and 32.

Gaseous effluent from cyclone-separator 30 still contains some particulate matter, which I prefer to remove by use of the apparatus and method described in my co-pending application Serial No. 230,822, filed October 16, 1962. This apparatus is well suited to remove dust from gases at elevated temperatures, and it may be used to advantage at other points in the embodiment of FIG. 1, as well as in the embodiments of the other figures where dust must be taken out of a gas stream.

Well-known means of removing dust from gases may be desirable. For example, lean fuel gas from cyclone-separator 30 could be cooled by self-heat-exchange and by heat-exchange against BFW to a temperature, say about 300° F., at which the gas could be scrubbed by a non-aqueous scrubbing liquid, such as hydrocarbon oil. Following the oil-scrubbing step, the lean fuel gas would be reheated by self-heat-exchange. Alternatively, electrostatic precipitation or filtration through cloth bags could be considered for final removal of dust from the cooled lean fuel gas.

Gaseous effluent from cyclone-separator 30 is cooled to about 1600° F. in heat-exchanger 48 (against steam) and sent to expansion turbine 49.

Reactor 32 houses fluidized-bed 33 within which is placed heat-transfer surface 34. Fluidizing gas to reactor 32 consists primarily of carbon dioxide, and contains relatively small amounts of hydrogen and carbon monoxide. Reactor 32 operates at about 1050° F. and at an outlet pressure of about 550 p.s.i.a. Carbon dioxide reacts in reactor 32 with CaO·MgO in the solid to form

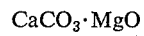

$$CaCO_3 \cdot MgO$$

Heat evolved by the reaction and heat from the cooling of solid entering reactor 32 is removed (to BFW) across heat-transfer surface 34 in bed 33.

Solid flows from reactor 32 across solid-flow-regulating valve 35 into fluidized-bed 37 housed in reactor 36. Heat-transfer surface 38 is placed within fluidized-bed 37. Gaseous effluent from reactor 32 is still predominantly carbon dioxide. It is combined with steam, and the steam-gas mixture is introduced into reactor 36. Carbon monoxide or hydrogen shall be present in the steam-gas mixture in an amount sufficient to prevent the oxidation of calcium sulfide CaS to calcium sulfite $CaSO_3$ within reactor 36. Reactor 36 operates at about 1050° F. and at an outlet pressure of about 540 p.s.i.a. Carbon dioxide and steam react with solid in reactor 36 to displace hydrogen sulfide, thus:

$$H_2O + CO_2 + CaS \cdot MgO = H_2S + CaCO_3 \cdot MgO \quad (3)$$

Gaseous effluent from reactor 36 contains a high proportion of hydrogen sulfide. Heat evolved by the foregoing Reaction 3 in reactor 36 is removed (to BFW) across heat-transfer surface 38.

Gaseous effluent from reactor 36 is cooled in heat-exchangers 40 and 41 (against BFW). Water condenses from the effluent in heat exchanger 41, and is separated from gas in drum 42. Condensate is sent to the atmosphere, and a gas rich in hydrogen sulfide is sent to a known system for recovery of elemental sulfur (e.g., a Claus system).

Purpose of reactor 32 is to contact solid with a high partial pressure of carbon dioxide in a gas stream in which the steam partial pressure is relatively small. This contact step serves to convert all reactive values of $CaO \cdot MgO$ to $CaCO_3 \cdot MgO$. In the absence of this contact step prior to reactor 36, calcium hydroxide would form under the conditions of reactor 36, and decrepitation of the solids would occur.

There is advantage in operating reactor 36 at as low a temperature as possible without causing Reaction 3 to proceed so slowly that reactor 36 must be unduly large in size. Good results are achieved at 1050° F., and it is my experience that the reaction proceeds rapidly at this temperature. However, it may be possible to specify a somewhat lower temperature for reactor 36.

Solid from reactor 36 consists almost entirely of the species $CaS \cdot MgO$ and $CaO_3 \cdot MgO$. This solid leaves reactor 36 via aerated standpipe 60 and enters reactor 27 across solid-flow-regulating valve 39. The "hydraulic" head exerted by fluidized solid in reactor 36 and in standpipe 60 provides the pressure differential necessary to cause solid to flow from reactor 36 into reactor 27.

Air is compressed to about 90 p.s.i.a. in compressor 43. A minor portion of air is sent to combustor 50, while a major portion is cooled in heat-exchanges 44 and 45 (against BFW) to between about 150° and about 300° F. and preferably to about 200° F. This major portion of air is further compressed in compressor 46 to about 580 p.s.i.a. Air from compressor 46 is heated in heat-exchanger 47 (against flue gas) to a temperature to be specified below, and a major portion is sent to one of the four oxygen absorber-desorbers 61, 62, 63 and 64, while a minor portion is added to air depleted in oxygen, to constitute the fluidizing gas to reactor 27.

Lean fuel gas from heat-exchanger 48 is expanded from about 550 p.s.i.a. to about 90 p.s.i.a. in expansion turbine 49. Combustor 50 operates at about 90 p.s.i.a. and handles a portion of light oil from oil-vapor-separating drum 16, air from compressor 43, and lean fuel gas from expansion turbine 49. Flue gas from combustor 50 is cooled in heat-exchangers 51 and 47 to about 1600° F. (against steam and air respectively), and is expanded to a little above atmospheric pressure in expansion turbine 52. Flue gas is cooled first in heat-exchangers 3 (against oil), 18 (against light oil), 20, 22 and 23 (against rich fuel gas) and 103, 106 and 109 (against oxygen); next, in heat-exchangers 54 and 55 (against BFW); then, in heat-exchanger 56 (against BFW); and finally, in heat-exchanger 57 (against BFW) to about 150° to 200° F. From heat-exchanger 57 flue gas is exhausted to the atmosphere.

The flue gas exhausted to the atmosphere will be free of dust and will contain only the order of one percent of the sulfur originally present in fuel oil charged to the cycle.

Expansion turbines 49 and 52 develop power which is transmitted along a shaft, in part to drive air compressors 43 and 46, and in part to generate electricity in generator 53.

Oxygen-absorption-desorption vessels 61, 62, 63 and 64 are filled with a solid packing which consists of coarsely porous tabular alumina, having a particle size of about one-quarter inch, and having manganic oxide deposited within the pores of the alumina. I will discuss the performance of oxygen-absorption-desorption vessels 61 through 64 with respect to the behavior of manganic oxide and the product of its reaction with oxygen, manganese dioxide, when these two species have free energies and other thermodynamic properties obtained from modern tables of thermochemical data. Attention is directed, however, to the variety of forms in which manganese dioxide can be produced, having a range of free energy and hence a range of decomposition pressure to yield oxygen at any given temperature. For example, manganese dioxide in a fine state of subdivision has an appreciably higher decomposition pressure at a given temperature than the bulk, crystalline solid. Accordingly, the preferred operating temperature levels of vessels 61 through 64 depend upon the exact form of manganic oxide supplied to these vessels. From the standpoint of the utility of these vessels to my cycle, wide latitude is permissible in their operating temperature levels.

Oxygen-absorption-desorption vessels 61 through 64 operate cyclically, each vessel playing each of four roles in turn. I will describe operation during the phase of the cycle in which vessel 61 receives high-pressure air from heat-exchanger 47; and in which vessel 62 desorbs oxygen at an intermediate pressure, higher than about 37 p.s.i.a.; and in which vessel 63 desorbs oxygen at a low pressure, higher than about 16 p.s.i.a.; and in which vessel 64 acts as a "guard," receiving air depleted in oxygen from vessel 61, and delivering this gas to reactor 27. I will then describe the sequence of changes in the positions of valves 65 through 91 in order to establish the next phase of the cycle.

Heated, high-pressure air from exchanger 47 enters absorption vessel 61 through open valve 65. Valve 66 is closed. Air depleted in oxygen leaves vessel 61 through open valve 73. Valves 74, 75, and 76 are closed. If air has been compressed to about 580 p.s.i.a. by compressors 43 and 46, the temperature in absorption vessel 61 rises to about 1050° F. before absorption of oxygen ceases, if the active absorbing material in vessel 61 is manganic oxide. The temperature 1050° F. is approximately the temperature at which manganese dioxide exerts a decomposition pressure of oxygen equal to the partial pressure of oxygen in air at 580 p.s.i.a.

Absorbent in vessel 61 is heated to about 1050° F. in a wave starting at the inlet end of the absorbent bed and moving toward the outlet. So long as the outlet is at a temperature lower than this, air depleted in oxygen flows from valve 73 into vessel 64 through open valve 72. Valve 71 is closed. During most of this phase of the cycle, no absorption of oxygen and no rise in temperature occurs within vessel 64. Air depleted in oxygen flows out of vessel 64 through open valve 86 and passes to reactor 27. Valves 85, 87, and 88 are closed.

Vessel 62 is desorbing oxygen at a pressure higher than about 37 p.s.i.a. Temperature of absorbent in vessel 62 is dropping during this phase of the cycle, reaching a temperature of about 980° F. at the end of the phase, by which time the pressure in vessel 62 has fallen to about 37 p.s.i.a. Oxygen leaves vessel 62 through open valve 79. Valves 67, 68, 77, 78 and 80 are closed. Oxygen from valve 79 passes through regulating valve 92, which maintains a constant pressure of about 37 p.s.i.a. on the downstream side of valve 92.

Vessel 63 is desorbing oxygen at a pressure higher than about 16 p.s.i.a. Temperature of absorbent in vessel 63 is dropping during this phase of the cycle, reaching a temperature of about 930° F. at the end of the phase, by which time the pressure in vessel 63 has fallen to about 16 p.s.i.a. Oxygen leaves vessel 63 through open valve 84. Valves 69, 70, 81, 82, and 83 are closed. Oxygen from valve 84 passes through open valve 89 and through regulattemperature at the inlet of the flue gas expansion turbine, and it is subsequently expanded through this turbine to the atmosphere along with other flue gases.

Heat of the reaction between oxygen and manganic oxide, which is exothermic, raises the temperature of the absorbent bed, until the temperature becomes so high that the reaction no longer occurs. At this time, air is withdrawn from the absorbent, and oxygen is allowed to desorb at a lower pressure. Heat required to sustain the oxygen-desorption reaction is provided by cooling of the absorbent bed. No steam is used to aid the desorption. Desorption continues until the bed temperature becomes so low that no more oxygen desorbs at the desired pressure level. At this time, compressed air is again introduced into the absorbent bed, and the cycle is repeated.

My technique of removing sulfur from fuel gases involves use of a solid which is the product of the calcination of naturally-occurring dolomite at a temperature below about 1,900° F., or an artificially-made equivalent of this solid. Dolomite is the double carbonate of calcium and magnesium. Although calcium is usually present in naturally-occurring dolomite in somewhat greater amount than magnesium, on an atomic basis, dolomite may be expressed for convenience by the chemical formula $CaCO_3 \cdot MgCO_3$. Its calcination product may be expressed by $CaO \cdot MgO$. The reaction of this product with hydrogen sulfide is known:

$$H_2S + CaO \cdot MgO = H_2O + CaS \cdot MgO \quad (1)$$

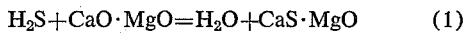

Calcined dolomite also has the power to desulfurize a wide range of organic sulfur compounds. Its use has often been proposed for the desulfurization of fuel gases or other gas mixtures. Until now, the solid resulting from use of calcined dolomite for gas desulfurization had to be discarded, since no way was known to recover sulfur from this solid and at the same time to restore the solid to the original form, expressed here by $CaO \cdot MgO$. In other words, calcined dolomite could not be used cyclically for the desulfurization of gases or vapors.

Another known reaction of calcined dolomite is the following:

$$H_2O + CO + CaO \cdot MgO = H_2 + CaCO_3 \cdot MgO \quad (2)$$

A proposal has been made to use this reaction at atmospheric pressure for the manufacture of hydrogen by passing steam, hydrogen, and carbon monoxide through a fixed bed of calcined dolomite. The operating temperature, according to this old proposal, would preferably be about 950° F., but the heat evolved from Reaction 2 would cause the bed temperature to rise. From time to time, according to this old proposal, the flow of steam, hydrogen, and carbon monoxide must be interrupted; the bed steamed out; a flow of cooling air passed through the bed in order to lower its temperature to the desired operating level; the bed again steamed out; and the flow of steam, hydrogen, and carbon monoxide resumed. When the active solid is substantially all converted to $CaCO_3 \cdot MgO$, the stream of hydrogen and carbon monoxide would be withdrawn, and the bed would be calcined by combustion of a fuel gas with air in sufficient excess to hold the calcination temperature below about 1,900° F. According to this old proposal, neither the crude hydrogen and carbon monoxide under treatment nor the fuel gas used in the calcination step could contain any substantial amount of sulfur. Any sulfur in either gas would mainly end up in calcium sulfate, $CaSO_4$, formed during the calcination step. The usefulness of the active solid for carrying out Reaction 2 would gradually be destroyed, and after a time it would have to be discarded. In practice, the process of this old proposal was to be conducted with gases containing less than about 50 parts per million (p.p.m.) of sulfur.

According to my invention, I prefer to conduct the foregoing Reactions 1 and 2 in a fluidized bed at elevated pressure and at temperatures appreciably higher than 950° F. I use heat-transfer surface housed within the fluidized bed to remove reaction heat, which I employ to raise or to superheat steam for my power cycle. By Reaction 1 I am able to obtain a substantially sulfur-free rich fuel gas for combustion with oxygen ahead of my steam-and-carbon-dioxide turbines. If the sulfurous fuel to be treated by Reaction 1 contains carbon monoxide, Reaction 2 affords the opportunity to convert at least part of the carbon monoxide to hydrogen, thereby reducing the quantity of carbon dioxide which must be compressed to the atmosphere from the condenser. (Some carbon dioxide is needed, for a reason which will be hereinafter explained.) If a relatively "low" turbine-inlet temperature is used, say around 1450° F. to 1500° F., I now believe that it is advantageous to convert some carbon monoxide to hydrogen. At a relatively "low" turbine-inlet temperature, then, I believe that it is advantageous to add steam ahead of the contact step between sulfurous rich fuel gas and calcined dolomite. At higher turbine-inlet temperatures, the advantage of converting carbon monoxide to hydrogen decreases and finally disappears, and no steam should be added ahead of this step.

I continuously remove a stream of partially spent solid from the rich-fuel-gas-treating fluidized bed, and transfer this stream to a calcination step conducted at substantially the same elevated pressure. Here, fuel is burned with an amount of air which is insufficient for complete combustion. Gaseous effluent from the calcination step is a lean fuel gas, and accordingly, the conversion of calcium sulfide to calcium sulfite (and, a fortiori, to calcium sulfate) is avoided. Solid effluent from the calcination step comprises a mixture of $CaS \cdot MgO$ and $CaO \cdot MgO$. The major portion of this solid is returned to the rich-fuel-gas-treating fluidized bed.

A minor portion is sent in a continuous flow to a fluidized bed in which sulfur is desorbed from $CaS \cdot MgO$ by its reaction with steam and carbon dioxide at high pressure and high temperature, thus:

$$H_2O + CO_2 + CaS \cdot MgO = H_2S + CaCO_3 \cdot MgO \quad (3)$$

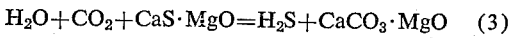

I have found that it is possible, by use of this reaction at elevated pressure and at a temperature of about 1050° F., to produce a gas stream containing more than 50 mole percent hydrogen sulfide on a dry-gas basis. Such a gas stream is eminently suitable as feed to the known Claus system for recovery of elemental sulfur. Solid from the sulfur-desorption bed, which operates at substantially the same elevated pressure as the rich-fuel-gas-treating and calcination steps, is returned in a continuous flow to the calcination step. Carbon dioxide for Reaction 3 is supplied by compressing non-condensible gases separated from steam at the condenser following the last steam-and-carbon-dioxide turbine.

The calcination step not only serves to supply active solid, $CaO \cdot MgO$, to the rich-fuel-gas-treating step, but also furnishes a lean fuel gas containing very little sulfur, usually only a few per cent of the sulfur present in the primary fuel charged to my power cycle.

In my cyclic process using calcined dolomite, there is no limit on sulfur content of either rich fuel gas treated in the desulfurization step or fuel used in the calcination step.

If oxygen is supplied to my cycle by my absorbption-desorption method, the air depleted in oxygen, leaving the bed of oxygen absorbent, is sometimes advantageously charged to the calcination step in order to increase the carbon-dioxide-carrying-power of the lean fuel gas.

I prefer to conduct the calcination step in a fluidized bed, for ease of temperature control, but a so-called transfer-line reactor may be employed.

A variety of known apparatuses exist for conversion of coal or heavy residual oils into a rich fuel gas. The examples of my cycle, shown in the accompanying drawings, include advantageous modification and adaptations of several of these apparatuses. My technique of producing a lean fuel gas in the calcination step can be adapted to the production of a rich fuel gas if oxygen and steam are substituted for air, and this is illustrated in FIG. 8.

My top heat cycle including various novel features of this invention will be more fully understood by reference to the accompanying drawings and the following description of the operation of the several alternatives illustrated.

FIGS. 1a, 1b, 1c, and 1d (referred to collectively as FIG. 1) constitute a flow diagram which may be viewed as a whole by assembling these respective figures according to the arrangement designated FIG. 1 and depicted alongside FIG. 5. This flow diagram illustrates one embodiment of my invention using heavy residual oil which is suited for use at a relatively "low" turbine-inlet temperature, around 1450° to 1600° F.

FIGS. 2a, 2b, and 2c (referred to collectively as FIG. 2) constitute a flow diagram which may be viewed as a whole by assembling these respective figures according to the arrangement designated FIG. 2 and depicted alongside FIG. 5. This flow diagram illustrates another embodiment of my invention using coal, which is suited for a relatively "low" turbine-inlet temperature.

FIGS. 3a and 3b (referred to collectively as FIG. 3) constitute a flow diagram which may be viewed as a whole by assembling these respective figures according to the arrangement designated FIG. 3 and depicted alongside FIG. 5. This flow diagram illustrates another embodiment of my invention using natural gas, which is suited for a relatively "low" turbine-inlet temperature.

FIG. 5 is a diagrammatic illustration which shows an alternate arrangement which includes the high-temperature, high pressure steam-and-carbon-dioxide turbine.

Figure 6B:
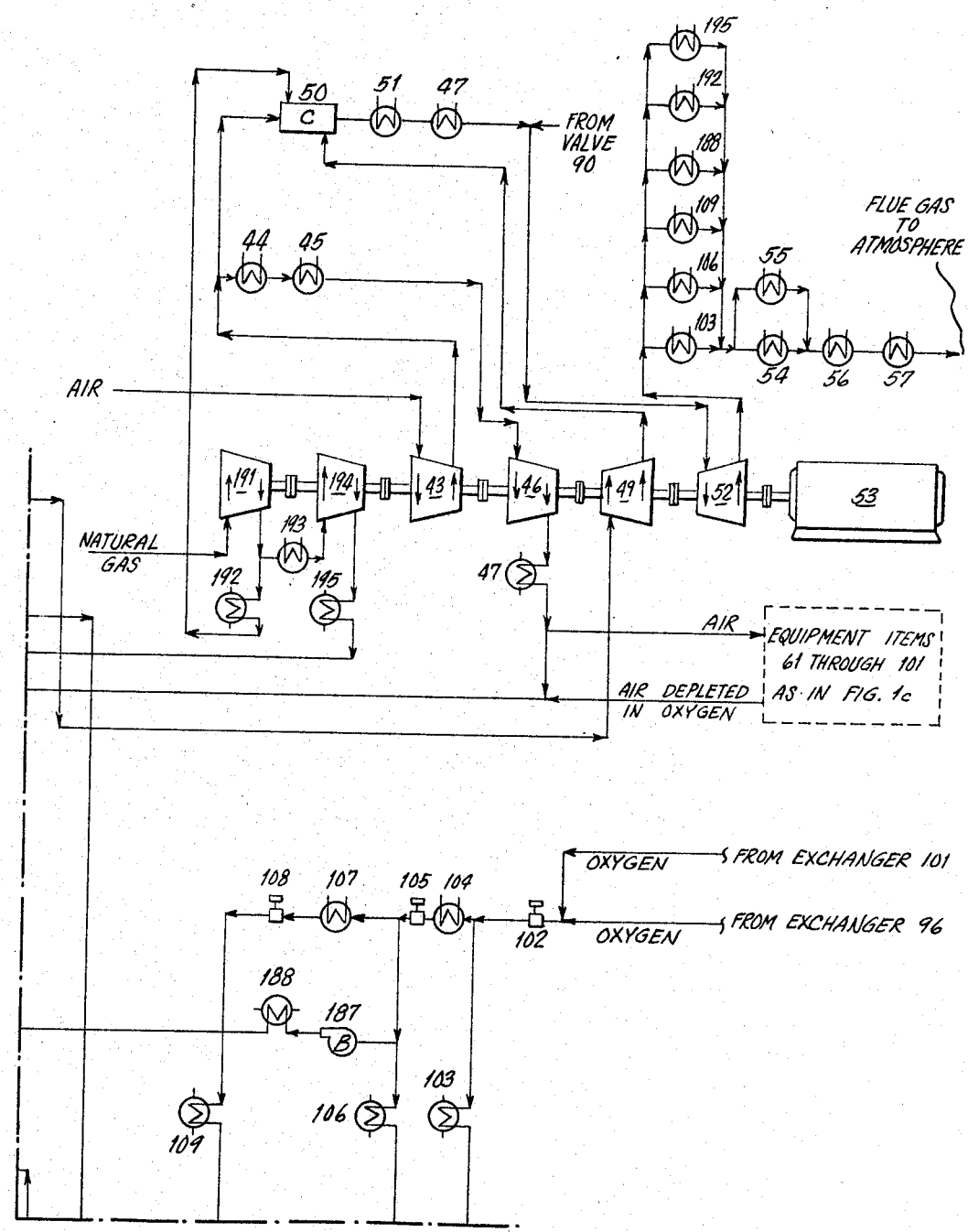

FIGS. 6a, 6b, and 6c (referred to collectively as FIG. 6) constitute a flow diagram which may be viewed as a whole by assembling these respective figures according to the arrangement designated FIG. 6 and depicted alongside FIG. 5. This flow diagram is a diagrammatic illustration of an alternate embodiment of my invention using natural gas, suitable for a relatively "low" temperature, in which a portion of the gas is very nearly completely converted to hydrogen, which is burned with oxygen ahead of steam turbines. In this embodiment very little carbon dioxide appears at the condenser.

Figure 7B:
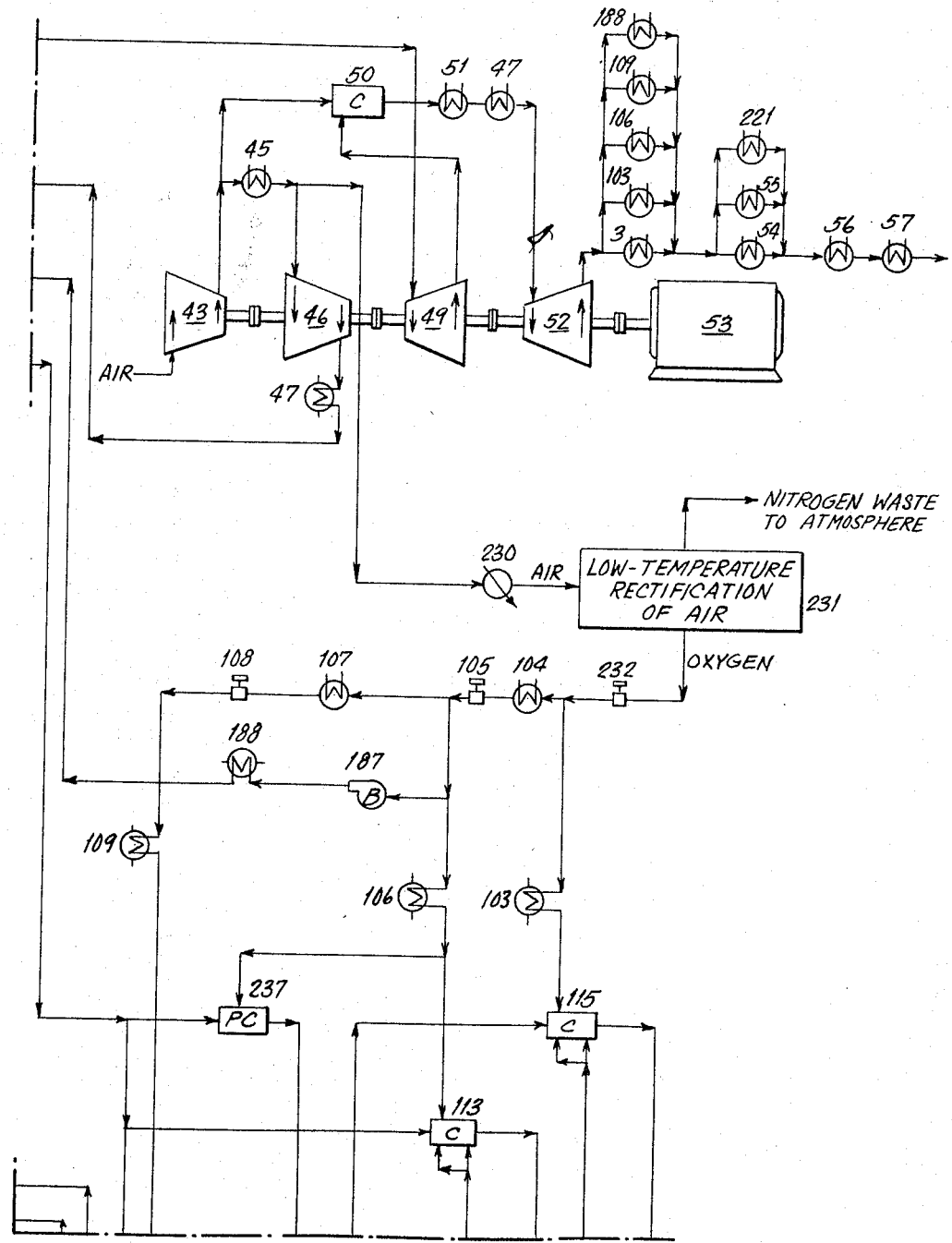
Figure 7C:
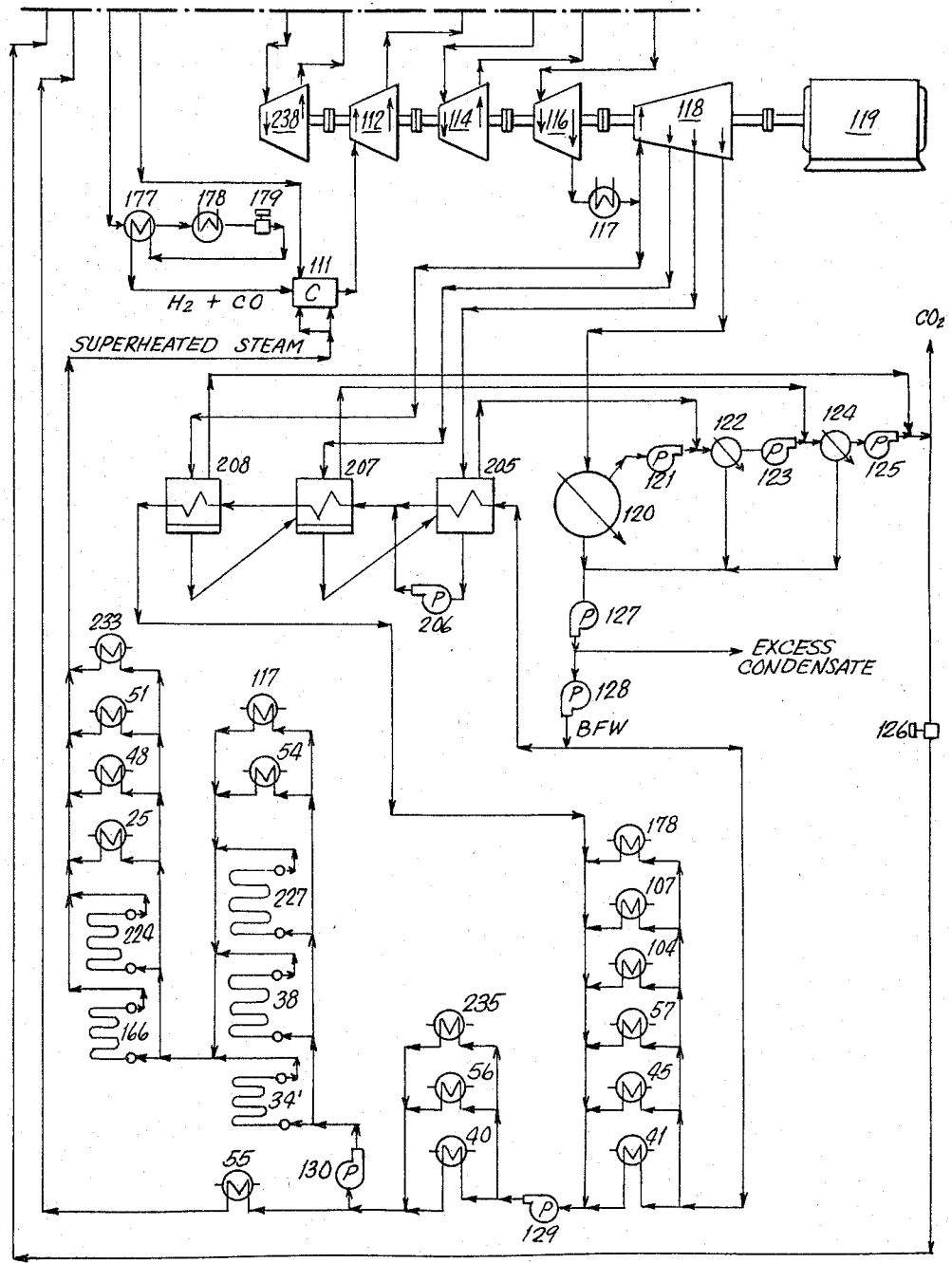

FIGS. 7a, 7b, and 7c (referred to collectively as FIG. 7) constitute a flow diagram which may be viewed as a whole by assembling these respective figures according to the arrangement designated FIG. 7 and depicted alongside FIG. 5. This flow diagram is a diagrammatic illustration of an alternate embodiment of my invention for heavy residual fuel oil, suitable for a relatively "low" turbine-inlet temperature, and illustrating the production of byproduct hydrogen from the cycle.

Figure 8A:
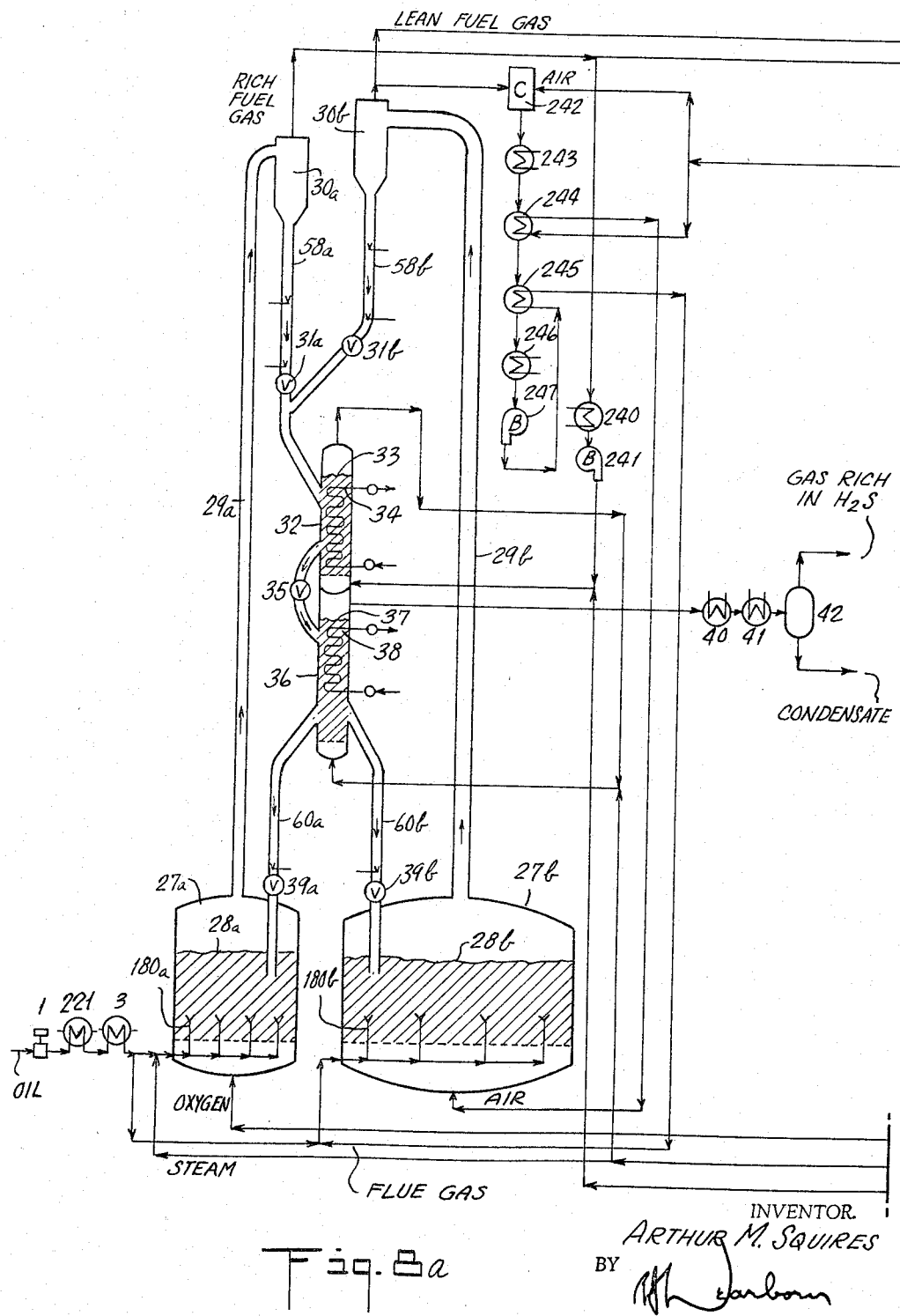
Figure 8B:
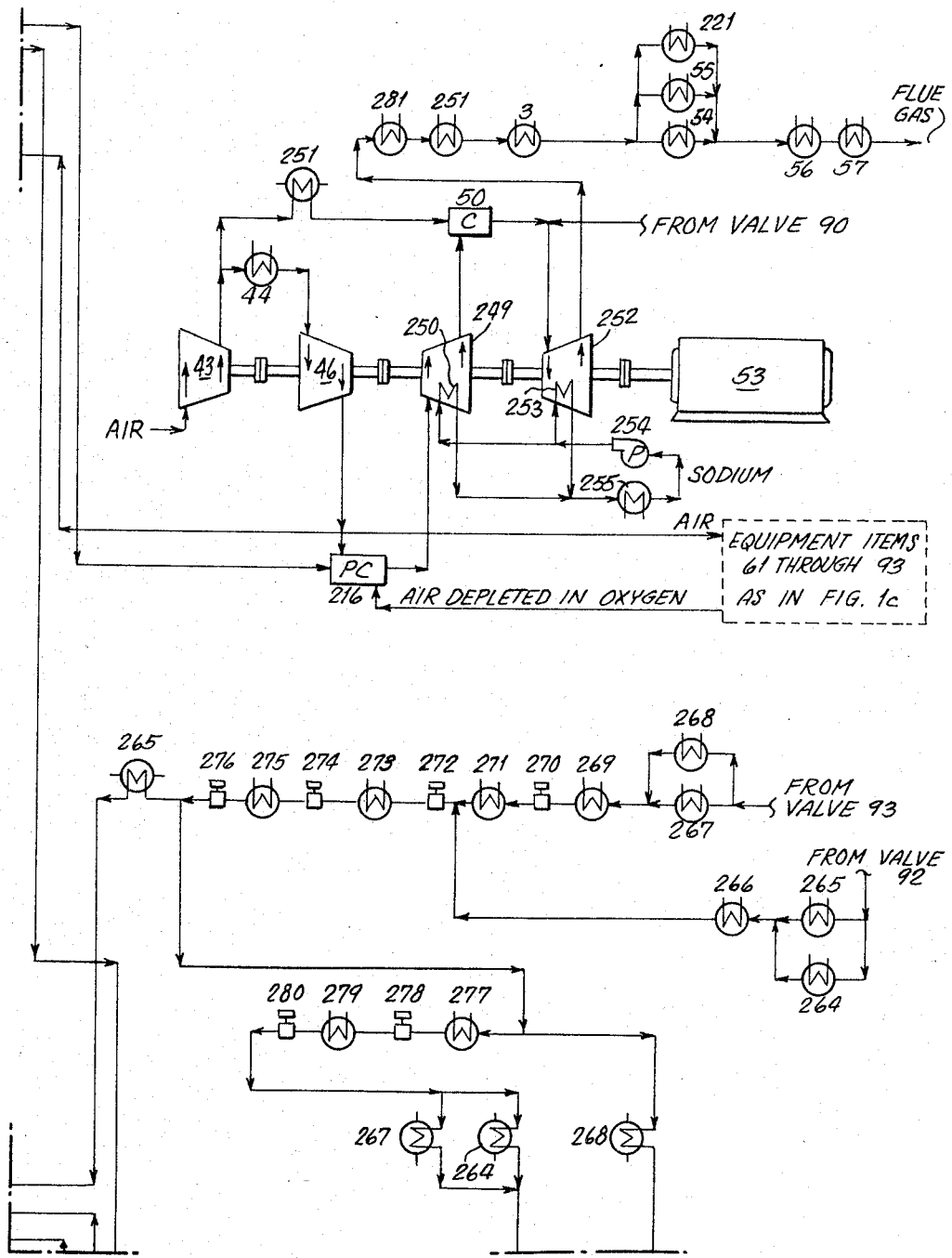
Figure 8C:
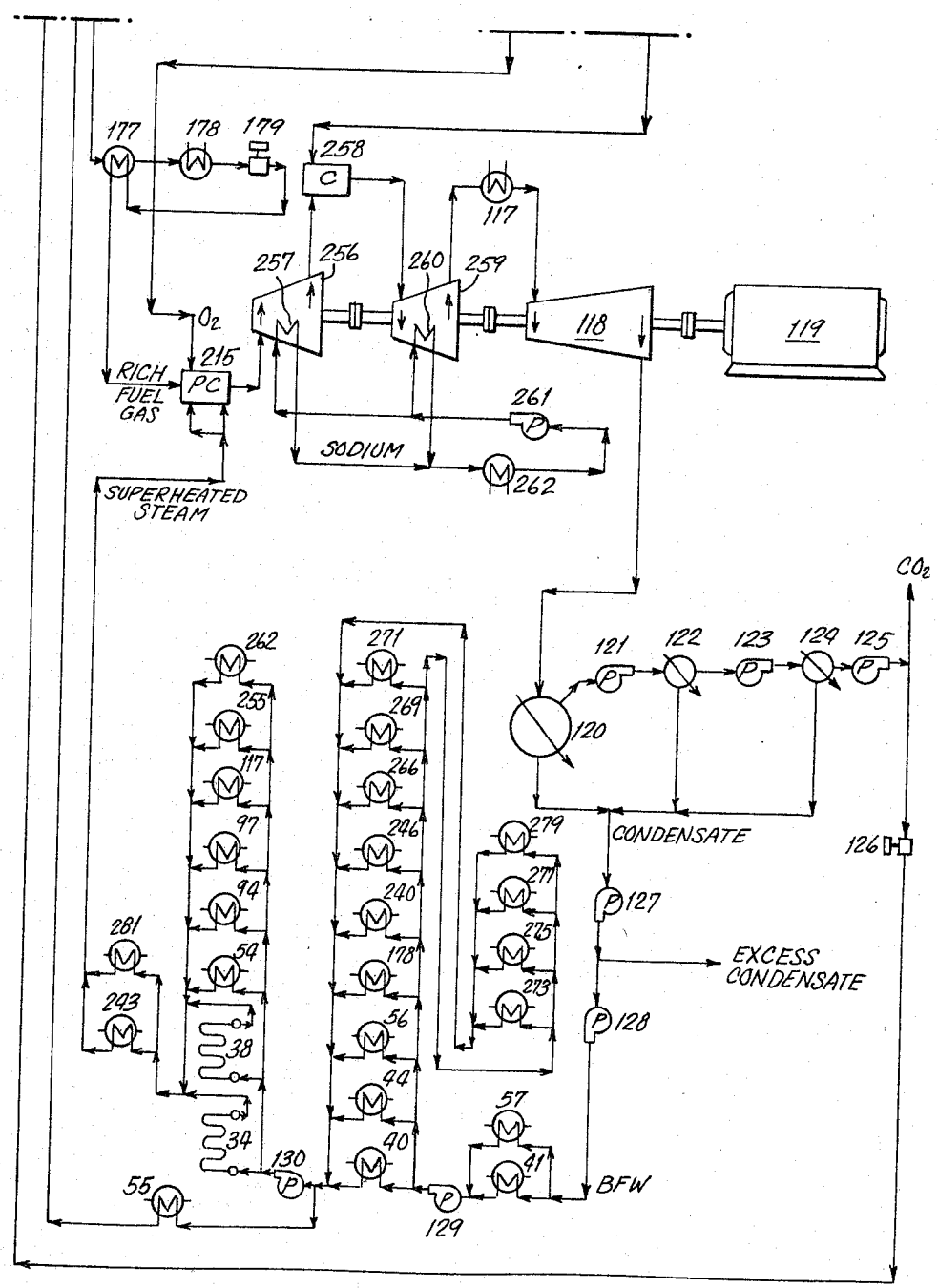

FIGS. 8a, 8b, and 8c (referred to collectively as FIG. 8) constitute a flow diagram which may be viewed as a whole by assembling these respective figures according to the arrangement designated FIG. 8 and depicted alongside FIG. 5. This flow diagram is a diagrammatic illustration of an embodiment of my invention for heavy residual fuel oil, suitable for a high turbine-inlet temperature, around 2000° F. for example.

FIG. 9 is a diagrammatic view of another embodiment of my invention for natural gas, suitable for use at an ultra-high turbine-inlet temperature, around 3500° F. for example. FIG. 9 uses low-temperature rectification of air for production of oxygen, and no flue gas is generated by the cycle.

FIG. 10 corresponds to FIG. 9 and is an embodiment of my invention for natural gas suitable for use at an ultra-high turbine-inlet temperature. The absorption-desorption method of oxygen production is used in this embodiment.

Figure 2A:
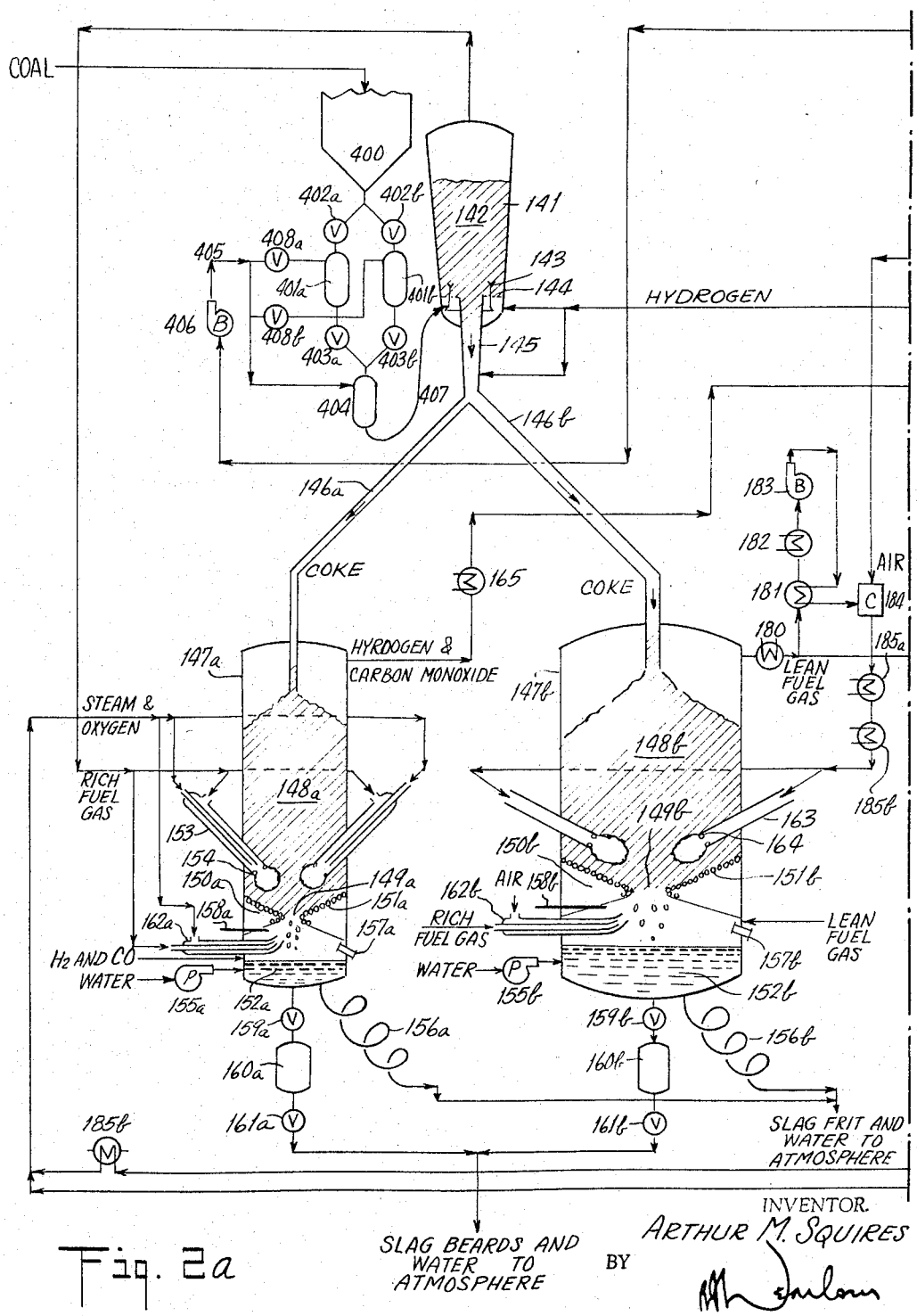
Figure 2B:
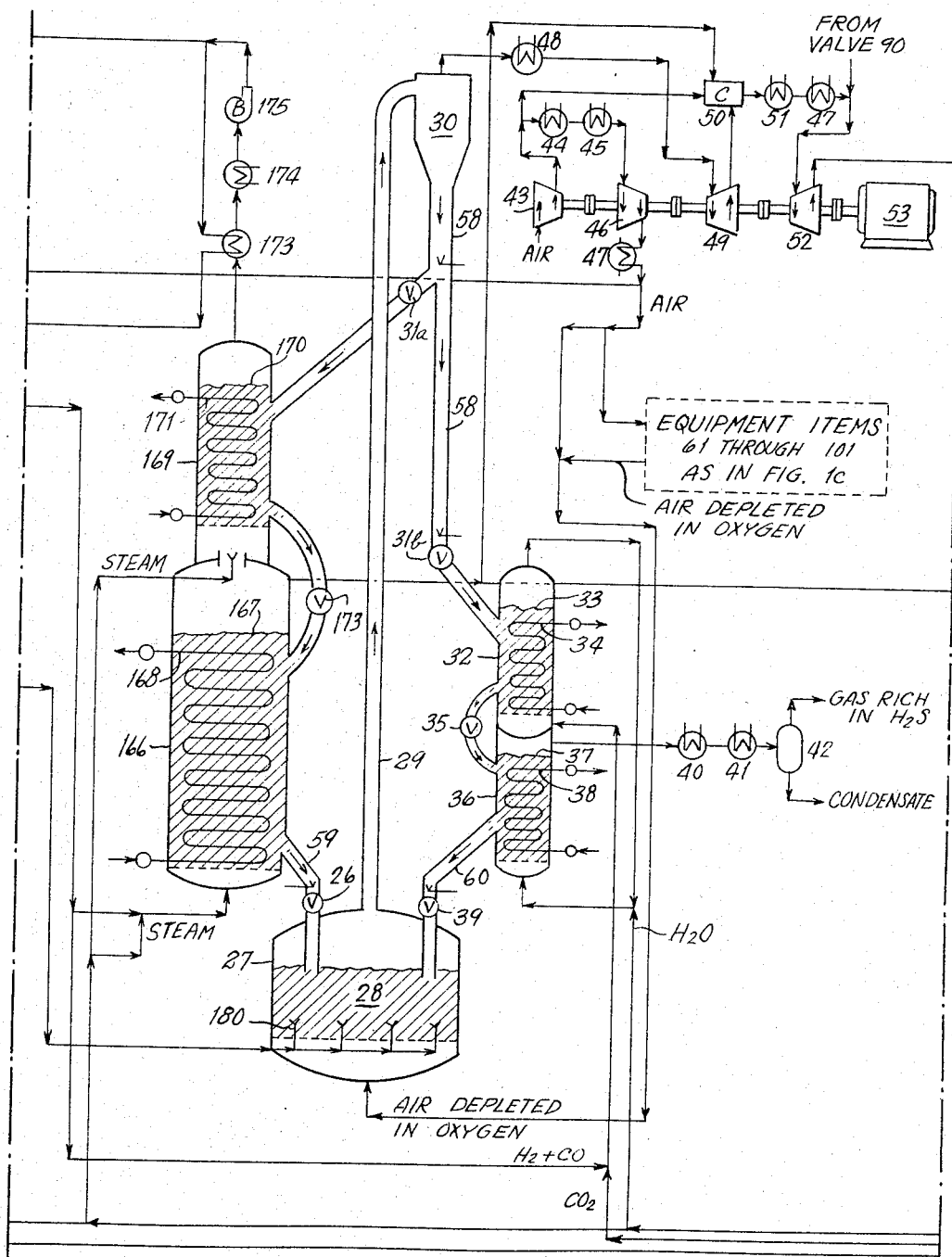

FIGS. 11 and 12 show diagrammatically alternate paths for the circulation of solids among the rich-fuel-gas-treating, calcination, and sulfur-desorption steps, and the same reference characters are used for the same parts as in FIG. 2b.

FIG. 13 illustrates a suitable design for a combustor for handling a rich fuel gas, oxygen, and superheated steam.

Figure 1D:
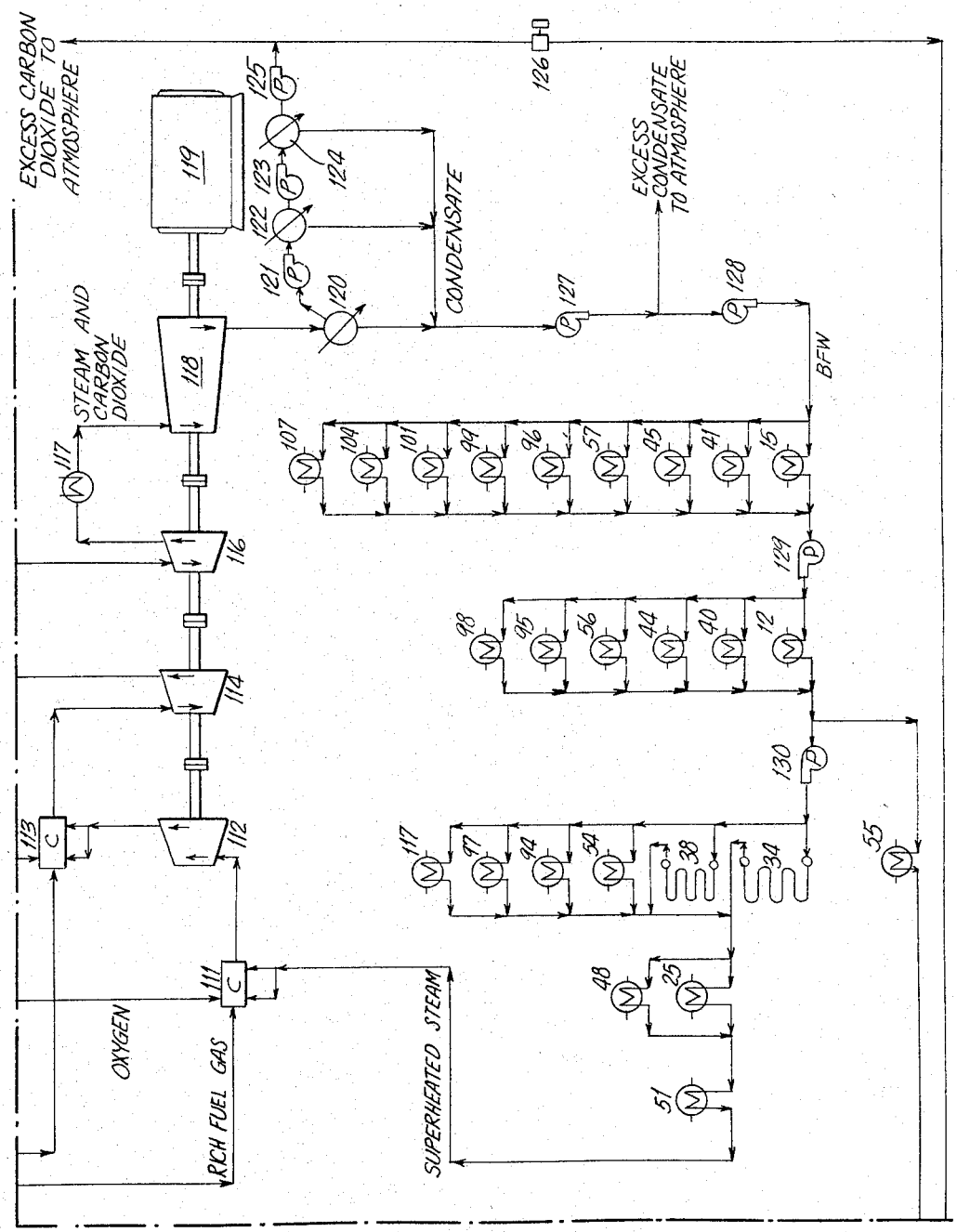

Referring to FIGS. 1a, 1b, 1c and 1d (collectively termed FIG. 1) which, when assembled according to the arrangement designated FIG. 1 and depicted alongside FIG. 5, present diagrammatically a preferred embodiment of my new cycle using heavy residual oil; for example, an oil of about 10° API gravity, about 181 SFS viscosity at 122° F., about 16.7% CCR, having a higher heating value at 60° F. of about 147,450 British thermal units (B.t.u.) per gallon, and containing about 4.73 weight percent sulfur, such oil being available in large amounts for purpose of power production:

Heavy residual oil at about 200° to 250° F. is pumped in 1 to a pressure of about 600 pounds per square inch absolute (p.s.i.a.), and is heated in heat-exchanger 2 (against heavy oil). (Heat-exchanger 2 is to be seen in two places in FIG. 1b, vis.: heat-exchanger 2 is shown as a heater in the stream of heavy residual oil which is fed to the flowsheet, and also as a cooler in the stream of heavy oil from pump 8. This has been done in order to simplify the piping circuitry and to make the essential flow patterns easier to follow and understand. Most heat-exchangers of FIG. 1 and of the other figures are treated in like manner.) A light oil recycle is added from pump 14 through line marked Light Oil Recycle, and the mixture is further heated to about 700° F. in heat-exchanger 3 (against flue gas). A heavy oil recycle is added from pump 8 through line marked Heavy Oil Recycle, and the total mixture is combined with a recycle of rich fuel gas containing hydrogen and carbon monoxide and a range of light hydrocarbons through line marked Rich Fuel Gas Recycle. The oil-gas mixture is introduced via nozzles 6 into fluidized bed 5 housed in reactor 4. Fluidizing gas to bed 5 consists primarily of hydrogen and carbon monoxide, with lesser amounts of water vapor and carbon dioxide. The fluidized solid in reactor 4 consists of calcined dolomite,, $CaO \cdot MgO$, and of species derived therefrom, vis., $CaS \cdot MgO$ and $CaCO_3 \cdot MgO$. The oil mixture is "hydrocracked" in reactor 4. That is, the oil is thermally cracked in presence of a relatively high partial pressure of hydrogen, yielding lighter vapor products and coke, which is deposited upon and within the particles of fluidized solid present in reactor 4. Reactor 4 operates at about 1000° F. to 1150° F. and preferably at about 1050° F.

Carbon dioxide is removed by reaction with the fluidized solid in reactor 4, thus:

$$CO_2 + CaO \cdot MgO = CaCO_3 \cdot MgO \qquad (4)$$

Water vapor and carbon monoxide also react with the fluidized solid, thus:

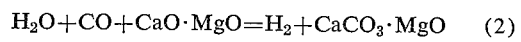
$$H_2O + CO + CaO \cdot MgO = H_2 + CaCO_3 \cdot MgO \qquad (2)$$

Hydrogen sulfide produced by cracking of the oil is removed by reaction with the fluidized solid, thus:

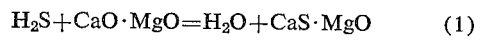
$$H_2S + CaO \cdot MgO = H_2O + CaS \cdot MgO \qquad (1)$$

Vapor products from reactor 4 are practically free of sulfur, and are also poor in water vapor and carbon dioxide on account of Reactions 2 and 4.

Heat is generated by each of the three foregoing reactions, and this reaction heat supplies a substantial portion of heat required for cracking oil in reactor 4. The remaining heat is supplied by the cooling of solid entering reactor 4 at about 1750° F. from aerated standpipe 58 ing valve 93, which maintains a constant pressure of about 16 p.s.i.a. on the downstream side of valve 93. Valves 90 and 91 are closed.

Oxygen from valve 93 is cooled in heat-exchangers 97, 98, and 99 (against BFW) to about 150° to 200° F., and is compressed in compressor 100 to about 37 p.s.i.a., and is again cooled to about 150° to 200° F. (against BFW) in heat-exchanger 101. Oxygen from valve 92 is cooled in heat-exchangers 94, 95, and 96 to about 150° to 200° F. (against BFW), and is combined with oxygen from compressor 100. The combined oxygen at about 37 p.s.i.a. is compressed to about 100 p.s.i.a. in compressor 102, and a portion is heated to about 900° F. in heat-exchanger 103 (against flue gas) and committed to combustor 115. The remaining oxygen is cooled in heat-exchanger 104 to about 150° to 200° F. (against BFW), and is compressed to about 630 p.s.i.a. in compressor 105. A portion is heated to about 900° F. in heat-exchanger 106 (against flue gas); and a part thereof is sent to partial combustor 24, and the remainder is sent to combustor 113. The finally remaining oxygen is cooled in heat-exchanger 107 to about 150° to 200° F. (against BFW), is compressed to between about 1500 and about 6000 p.s.i.a. in compressor 108, is heated to about 900° F. in heat-exchanger 109 (against flue gas), and is committed to combustor 111.

Changeover to the next phase of the oxygen-absorption-desorption cycle is accomplished as follows:

(1) Open valve 71, causing a portion of air to flow directly from exchanger 47 to vessel 64.

(2) Close valves 65, 72, and 73, isolating vessel 61 and causing air to flow only through vessel 64. This commences the absorption phase of the cycle for vessel 64.

(3) Close valve 89 and open valve 91. This shuts off oxygen flow from vessel 63, completing its desorption phase of the cycle. The entire required supply of oxygen is now being drawn from vessel 62, through regulating valve 92, which must open wider in order to maintain the required downstream pressure.

(4) Open valves 66 and 70 to a partially open setting which is adjusted so that flow of compressed air from vessel 61 to 63 will not be so rapid as to lift the solids in vessel 61. After the pressures are equalized in the two vessels, open valves 66 and 70 wide.

(5) Open valve 90 slowly and at a controlled rate so that vessels 61 and 63 depressure in a controlled manner to the inlet to expansion turbine 52. Desorption of oxygen from absorbent in vessel 61 commences and initially maintains a pressure in this vessel substantially equal to the partial pressure of oxygen in compressed air from exchanger 47, i.e., at about 120 p.s.i.a. This setting of valves is maintained until the greater part of nitrogen present in vessel 61 is purged by the action of desorbing oxygen, viz., until relatively pure oxygen is found to be entering vessel 63 through valve 70.

(6) Close valves 90, 66, and 84. Gently open valve 85, pressuring vessel 63. Open valve 82, and close valve 86. Vessel 63 is now in the phase of its cycle in which it serves as a "guard" for the absorption of oxygen in vessel 64.

(7) Open valves 89 and 80, and close valve 91.

(8) Close valve 79, and immediately thereafter open valve 75. Vessels 61 and 62 are now in the phase of their cycles in which they desorb oxygen while their pressures fall to about 37 and 16 p.s.i.a. respectively and their temperatures fall to about 980° and 930° F. respectively.

The temperature of compressed air leaving exchanger 47 is regulated to maintain steady cyclic operating temperatures in absorbers 61 through 64, so that the overall oxygen-absorption-desorption process is thermally autogenic.

Rich fuel gas and oxygen, both at the same pressure, between about 1500 and about 6000 p.s.i.a., are combusted in combustor 111 together with superheated steam at substantially the same pressure. A stoichiometric quantity of oxygen is used. (Optionally, a slightly lesser amount of oxygen may be used, in order to guarantee against presence of elemental oxygen in effluent gas from combustor 111 and to provide for presence of a small amount of hydrogen and carbon monoxide in this gas.) Effluent gas from combustor 111 consists primarily of steam, with a relatively small admixture of carbon dioxide. Its temperature may be about 1,600° F., a temperature level appreciably above that which can be practicably and economically achieved by the indirect transfer of heat to high-pressure steam across heat-transfer surface.

Effluent gas from combustor 111 is expanded in "steam" turbine 112 to about 600 p.s.i.a., and is then sent to combustor 113, where heat of combustion of rich fuel gas and oxygen again raises its temperature to about 1,600° F. Effluent from combustor 113 is expanded in "steam" turbine 114 to about 90 p.s.i.a., and is then sent to combustor 115, where heat of combustion of rich fuel gas and oxygen raises its temperature for a third time to about 1,600° F. Effluent from combustor 115 is expanded in "steam" turbine 116 to a pressure a little above atmospheric.

Gas from turbine 116 is cooled in heat-exchanger 117 to a temperature in the general neighborhood of 500° F., this temperature to be specified more exactly below. The gas is then expanded in "steam" turbine 118 to a subatmospheric pressure, generally in the range between about 0.5 to about 2.0 p.s.i.a., preferably the lowest pressure which can be economically maintained by condensing steam in effluent from turbine 118 against the available atmospheric cooling water. The temperature of gas from heat-exchanger 117 is selected and controlled so that the gas will be cooled substantially to condensing temperature by its expansion in turbine 118.

Power developed by expansion turbines 112, 114, 116, and 118 is transmitted along a shaft to drive electricity-generator 119.

A major portion of steam in effluent from turbine 118 is condensed in condenser 120 by heat-exchange against atmospheric cooling water. Vacuum pump 121 draws non-condensible gases (consisting primarily of carbon dioxide) from condenser 120 together with steam vapor at its partial pressure at the temperature of the gases. (This may be a substantial quantity of steam vapor, and it is advantageous to arrange condenser 120 so that non-condensible gases leave at the coldest possible spot.) Vacuum pump 121 compresses non-condensible gases and steam vapor to a first pressure intermediate between condenser 120 and the atmosphere. Effluent from vacuum pump 121 is cooled in heat-exchanger 122 against atmospheric cooling water. Partial condensation of steam vapor occurs in heat-exchanger 122. Vacuum pump 123 compresses gaseous effluent from heat-exchanger 122 to a second higher pressure intermediate between condenser 120 and the atmosphere, and effluent from pump 123 is cooled in heat-exchanger 124 against atmospheric cooling water, with further partial condensation of steam vapor. Vacuum pump 125 compresses gaseous effluent from heat-exchanger 124 to the atmosphere.

A minor portion of carbon dioxide from vacuum pump 125 is compressed in compressor 126 to about 570 p.s.i.a., and is used as fluidizing gas to reactor 32.

Condensate from condenser 120 and heat-exchangers 122 and 124 is combined and pumped to atmospheric pressure in pump 127. Excess condensate is discarded to the atmosphere. This discard of water corresponds to the hydrogen content of rich fuel gas committed to combustors 111, 113, and 115 (less water vapor present in the discharge from pump 125).

Boiler feed water (abbreviated BFW) in the required amount is pumped in pump 128 to about 200 p.s.i.a., and is heated in heat-exchangers 15 (against vapor product of reactor 4), 41 (against gas rich in hydrogen sulfide), 45 (against air), 57 (against flue gas), 96, 99, 101, 104 and 107 (against oxygen). Heated BFW is pumped in pump 129 to about 700 p.s.i.a., and is further heated in heat-exchangers 12 (against vapor product of reactor 4), 40 (against gas rich in hydrogen sulfide), 44 (against air), 56 (against flue gas), 95, and 98 (against oxygen). A minor portion of the heated BFW is vaporized to steam in heat-exchanger 55 (against flue gas), and used in part as an admixture with carbon dioxide to reactor 36, in part as an admixture with light oil to partial combustor 24, and optionally in part as an admixture to fluidizing gas to reactor 4. A major portion of the heated BFW is pumped in pump 130 to a pressure several hundred p.s.i. higher than that of combustor 111, and is further heated by heat-transfer surfaces 34 and 38 (against fluidized-beds 33 and 37 respectively), and by heat-exchangers 54 (against flue gas), 94 and 97 (against oxygen), and 117 (against steam). Finally, steam is superheated in exchangers 25 (against hydrogen and carbon monoxide at about 600 p.s.i.a. from partial combustor 24), 48 (against lean fuel gas at about 550 p.s.i.a.), and 51 (against flue gas at about 90 p.s.i.a.). Since each of these superheating heat-exchangers is at an elevated pressure (i.e., is "supercharged"), a high degree of superheat may be practicably specified, e.g., a temperature in the neighborhood of 1200° F. may be preferred.

A substantial portion of the steam-raising duty is provided by the cooling of steam in heat-exchanger 117. Steam from turbine 116 is typically at a temperature above 1,000° F.

Thermal efficiency of conversion of fuel energy to electricity by the new cycle obviously depends primarily upon the temperature of streams entering expansion turbines 49, 52, 112, 114, and 116. I now believe that 1,600° F. is a reasonable design inlet temperature for such turbines, considering the fact that gases entering these turbines are clean. This is especially true of turbines 49, 112, 114, and 116, which handle gases containing no elemental oxygen. Turbine 49 handles gas containing reducing values in form of hydrogen and carbon monoxide, and presence of reducing values in the gas passing through turbines 112, 114, and 116 can easily be arranged for by using less than the stoichiometric amount of oxygen in combustor 111. If this is done, gases from pump 125 may advantageously be compressed to about 90 p.s.i.a. and sent to combustor 50.

Using a turbine-inlet temperature of 1600° F., I have calculated examples which lead me to believe that an overall cycle efficiency of about 47 to about 50 percent to electricity sent out from the plant can be achieved by the arrangement of FIG. 1, the exact efficiency depending upon the maximum steam pressure, the steam-superheat-temperature selected, the temperature of the available atmospheric condensing water, and the amount of surface provided in the various heat-exchangers. This range of cycle efficiency corresponds to a range of heat rate from 7250 to 6826 B.t.u. per kilowatt-hour (kw.-hr.) of electricity sent out. The best present-day oil-fired thermal power stations operate at heat rates of the order of 9000 B.t.u./kw.-hr. sent out. Thus, my cycle affords a saving of fuel ranging between about 20 to about 24 percent. For a plant generating electricity at a rate of 300,000 kilowatts, this corresponds to a fuel saving between about 2000 and 2400 barrels per day.

The foregoing heat rates allow heating value credit for the sulfur-rich gas leaving drum 42 and committed to a system recovering elemental sulfur. I have not used waste heat from such a system in my cycle, in my calculations to date, but this may be done. If this were done, heating value credit could simply be taken for sulfur product from the system recovering elemental sulfur.

When one asseses the economic advantages of my cycle, notice should be taken of revenues produced from the sale of byproduct elemental sulfur. In the example of FIG. 1, sulfur sales from a 300,000-kilowatt plant will be the order of sixty tons per day, when the plant is running at full capacity.

The use of a high temperature at the inlets to the several expansion turbines is a primary factor leading to higher thermal efficiencies by the use of my cycle. A second factor is the reduction which my cycle makes possible in the quantity of water vapor present in gaseous effluents. In a conventional power cycle burning heavy residual fuel oil, latent heat losses on account of moisture in flue gas typically amount to about 5.4 percent of the heating value of oil charged to the plant. Designs employing the arrangement of FIG. 1 typically lose about 2 percent of the heating value of oil in form of latent heat losses. This is because a considerable portion of hydrogen present in the oil leaves the system as condensate pumped to the atmosphere by pump 127.

The arrangement of FIG. 1 gasifies the oil in two steps, first by hydrocracking in reactor 4, and second by partial combustion of light oil with oxygen in partial combustor 24. This is advantageous in respect to the minimization of latent heat losses from the cycle. The hydrocracking step puts most of the hydrogen in the oil into a path which leads to water condensed in condenser 120; and this step also provides a coke, lean in hydrogen, to be used as the primary fuel in a path which leads to flue gas.

I now give a numerical example of my top heat power cycle, an example which can be readily understood by reference to FIG. 1:

Example: This example differs from the flowsheet of FIG. 1 in a few details, as follows:

(1) In calculating the example, I used heat-exchanger 48 to transfer heat from lean fuel gas (from cyclone-separator 30) to air depleted in oxygen (from one of oxygen absorber-desorbers 61 through 64), rather than to transfer heat from lean fuel gas to steam, as shown in FIG. 1. I now prefer the arrangement of FIG. 1.

(2) The example used seven top heat combustors like combusters 111, 113, and 115 in FIG. 1, together with seven corresponding top heat turbine stages like turbines 112, 114, and 116. The temperature of cycle fluid at the inlet of each of the seven stages was set at 1600° F., and the respective inlet pressures were 2400 p.s.i.a., 1168.5 p.s.i.a., 568 p.s.i.a., 275.4 p.s.i.a., 133.7 p.s.i.a, 64.7 p.s.i.a., and 31.2 p.s.i.a.

Other data needed for the understanding of my example are: Steam was superheated to 1075° F. ahead of the first top heat combustor like 111. Steam-and-carbon-dioxide cycle fluid emerged from the last top heat turbine stage at 1400° F. and 15.2 p.s.i.a., and was cooled to 468° F. in heat-exchanger 117, entering low-temperature turbine 118 at this temperature and at 14.7 p.s.i.a. Cycle fluid emerged from low temperature turbine 118 at 108° F., and 1.3 p.s.i.a. No condensation occurred within turbine 118. Carbon dioxide effuent from condenser 120 was cooled to 90° F. ahead of each vacuum pump 121, 123, and 125. The temperature required in the air leaving heat-exchanger 47 is difficult to predict exactly; I have estimated 963.4° F. to be the needed temperature, but it can readily be seen that the overall performance of my cycle cannot depend critically upon a change in this temperature over the range in which it could possibly need to vary. I used 1600° F. as inlet temperature to turbines 49 and 52, and flue gas was discharged to the atmosphere at 183° F.

The following tabulation shows the balance between material inputs to the flowsheet of the example and material effluents from the example:

Material balance: Quantities in pounds per hour
Heavy fuel oil to flowsheet _____ 119,981
Air to flowsheet _____ 1,640,285

Total inputs to flowsheet _____ 1,760,266
Flue gas from flowsheet _____ 1,497,369

| | |
|---|---|
| Carbon dioxide vent from pump 125 (including 8,816 lbs./hr. water vapor) | 179,920 |
| Gas rich in hydrogen sulfide from drum 42 | 10,835 |
| Condensate from drum 42 | 4,394 |
| Excess condensate from pump 127 to atmosphere | 67,701 |
| Total effluents from flowsheet | 1,760,219 |

The following tabulation lists flow quantities of internal streams, within the flowsheet of the example, which are important to the understanding of the example:

Internal flows: Quantities in pounds per hour

| | |
|---|---|
| Heavy oil recycle | 47,992 |
| Light oil recycle | 35,994 |
| Coke in solids passing through pipe 59 | 47,956 |
| Light oil from pump 17 | 41,383 |
| Light oil to partial combustor 24 | 35,175 |
| Light oil to combustor 50 | 6,207 |
| Rich fuel gas recycle | 63,190 |
| Net rich fuel gas to top heat combustors 111, etc. (see Note 1) | 96,785 |
| Air to absorber-desorbers 61–64 | 1,314,270 |
| Air to combustor 50 | 369,226 |
| Oxygen from absorber-desorbers 61–64 | 217,292 |
| Oxygen to partial combustor 24 | 36,029 |
| Oxygen to top heat combustors 111, etc. (see Note 1) | 181,263 |
| Lean fuel gas from cyclone-separator 30 | 1,074,363 |
| Carbon dioxide handled by compressor 126 (including 915 lbs./hr. water vapor) | 15,768 |
| Effluent from partial combustor 24 (0.81% to reactor 32; remainder to reactor 4) | 78,950 |
| superheated steam (at 1075° F.) to first top heat combustor 111 | 833,477 |
| Steam to partial combustor 24 | 7,745 |
| Steam added to effluent from reactor 32 | 6,914 |
| Total condensate from exchangers 120, 122, and 124 | 915,836 |
| Solid from cyclone-separator 30 to pipe 58 (87.66% to reactor 4; remainder to reactor 32) | 391,038 |

NOTE 1: Distribution of rich fuel gas and oxygen to the seven top heat combustors:

| | Percent |
|---|---|
| Combustor discharging at 2400 p.s.i.a. | 25.85 |
| Combustor discharging at 1168.5 p.s.i.a. | 12.33 |
| Combustor discharging at 568 p.s.i.a. | 12.12 |
| Combustor discharging at 275.4 p.s.i.a. | 12.14 |
| Combustor discharging at 133.7 p.s.i.a. | 12.30 |
| Combustor discharging at 64.7 p.s.i.a. | 12.49 |
| Combustor discharging at 31.2 p.s.i.a. | 12.77 |

The following tabulation gives the chemical analysis of flow streams:

Analysis of streams:

| Rich fuel gas— | Mol percent |
|---|---|
| $CH_4$ | 12.45 |
| $C_2H_4$ | 1.17 |
| $C_2H_6$ | 5.09 |
| $C_3H_6$ | 1.30 |
| $C_3H_8$ | 2.48 |
| $H_2$ | 36.82 |
| CO | 40.69 |

| Lean fuel gas (see Note 2)— | Mol percent |
|---|---|
| $H_2$ | 1.66 |
| CO | 7.53 |
| $CO_2$ | 2.95 |
| $H_2O$ | 1.07 |
| $N_2$ | 85.71 |
| A | 1.08 |
| $H_2S$ | (0.003) |
| COS | (0.0005) |

NOTE 2: Lean fuel gas will contain a minor quantity of methane, but this was neglected as non-essential to the validity of the example.

| Effluent from partial combustor 24— | Mol percent |
|---|---|
| $CH_4$ | 0.19 |
| $H_2$ | 51.07 |
| CO | 45.43 |
| $H_2O$ | 2.36 |
| $CO_2$ | 0.94 |

| Gas rich in $H_2S$ from drum 42— | Mol percent |
|---|---|
| $H_2S$ | 53.83 |
| COS | 0.39 |
| $CO_2$ | 31.99 |
| $H_2$ | 11.56 |
| CO | 1.50 |
| $H_2O$ | 0.70 |
| $CH_4$ | 0.03 |

| Flue gas— | Mol percent |
|---|---|
| $CO_2$ | 8.71 |
| $H_2O$ | 2.90 |
| $O_2$ | 0.88 |
| $N_2$ | 86.42 |
| A | 1.09 |
| $SO_2$ | (0.003) |

The following data show the calculation of the heat rate and thermal efficiency of the example:

Calculation of heat rate:

| | |
|---|---|
| Higher heating value of oil input, B.t.u./hr. | 2,138,700,000 |
| Higher heating value of gas rich in $H_2S$ from drum 42, B.t.u./hr. | 47,700,000 |
| Net heating value of fuel consumed for power production, B.t.u./hr. | 2,091,000,000 |
| Net kilowatts of shaft work produced by flowsheet | 305,205 |
| Allowance for condensing water pump, other auxiliaries, losses, etc., kw. | 8,205 |
| Net kilowatts sent out of the plant | 297,000 |

Heat rate=2,091,000,000/297,000=7040.4 B.t.u./kwh. sent out.

Thermal efficiency=3,412.75/7,040.4×100=48.47%.

Since dolomite is used in the process hereinbefore described, I am outlining the chemistry of this material as follows:

Natural dolomite is a common rock of wide distribution throughout the world. Its structure resembles that of calcite, i.e., alternating layers of carbonate ions and cations. Ideally, cation planes populated entirely by $Mg^{++}$ alternate with planes populated entirely by $Ca^{++}$. Natural dolomite seldom approaches the ideal of one atom of magnesium for each atom of calcium, the latter usually being present in excess.

When dolomite is calcined, intermingled crystallites of magnesium oxide and calcium oxide are formed which have no "memory" of the ordered arrangement of these elements in the dolomite structure. The crystallites are extremely small and are highly reactive chemically. Magnesium and calcium oxides have contrasting and complementary chemical properties. The calcium oxide crystallites are reactive toward carbon dioxide at temperatures above about 600° F., but they are not catalytic toward the water-gas-shift reaction:

$$CO+H_2O=CO_2+H_2 \qquad (5)$$

Calcium oxide also reacts with hydrogen sulfide to form calcium sulfide. The magnesium oxide crystallites are catalytic toward the water-gas-shift, Reaction 5 at temperatures above about 750° F., but they are not reactive toward carbon dioxide. Moreover, magnesium oxide does not react with hydrogen sulfide at temperatures above 750° F., except at an extremely low partial pressure of steam. The magnesium oxide crystallites form a porous matrix which can readily be penetrated by carbon dioxide to react with calcium oxide throughout the solid. The matrix is a rugged one, and calcium oxide may be converted to calcium carbonate, and then calcined, and the cycle repeated many times without bringing about any chemically-induced decrepitation of the solid. Calcium oxide by itself tends to decrepitate when reacted with carbon dioxide, and the reaction tends to slow down at conversions of only about 20 to 30 percent of the initial oxide.

It is believed that a higher percentage of the calcium oxide is reactive toward carbon dioxide the closer the atomic ratio of calcium to magnesium is to unity. In other words, it seems desirable to select a dolomite having only a small excess of calcium I have used a dolomite native to the Chicago, Illinois, region, having a calcium-to-magnesium atomic ratio of 1.10. I found this material satisfactory.

Artificially-made dolomites have been reported differing very little from natural dolomites.

It has been claimed that an artificial product produced by calcining the mixed precipitates $CaCO_3$ and $MgCO_3$, supported upon silica gel, and in which magnesium exceeds calcium, on an atomic basis, has superior qualities as regards the takeup of carbon dioxide.

It will be clear from the foregoing that I am aware that the calcination product of dolomite is not a true chemical compound. I choose to represent this product by the chemical formula $CaO \cdot MgO$ merely for convenience of expression.

If calcination is conducted at a temperature above about 1900° F., sintering occurs, entailing loss of surface area and increase in density, and the usefulness of the calcined product, both for taking up carbon dioxide and for catalyzing the shift Reaction 5, is impaired.

I have conducted the chemical reaction $$H_2S + CaO \cdot MgO = H_2O + CaS \cdot MgO \quad (1)$$

over calcined dolomite at about 1,100° F. and atmospheric pressure until the material was substantially all converted to $CaS \cdot MgO$. The inlet gas mixture contained about 85% nitrogen, 10% hydrogen sulfide, and 5% hydrogen. During this operation, effluent consistently contained about 10 to 12 p.p.m. of hydrogen sulfide.

Subsequently, I conducted the chemical reaction $$H_2O + CO_2 + CaS \cdot MgO = H_2S + CaCO_3 \cdot MgO \quad (3)$$

at about 1,000° F. to 1,100° F. and at about 220 p.s.i.a. The initial gas mixture contained about 82% carbon dioxide and about 9% each of hydrogen and carbon monoxide. The gas mixture was humidified with steam to afford a carbon-dioxide-to-steam ratio of about 1.75. Dry effluent contained 20% to 24% hydrogen sulfide, levels which are satisfactory for feed gas to a Claus system for recovery of elemental sulfur. I believe that an appreciably higher concentration of hydrogen sulfide could have been obtained by using a lower carbon-dioxide-to-steam ratio, a higher operating pressure, or both, since effluent appeared to be substantially at chemical equilibrium for the foregoing Reaction 3.

The foregoing chemical manipulations of calcined dolomite did not cause the solid to decrepitate, nor bring about any evident change in its particle shape. (When I conducted Reaction 3, I raised the partial pressure of steam slowly at first, in order to convert any possibly remaining reactive values of CaO to $CaCO_3$ before subjecting the solid to the steam partial pressure finally reached.)

I have conducted the chemical reaction $$H_2O + CO + CaO \cdot MgO = H_2 + CaCO_3 \cdot MgO \quad (2)$$

over calcined dolomite at about 1250° F. and between about 140 and 315 p.s.i.a. Two initial gas mixtures were used, containing hydrogen and carbon monoxide in ratios 1.0 and 1.6 respectively. The gas mixtures were humidified with steam to afford steam-to-carbon-monoxide ratios between about 1.2 and 1.8. Under these conditions, carbon monoxide and carbon dioxide could not be detected in effluent from the calcined dolomite bed by analytical means which were sensitive to less than 0.01% of either constituent. Hydrogen was produced having a purity close to 100%.

I have conducted the chemical reactions $$H_2S + CaO \cdot MgO = H_2O + CaS \cdot MgO \quad (1)$$

and $$H_2O + CO + CaO \cdot MgO = H_2 + CaCO_3 \cdot MgO \quad (2)$$

simultaneously over calcined dolomite at about 1200° F. and between about 140 and 215 p.s.i.a. The initial gas mixture contained about 1% hydrogen sulfide, the balance consisting of approximately equal quantities of hydrogen and carbon monoxide. Concentrations of hydrogen sulfide in effluent ranged from 2 to 140 p.p.m., and depended upon quantity of steam in effluent. When little or no steam was present, effluent hydrogen sulfide was below 20 p.p.m.

Figure 2C:
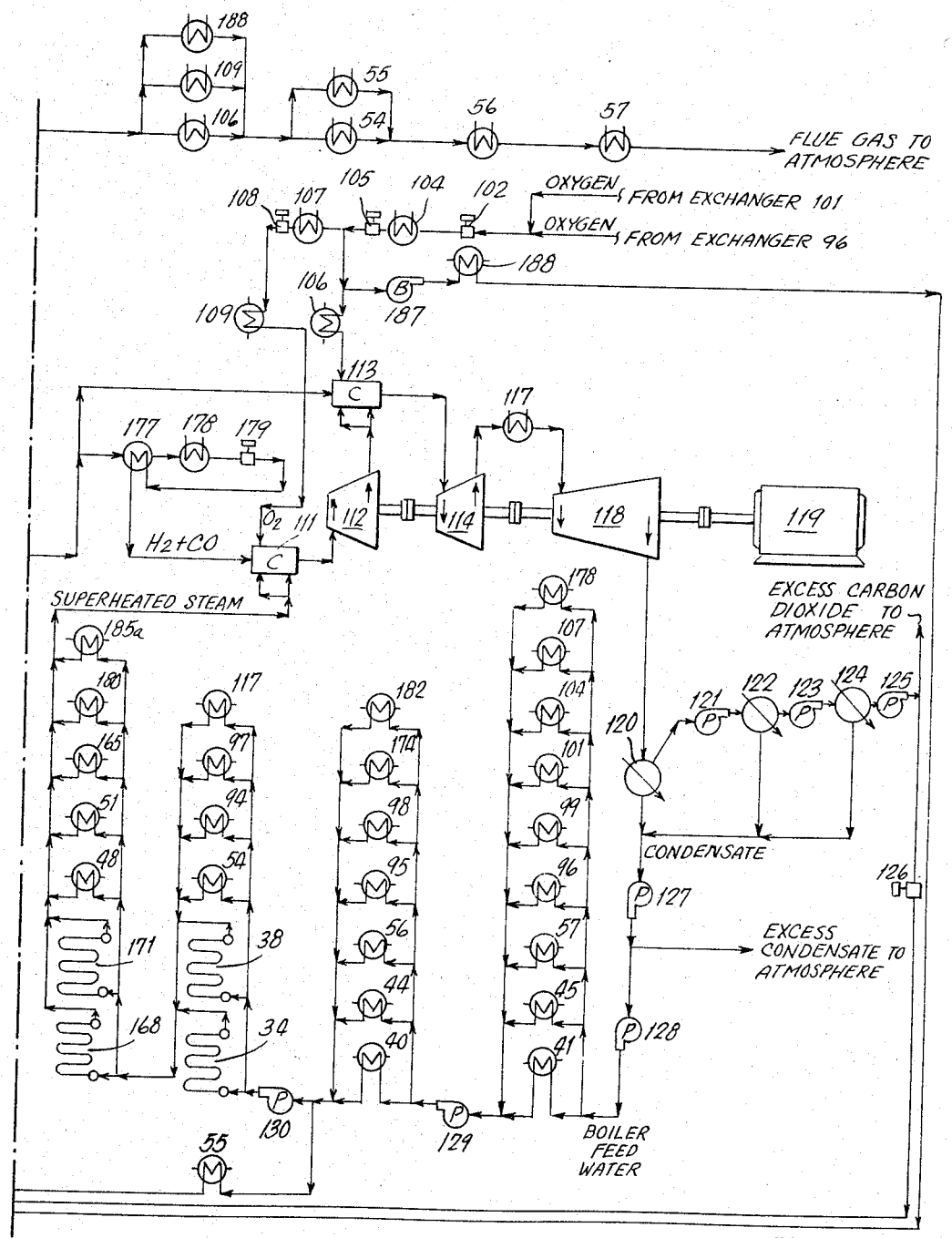

Reference may now be had to FIGS. 2a, 2b, and 2c (collectively termed FIG. 2), which, when assembled according to the arrangement designated FIG. 2 and depicted alongside FIG. 5, diagrammatically illustrate a preferred embodiment of my top heat cycle using bituminous coal which, for example, may contain the following ingredients, based on weight percent: moisture 5%, ash about 9%, volatiles about 37.1%, and fixed carbon about 48.9%, having a higher heating value at 60° F. of about 12,550 B.t.u. per pound and containing about 3.2% sulfur. Coal of this kind is extensively used in this country for thermal power generation in large plants.

Certain equipment items in FIG. 2 function substantially in the same manner as corresponding items of FIG. 1, and will not again be described or discussed in complete detail. They are reactors 32, 36, 61–64; exchangers 34, 38, 40, 41, 47, 48, 51, 54–57, 94–99, 101, 104, 106, 107, 109, 117, 120, 122, 124; valves 31b, 39, 65–93; pumps 121, 123, 125, 127–130; compressors 43, 46, 100, 102, 105, 108, 126; turbines 52, 112, 114, 118; combustors 50, 111, 113; pipe 60; drum 42; and electric generators 53 and 119.

The coal is finely ground so that substantially all of the coal will pass through a 200-mesh screen and is contained in an elevated bin 400. This is connected to a pair of lock hoppers 401a and 401b through valves 402a and 402b. The lock hoppers are connected to discharge into drum 404 through valves 403a and 403b.

At any given time one of the two hoppers 401a or 401b is at atmospheric pressure and is receiving coal from bin 400. At this time the other of the two lock hoppers is pressurized preferably by hydrogen supplied from blower 406 through line 405 and through valve 408a or 408b and is discharging coal through valve 403a or 403b into drum 404. Drum 404 is also pressurized from hydrogen line 405 and feeds coal continuously through gently curved line 407 into fluidized bed 142 housed in reactor 141.

Reactor 141 operates at an outlet pressure between about 300 and 800 p.s.i.a., and preferably between about 500 and 600 p.s.i.a., and at a temperature between about 1000° F. and 1700° F., and preferably at about 1400° F.

The reactor 141 preferably has the form of a frusto-conical chamber with a gradual taper and the smaller end at the bottom. A fluidized bed of approximately spherical coke pellets is maintained at 142 in the reactor 141 and is above a perforated grid plate 144. The coke pellets are in the size range from about 1/64 inch to about 3/4 inch, and are preferably from about 1/16 to about 3/8 inch. The nozzles 143 which deliver the coal to the bed extend above the grid 144, as shown in FIG. 2.

The fluidized bed is maintained by hydrogen which enters the reactor 141 below the grid plate 144 and reacts immediately on the coal introduced at the bottom of the bed.

The coal as it is introduced into the reactor 141 is "hydrocarbonized," i.e., it is carbonized in the presence of a high partial pressure of hydrogen. The carbonization is directed by the presence of hydrogen into reaction paths which lead to methane and coke as the primary carbonization products. Relatively small quantities of benzene and naphthalene are also produced, but the rich fuel gas which leaves the reactor 141 is essentially free of heavy tar substances. The quantity of carbon present in the rich fuel gas corresponds substantially to the carbon present in volatiles in the coal, as determined by conventional assay. The quantity of coke produced by the hydrocarbonization reaction corresponds substantially to the amount of fixed carbon in the coke.

The hydrocarbonization reactions which convert volatile carbon substantially to methane are extremely rapid, and for all practical purposes they are limited only by the system's ability to heat the feed coal particles to the temperature of the fluidized bed in reactor 141. Under the turbulent conditions prevailing near the bottom of the fluidized bed where coal feed is introduced, fuel is heated to reaction temperature in a very short time.

Substantially all of the coke produced is laid down as additional matter upon coke pellets near the point of coal entry to the bed. Thus no substantial amount of coal as such is present in the bed at any given moment. This is important, because the bituminous coal under consideration becomes extremely sticky if heated slowly through its plastic stage. The hydrocarbonization reaction as practiced in reactor 141 is thermally autogenic.

As above explained, reactor 141 is built with tapered sidewalls so that the cross section becomes larger toward the top of the fluidized bed in this reactor. The relationship between the coke particle size and gas fluidizing velocity in reactor 141 is adjusted so that the fluidizing velocity shall be in excess of the minimum fluidizing velocity by a controlled amount. The excess over the minimum fluidizing velocity at the bottom of the bed should be between about 20% and 200%, and preferably about 100%. The excess over the minimum fluidizing velocity at the top of the bed should be between about 10% and 100% and preferably about 20%. The taper of the sidewalls of the reactor is gauged to preserve these desired relationships between the actual fluidizing velocity and the minimum fluidizing velocity.

Coke pellets in reactor 141 grow in size because of the accretion of coke resulting from the hydrocarbonization reaction. Larger coke pellets are selectively withdrawn from the bed in the following manner. The major part of the hydrogen fluidizing gas to reactor 141 enters the fluidized bed across grid plate 144, but a minor part enters at the bottom of conical coke outlet 145 situated in the center of the grid plate. Coke pellets move downward through outlet 145. Outlet 145 is smaller at the bottom than at the top, so that the velocity of hydrogen rising through outlet 145 decreases toward the top. The rate of flow of hydrogen to conical outlet 145 is adjusted so that only larger coke pellets can move downward through this outlet, while smaller coke pellets are impelled upward by the flow of hydrogen and are returned to the main fluidized bed above grid plate 145. Adjustment of velocity of hydrogen to conical coke outlet 145 provides a means of achieving the above-described desired relationship between coke particle size and gas fluidizing velocity in reactor 141. A further optional means which may be used to aid in achieving the desired relationship is the addition of "seed" coke particles of a selected size and at a selected rate to reactor 141.

A minor portion of the coke produced in reactor 141 descends by gravity flow through line 146a and into reactor 147a, which houses moving coke bed 148a. Reactor 147a contains a generally horizontal dividing partition 150a, which supports the downwardly moving coke bed 148a. A pool of water 152a occupies the lowest part of reactor 147a. Multiple tuyeres 153 introduce rich fuel gas together with a gasifying medium, consisting of steam and oxygen, into coke bed 148a. The tips of the tuyeres are protected by cooling water in passages 154. A "raceway" forms in front of each tuyere, that is a cavity within which coke particles fly about and are consumed by gasification reactions—partial combustion of coke with oxygen and the reaction of carbon dioxide and water vapor with coke. Also methane, benzene, naphthalene and other hydrocarbon components of the rich fuel gas are partially combusted with oxygen in and near the raceways, converting these hydrocarbons substantially to hydrogen and carbon monoxide. Gases leaving the several raceways are so hot that further gasification of coke occurs by reaction of carbon dioxide and water vapor as the gases pass upward through the coke bed. Hydrogen and carbon monoxide leave reactor 147a from the freeboard space above coke bed 148a.

Ash present in the coke melts within and near the raceways to form molten slag, which flows downward through an opening 149a in partition 150a and falls into water pool 152a. The upper surface of partition 150a and the edge of taphole 149a are protected by cooling water in passages 151a.

The sudden quenching of the slag in pool 152a causes it to break apart into a frit. Water is pumped continuously to pool 152a by pump 155a. Water containing frit in suspension passes out of pool 152a via coil 156a, which leads to the atmosphere. Coil 156a is made sufficiently long so that the quantity of water required from pump 155a, in order to establish the necessary pressure drop along the coil, shall not be greatly in excess of the amount of water needed to convey the frit in suspension.

A small quantity of hydrogen and carbon monoxide is introduced into the gas space between partition 150a and water pool 152a, in order both to prevent coke from falling through the taphole 149a and also to prevent the circulation of hot gases from coke bed 148a into the gas space below.

In practice, not quite all slag drops freely from taphole 149a into water pool 152a. There is a tendency for slag "beards" to form, i.e., stalactites of solid slag hanging from the edge of taphole 149a. Movable arm 158a can advantageously be used to knock off such beards, when they are seen through sightglass 157a. Valves 159a and 161a, working in conjunction with letdown hopper 160a, may be used to draw off slag beards from pool 152a and to discharge them to the atmosphere.

Burner 162a provides a means of playing a flame upon taphole 149a if it shows signs of freezing over. Rich fuel gas and gasifying medium are the combustants in burner 162a.

In the case of many coals, a fluxing medium (such as blast furnace slag, for example) must be added in order to successfully slag off the ash in a slagging gasifier of the type exemplified by reactor 147a. The fluxing medium should be finely ground, so that substantially all of it will pass through a 325-mesh screen, and fed along with coal to reactor 141, where the fluxing medium is incorporated directly into the coke pellets which feed gasifier 147a.

A major portion of coke produced in reactor 141 descends through line 146b into reactor 147b, which houses moving coke bed 148b. Coke is gasified by a gasification medium introduced into coke bed 148b via multiple tuyeres 163, the tips of which are protected by cooling water in passages 164. The gasification medium is air somewhat depleted in oxygen and enriched with carbon dioxide by virtue of the air's having been used, in large excess, to support the combustion of a lean fuel gas. Equipment items 149b through 152b, and 155b through 161b, function in the same manner as their counterparts 149a through 152a, and 155a through 161a, already described. Burner 162b uses rich fuel gas and air to play a flame as needed upon taphole 149b.

Gaseous effluent from slagging gasifier 147b is a lean fuel gas, which is first cooled in heat-exchanger 180

(against steam), and then sent in larger part to reactor 27, where it is introduced into fluidized bed 28 via nozzles 180. A small quantity of lean fuel gas is introduced into the gas space between partition 150b and water pool 152b. A minor part of the lean fuel gas is further cooled in heat-exchangers 181 and 182 (against itself and BFW respectively), boosted in pressure by blower 183, reheated in heat-exchanger 181 (against itself), and combusted with an appreciable excess of air in combustor 184.

Combustor 184 produces air somewhat depleted in oxygen and enriched with carbon dioxide, which is cooled in heat-exchangers 185a and 185b (against high-pressure and intermediate-pressure steam respectively), and used as the gasifying medium at tuyeres 163 in reactor 147b.

Hydrogen and carbon monoxide from reactor 147a is cooled in heat-exchanger 165 (against steam). A minor portion is added to carbon dioxide which serves as the fluidizing gas to fluidized bed 33. The major portion is admixed with steam, and used as the fluidizing gas to fluidized bed 167 housed in reactor 166. The fluidized solid in reactor 166 consists of $CaO \cdot MgO$, $CaS \cdot MgO$, and $CaCO_3 \cdot MgO$. Fluidized bed 167 operates between about 1100° F. and 1600° F., and preferably at about 1500° F. Reactions 1, 2, and 4 occur in bed 167, thereby substantially purifying the hydrogen and carbon monoxide and converting a portion of the carbon monoxide into hydrogen. Heat generated in bed 167 is removed (to steam) by heat-transfer surface 168 mounted therein.

A major portion of the off-gas from bed 167 is sent to combustors 111 and 113, and a minor portion is sent to combustor 50. Gas destined for combustor 111 is first cooled in heat-exchangers 177 and 178 (against itself and against BFW respectively), compressed in compressor 179, and reheated in heat-exchanger 177 (against itself).

A second minor portion of off-gas from bed 167 is admixed with additional steam and is used as the fluidizing gas to fluidized bed 170 housed in reactor 169. The quantity of additional steam is adjusted to be approximately equal to the quantity of carbon monoxide which remains in the gas. The fluidized solid in reactor 169 consists of $CaO \cdot MgO$, $CaS \cdot MgO$, and $CaCO_3 \cdot MgO$. Fluidized bed 170 operates between about 1100° F. and 1300° F., preferably at about 1100° F., but not at a temperature so low that the partial pressure of steam entering fluidized bed 170 exceeds the decomposition pressure of calcium hydroxide at the temperature of this bed. If such pressure were exceeded, decrepitation of the fluidized solid would occur. Reaction 2 occurs in reactor 169, and gaseous effluent from reactor 169 is substantially hydrogen. Heat generated in bed 170 is removed (to steam) by heat-transfer surface 171 mounted therein. Off-gas from reactor 169 is cooled in heat-exchangers 173 and 174 (against itself and BFW respectively), boosted in pressure in blower 175, reheated in heat-exchanger 173 (against itself), and used as the fluidizing gas in reactor 141.

Active solid, in form of $CaO \cdot MgO$ and $CaS \cdot MgO$, enters reactor 169 via solid-flow-regulating valve 31a from aerated standpipe 58. Partially spent solid passes from reactor 169 to reactor 166 via solid-flow-regulating valve 172. Spent solid passes from reactor 166 through aerated standpipe 59, via solid-flow-regulating valve 26, into fluidized-bed 28 housed in reactor 27.

Air depleted in oxygen is the fluidizing gas to fluidized-bed 28, in which this gas supports the partial combustion of lean fuel gas from gasifier 147b. The gas is substantially purified of sulfur by Reaction 1, and carbon dioxide is expelled from $CaCO_3 \cdot MgO$. Off-gas from reactor 27 is a lean fuel gas containing a substantial amount of carbon dioxide. The operating temperature of reactor 27 must be sufficiently high so that the decomposition pressure of the species $CaCO_3 \cdot MgO$ is higher than the partial pressure of carbon dioxide in off-gas from reactor 27. The necessary operating temperature in reactor 27 is related to the amount of steam added to hydrogen and carbon monoxide committed to reactor 166; this relationship is discussed below.

Off-gas from fluidized-bed 28 carries active solid in dilute-phase transport upward through pipe 29 into cyclone-separator 30, which delivers solid to aerated standpipe 58.

A portion of oxygen from compressor 105 is boosted in pressure by blower 187, heated in heat-exchanger 188 (against flue gas), and used as part of the gasification medium in reactor 147a.

Low-pressure BFW from pump 128 is in part heated in heat-exchanger 178 (against hydrogen). Intermediate-pressure BFW from pump 129 is in part heated in heat-exchangers 174 and 182 (against hydrogen and lean fuel gas respectively). High-pressure water is heated in part by heat-transfer surfaces 168 and 171 (against fluidized beds 167 and 170 respectively), and in heat-exchangers 165, 180, and 185a (against hydrogen and carbon monoxide, lean fuel gas, and air depleted in oxygen and enriched with carbon dioxide, respectively).

Intermediate-pressure steam is heated in heat-exchanger 185b against air depleted in oxygen and enriched with carbon dioxide, and is used as part of the gasification medium in reactor 147a.

Flue gas from expansion turbine 52 is cooled in part in heat-exchanger 188 (against oxygen).

If 1600° F. is used as the temperature at the inlets to the various power-producing fluid expansion turbines, I believe there is advantage in converting some carbon monoxide to hydrogen in reactor 166—i.e., I believe there is advantage in adding steam to the raw hydrogen and carbon monoxide entering this reactor. It would not be advantageous to convert all of the carbon monoxide to hydrogen, because some carbon dioxide must be supplied from compressor 126 to reactor 32. The limitation on the quantity of carbon monoxide which can be converted arises from a limitation on the operating temperature level in fluidized bed 28. If additional carbon monoxide is converted, the partial pressure of carbon dioxide in gaseous effluent from bed 28 must increase. Hence, bed 28 must operate at a higher temperature. Eventually, a temperature is reached at which the activity of the solid is impaired. That is to say, dolomite which has been calcined at too high a temperature exhibits poor reactivity for Reactions 1 and 2. The calcination temperature at which activity starts to suffer is not well defined, but I believe it to be in the neighborhood of 1900° F. Therefore, 1850° F. is a safe operating temperature. If the temperature at the inlets to the various turbines is set at 1600° F., I now believe that an optimum design based upon FIG. 2 will operate at as high a temperature as possible in reactor 27 and will convert a substantial quantity of carbon monoxide to hydrogen in reactor 166. Notice is directed to the fact that the quantity of carbon monoxide converted to hydrogen may be increased, within limits, by lowering the operating pressure level in reactors 141, 147a, 147b, 27, 32, 36, 166, and 169. The optimum design parameters will vary depending upon the relative costs of fuel and of carrying charges on capital.

At turbine inlet temperatures appreciably higher than 1600° F., the advantage of converting carbon monoxide to hydrogen in reactor 166 disappears. If a design is made for very high turbine inlet temperatures, no steam should be added to hydrogen and carbon monoxide ahead of reactor 166, and the only conversion of carbon monoxide to hydrogen in this reactor should be that which occurs adventitiously on account of the presence of water vapor in gas from gasifier 147a.

When high turbine-inlet temperatures are specified, I believe there is advantage in raising the temperature in reactor 166 to a level such that Reactions 2 and 4 occur to little, if any, extent.

In the coal embodiment of FIG. 2, the hydrocarbonization step (reactor 141) serves the same general function as the hydrocracking step of FIG. 1 (reactor 4), in the respect that these steps put a major part of the fuel's hydrogen values into a path which leads to water condensed in condenser 120. These steps limit the quantity of hydrogen in paths leading to flue gas. Use of carbon dioxide as a gasifying medium in coke-gasifier 147b, rather than steam, is advantageous in limiting the amount of water vapor in flue gas from the cycle.

Figure 3B:
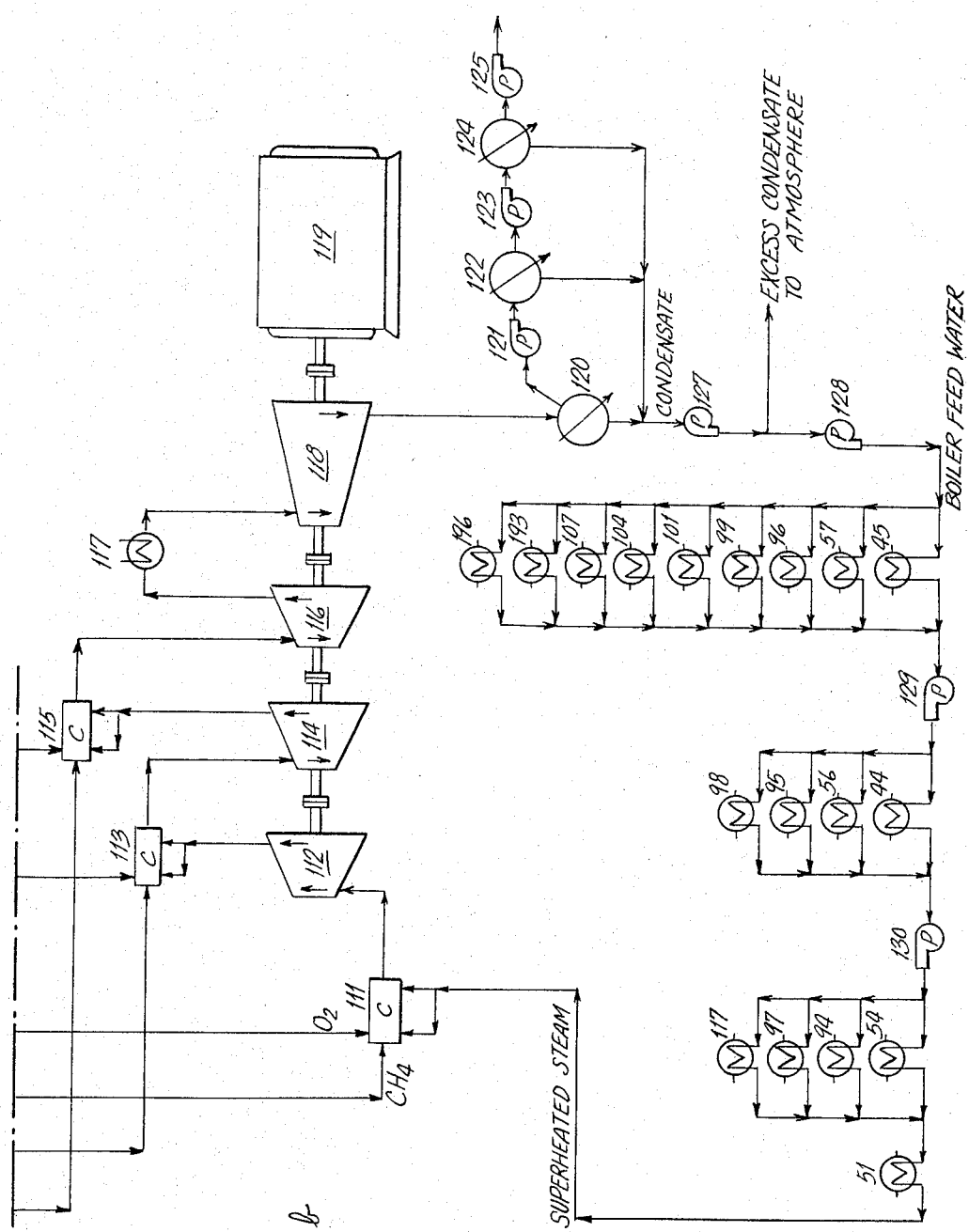

FIGS. 3a and 3b (collectively termed FIG. 3), when joined according to the arrangement designated FIG. 3 and depicted alongside FIG. 5, diagrammatically illustrate a preferred embodiment of my power cycle burning natural gas, or other clean gaseous fuel containing not too much nitrogen.

Certain equipment items in FIG. 3 function substantially in the same manner as corresponding items of FIG. 1, and will not again be described or discussed in complete detail. They are: reactors 61–64; exchangers 44, 45, 47, 51, 54, 56, 57, 94–99, 101, 103, 104, 106, 107, 109, 117, 120, 122, 124; valves 65–93; pumps 121, 123, 125, 127–130; compressors 43, 46, 100, 102, 105, 108; turbines 49, 52, 112, 114, 116, 118; combustors 50, 111, 113, 115; and electric generators 53 and 119.

Natural gas is compressed in compressor 191. A portion is heated to about 900° F. in heat-exchanger 192 (against flue gas), and committed in part to combustor 50 and in part to combustor 115. A second portion is cooled in heat-exchanger 193 (against BFW), and further compressed in compressor 194; and in part this second portion is heated to about 900° F. in heat-exchanger 195 (against flue gas) and committed to combustors 113 and 199; and in part the second portion is cooled in heat-exchanger 196 (against BFW), compressed in compressor 197, heated to about 900° F. in heat-exchanger 198 (against flue gas), and committed to combustor 111.

Natural gas from compressor 194 and air from compressor 46 are burned in combustor 199 to raise the temperature of air depleted in oxygen from one of oxygen absorber-desorbers 61 through 64, as shown in FIG. 1, to the desired temperature at the inlet of expansion turbine 49.

Low-pressure BFW from pump 128 is in part heated in heat-exchangers 193 and 196 (against natural gas).

Flue gas from expansion turbine 52 is cooled in part in heat-exchangers 192, 195 and 198 (against natural gas).

If natural gas or other suitable fuel gas is available at an elevated pressure, it may be found that one or both of compressors 191 and 194 may be omitted.

Figure 4:
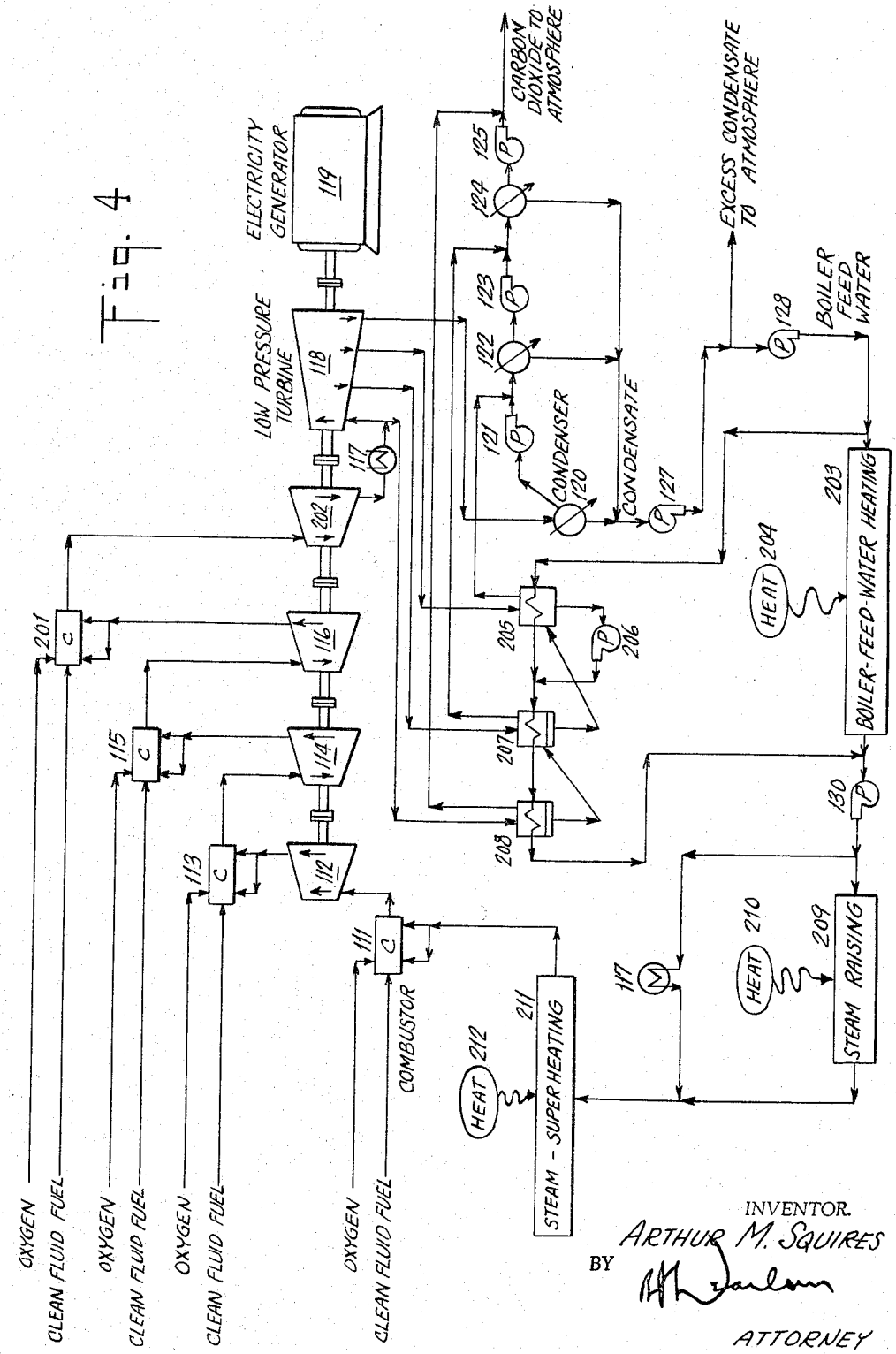
FIG. 4 is a diagrammatic illustration of the steam-and-carbon-dioxide portion of the cycle of my invention.

FIG. 4 provides a general illustration of my new cycle. Certain equipment items in FIG. 4 function substantially in the same manner as corresponding items of FIG. 1, and will not again be described or discussed in complete detail. They are exchangers 120, 122, 124; pumps 121, 123, 125, 127; and electric generator 119.

Combustors 111, 113, 115, and 201 furnish heat from the combustion of a clean fluid fuel with oxygen to raise steam temperatures at the inlets of steam expansion turbines 112, 114, 116, and 202. By the term "clean fluid fuel," I mean substantially free of sulfur and ash substances and particulate matter. By "oxygen," I mean a gas containing oxygen as the primary component, preferably at a concentration of at least 95 mole percent.

Additional combustors like 111, 113, 115, and 201 and corresponding additional turbines like 112, 114, 116, and 202 may be furnished, if desired. For a given initial steam pressure to expansion turbine 112, use of a greater number of reheat steps (i.e., a greater number of combustors and turbines and a smaller pressure drop across each turbine) will result in a higher overall thermal efficiency of the cycle. In two particular examples using natural gas and using an initial steam pressure of 2400 p.s.i.a. and a turbine inlet temperature of 1600° F., an arrangement employing six turbines (with inlet pressures 2400, 1168.5, 568, 277.1, 134.4 and 65.2 p.s.i.a.) requires approximately three percent less fuel than an arrangement employing three turbines (with inlet pressures 2400, 560, and 92.3 p.s.i.a.).

Turbine 202 discharges gas (primarily steam, together with some carbon dioxide) at a pressure a little above atmospheric. The temperature of this gas is generally so high that its further expansion to the condensing pressure which is allowed by the available atmospheric cooling water would not cool the gas to the condensing temperature. It is generally desirable, therefore, to cool effluent from turbine 202 in heat-exchanger 117 (against BFW). The presence of heat-exchanger 117 is not essential to the working of my cycle, but it is worthwhile for the improvement in thermal efficiency which it affords. One might regulate the operation of the several combustors and the several turbines so that expansion of effluent from turbine 202 to condensing pressure in condenser 120 will lower its temperature to the neighborhood of the available condensing temperature. If operation of combustors and turbines is so regulated, heat-exchanger 117 is not needed. But in my experience, higher thermal efficiency is achieved by regulating the operation of the several combustors and turbines so that steam leaves turbine 202 so hot as to require cooling ahead of turbine 118.

Pump 128 raises BFW to a pressure such that it can receive heat 204 in step 203 without boiling. A portion of BFW from pump 128 is heated regeneratively (against condensing steam) in BFW heaters 205, 207, and 208. Heater 208 receives a small bleed of gas from the stream entering low-pressure expansion turbine 118, and heaters 207 and 205 receive bleeds of gas from stages of turbines 118 at pressures intermediate between the inlet and discharge of this turbine. Steam condenses from the respective bleeds in heaters 205, 207, and 208, the latent heat of condensation serving to heat BFW passing through these heaters. Carbon dioxide is vented to the atmosphere from heater 208, and the pressure levels of heaters 207 and 205 are chosen so that carbon dioxide may be sent from these heaters to the discharge of vacuum pumps 123 and 121 respectively. Water resulting from the condensation of steam in heater 205 is pumped in pump 206 into the stream of BFW leaving heater 205. Heaters 207 and 208 are of the "drain-cooled" variety, that is, water resulting from condensation of steam is cooled by counter-current heat-exchange with BFW entering the heater, and the water is then sent to the preceding heater in the series of heaters.

Use of heaters like 205, 207, and 208 may be found desirable in plant designs based upon the arrangements of FIGS. 1, 2, and 3. In general, however, the opportunity for use of BFW heaters of these kinds in my new cycle is restricted by comparison with present-day conventional steam power plant. This fact is brought about primarily by the necessity of using up low-level heat from flue gases for BFW heating. Air to the new cycle is preheated by work of compression, and low-level flue-gas heat cannot be used for air preheating. In addition, some compression heat must be taken up by low-pressure BFW from pump 128. The opportunity for regenerative heating of BFW is increased if the inlet to the various second-stage and third-stage compressors (such as 194, 197, 46, 102, 105, and 108 of FIG. 3a) is made higher.

BFW from step 203 and from heater 208 is pumped in pump 130 to a pressure several hundred p.s.i. higher than the desired pressure at the inlet to expansion turbine 112. Steam is raised by addition of heat 210 in step 209 and also in heat-exchanger 117 (against effluent from turbine 202). Steam is superheated by addition of heat 212 in step 211.

A variety of sources of heat may be considered for items 204, 210, and 212, viz., heat from combustion of a fuel with air, nuclear heat, geothermal sources of heat, waste heat from exhaust gases from a gas-turbine power plant, waste heat from exhaust gases from a magnetohydrodynamic device generating electricity, waste heat from a chemical process or a metallurgical operation, heat from arrangements for cooling turbine blades to permit higher turbine-inlet temperature, and others.

A preferred source of heat for one or more of items 204, 210, and 212 is waste heat from a process supplying oxygen to combustors 111, 113, 115, and 201.

Typical clean fluid fuels which might be available for a power installation are natural gas, distillate fuels of a wide range of gravity, alcohols, and various byproduct gases (such as a coke-oven gas, refinery gas, gas from an electrometallurgical operation) following removal of sulfur.

Most thermal power stations, however, must operate on "dirty" fuels, viz., coal or heavy residual fuel oil. Such dirty fuels may be converted to clean gaseous fuel by a variety of known means comprising a first operation in which the fuel is gasified to a raw fuel gas at high temperature, a second operation in which the raw fuel gas is cooled, and a third operation in which the raw gas is cleaned of sulfur compounds at a relatively low temperature. Heat from the second operation can be used for purposes 204, 210, and possibly 212 of FIG. 4. Of the various known means of removing sulfur compounds from fuel gas, most reject waste heat at such low temperature levels that the heat is either useless for the purposes of FIG. 4, or at best usable only for purpose 204. Plants providing a clean fuel will in general include apparatus for producing elemental sulfur from a stream rich in hydrogen sulfide, and waste heat from such apparatus is also a preferred source of heat for one or more items 204, 210, and 212.

In general, from the point of view of my new cycle, processes supplying oxygen or generating clean fuel will be preferred which reject waste heat at high temperature levels, and in small amounts, over processes which reject heat at low temperatures, and in large amounts. In other words, heat available at the level of heat 212 in FIG. 4 is more valuable than heat available at 204. For this reason, my method of removing sulfur by use of Reaction 1, following by generation of hydrogen sulfide by Reaction 3, is preferable to the various known means of cleaning a fuel gas of sulfur compounds. Also, my absorption-desorption method of supplying oxygen is preferable to the conventional low-temperature rectification of air, which rejects waste heat only at a low temperature level.

FIG. 5 shows an alternate arrangement for the "steam" turbines in my cycle. Superheated steam is heated in partial combustor 215 by the combustion of combustant A, in great excess, with combustant B. One of combustant A or B is oxygen, and the other is a clean fluid fuel. The hot stream from partial combustor 215 enters expansion turbine 213, which is fitted with a series of internal nozzles 214, situated between rows of turbine blades, for the introduction of additional small quantities of combustant B at successive stages in the expansion process. Thus, combustion occurs within turbine 213, maintaining the temperature of the expanding gas stream at a temperature very close to the inlet temperature, through at least a portion of turbine 213. Exchanger 117, turbine 118, and electric generator 119 function substantially in the manner previously described.

FIGS. 6a, 6b, and 6c (collectively termed FIG. 6), when joined according to the arrangement designated FIG. 6 and appearing alongside FIG. 5, diagrammatically illustrate an alternative embodiment of my cycle employing natural gas, which may be preferred to FIG. 3 if the turbine inlet temperature is set at a level in the general neighborhood of 1600° F. In FIG. 6, a portion of natural gas charged to the cycle is converted to hydrogen, which is used as fuel to combustors 111, 113, and 115. Comparing an example of FIG. 6 with an example of FIG. 3, in both of which examples a turbine-inlet temperature of 1600° F. was used, along with pressures of 2400, 560, and 92.4 p.s.i.a. at the inlets of turbines 112, 114, and 116 respectively, I found a saving in fuel of about 2.5 percent for FIG. 6 over FIG. 3. Offsetting this indicated advantage is the greater complexity and probably higher capital cost of FIG. 6. In areas of high fuel costs, FIG. 6 may be preferred to FIG. 3. In areas of low fuel costs, the higher carrying charges for capital expanded upon FIG. 6 may mitigate against its use.

At turbine inlet temperatures considerably higher than 1600° F., FIG. 3 is the preferable embodiment.

Certain equipment items in FIG. 6 function substantially in the same manner as corresponding items of FIGS. 1, 2, and 3, and will not again be described or discussed in complete detail. From FIG. 1, these items are: reactors 61–64; exchangers 25, 44, 45, 47, 48, 51, 54–57, 94–99, 101, 103, 104, 106, 107, 109; valves 65–93; pumps 127–130; compressors 43, 46, 100, 102, 105, 108; turbines 49, 52, 112, 114, 116, 118; combustors 24, 111, 113, 115; and electric generators 53 and 119. From FIG. 2, these items are: exchangers 177, 178, 188; compressor 179; and blower 187. From FIG. 3, these items are: exchangers 192, 193, 195; and compressors 191 and 194.

In FIG. 6, natural gas from compressor 194 is committed in part to partial combustor 24, along with oxygen; and gas is committed in part to fluidized bed 28, in reactor 27, via nozzles 180. Effluent from partial combustor 24, predominantly hydrogen and carbon monoxide, is cooled in heat exchanger 25 (against steam), admixed with steam in an amount approximately equal to the carbon monoxide content of the gas, and introduced as fluidizing gas into fluidized bed 167 housed in vessel 166. Fluidized bed 167 preferably operates at about 1500° F. A major portion of carbon monoxide is converted to hydrogen in this bed by Reaction 2. Heat of the reaction is removed (to steam) across heat-transfer surface 168 mounted in the bed. Gaseous effluent from bed 167 passes as fluidizing gas into fluidized bed 170 housed in vessel 169 and containing heat-transfer surface 171. Fluidized bed 170 preferably operates at about 1100° F. and at an outlet pressure of about 57° p.s.i.a. The remaining carbon monoxide is substantially all converted to hydrogen in bed 170, and effluent from bed 170 is substantially hydrogen. Heat is removed (to steam) from bed 170 across heat-transfer surface 171. Active solid, CaO·MgO, enters vessel 169 via solid-flow-regulating valve 31 from aerated standpipe 58. Solid partially converted to CaCO$_3$·MgO passes from vessel 169 to vessel 166 through solid-flow-regulating valve 172. Spent solid, consisting largely of CaCO$_3$·MgO, passes from vessel 166 through aerated standpipe 59 and across solid-flow-regulating valve 26 into fluidized bed 28 housed in vessel 27, where heat of combustion of natural gas and air depleted in oxygen expels carbon dioxide from the solid. Fluidized bed 28 preferably operates at about 1830° F. Gaseous effluent from vessel 27, a flue gas rich in carbon dioxide, carries solid upward in dilute-phase transport through line 29 and into cyclone-separator 30, which delivers solid to standpipe 58.

Hydrogen from reactor 169 is committed along with oxygen and superheated steam to combustors 111, 113, and 115. Hydrogen destined for combustor 115 is first combusted with a small amount of oxygen (insufficient for complete combustion) in partial combustor 217 and expanded in expansion turbine 218.

Vacuum pump 219 discharges non-condensible gases from condenser 120 to the atmosphere.

FIGS. 7a, 7b, and 7c (collectively termed FIG. 7), when joined according to the scheme labelled FIG. 7 and set down alongside FIG. 5, constitute an alternative embodiment of my cycle employing heavy residual fuel oil. This embodiment is well suited for the production of a byproduct stream of high-purity hydrogen, and such production is illustrated in FIG. 7. This embodiment also illustrates the use of low-temperature rectification of air for production of oxygen for my cycle.

Certain equipment items in FIG. 7 function substantially in the same manner as corresponding items of FIGS. 1, 2, and 4, will not again be described or discussed in complete detail. From FIG. 1, these items are: reactor 36; exchangers 3, 25, 38, 40, 41, 45, 48, 51, 54–57, 103, 104, 106, 107, 109, 117, 120, 122, 124; pumps 1, 121, 123, 125, 127–130; compressors 105, 108, 126; turbines 49, 52, 112, 114, 116, 118; combustors 24, 50, 111, 113, 115; drum 42; and electric generators 53 and 119. From FIG. 2, these items are: exchangers 166, 177, 178, 188; compressor 179; and blower 187. From FIG. 4, these items are: exchangers 205, 207, 208; and pump 206.

Oil pumped in pump 1 is heated to about 700° F. in heat-exchangers 221 and 3 (against flue gas). The oil in part is admixed with steam and committed, along with oxygen, to partial combustor 24; and in part, it is admixed with lean fuel gas and introduced via nozzles 180 into fluidized bed 28 housed in reactor 27. Effluent from partial combustor 24, predominantly hydrogen and carbon monoxide, is cooled in heat-exchanger 25 (against steam). A minor portion is added to a mixture of carbon dioxide and steam which serves as fluidizing gas to fluidized-bed 37 housed in reactor 36. A second minor portion is blended with steam and serves as fluidized gas to fluidized bed 33' housed in reactor 32'. The major portion is admixed with a small quantity of steam, and introduced as fluidizing gas into fluidized bed 167 housed in vessel 166.

Fluidized bed 167 preferably operates at about 1500° F. Active solid in bed 167 is $CaO \cdot MgO$, together with $CaS \cdot MgO$ and $CaCO_3 \cdot MgO$. Sulfur is removed from the gas by Reaction 1, and carbon dioxide is removed by Reaction 4. Reaction 2 serves to convert a portion of carbon monoxide in the gas to hydrogen, while at the same time substantially removing steam from the gas. The major portion of effluent from bed 167, consisting of high-purity hydrogen and carbon monoxide, is committed to combustors 111, 113, and 115. Gas destined for combustor 115 is first combusted with an insufficient amount of oxygen in partial combustor 237 and expanded in expansion turbine 238.

A minor portion of effluent from bed 167 is admixed with steam and used as fluidizing gas to fluidized bed 223 housed in vessel 222 and containing heat-transfer surface 224. Off-gas from bed 223 serves as fluidizing gas to fluidized bed 226 housed in vessel 225 and containing heat-transfer surface 227. Off-gas from bed 226 is by-product hydrogen of a purity which is determined by the quantity of steam added to the gas stream ahead of vessel 222, and also by the operating temperature levels in beds 223 and 226; these matters are discussed below. Active solid, consisting primarily of $CaO \cdot MgO$ and $CaS \cdot MgO$, enters vessel 225 via solid-flow-regulating valve 31c, from aerated standpipe 58, which also delivers solid via solid-flow-regulating valve 31a to vessel 166. Solid flows from vessel 225 to vessel 222 via solid-flow-regulating valve 228; and from vessel 222 to vessel 166, via solid-flow-regulating valve 229.

Oil undergoes partial combustion with air in vessel 27, the heat of the reaction expelling carbon dioxide from solid which enters fluidized bed 28 from aerated standpipes 59 and 60. Substantially all sulfur in the oil is absorbed in the form $CaS \cdot MgO$. Gaseous effluent from vessel 27 is a lean fuel gas, which carries solid in dilute-phase transport upward through pipe 29 into cyclone-separator 30, which delivers solid to aerated standpipe 58. Lean fuel gas from cyclone 30 is cooled in heat-exchanger 48 (against steam). A minor portion is cooled in heat-exchangers 233, 234, and 235 (against steam, itself, and BFW, respectively), boosted in pressure in blower 236, reheated in heat-exchanger 234 (against itself), and added to oil to be introduced via nozzles 180 into fluidized bed 28.

Solid, consisting primarily of $CaO \cdot MgO$ and $CaS \cdot MgO$, enters fluidized bed 33' housed in reactor 32' from standpipe 58 via solid-flow-regulating valve 31b. The major constituents of the fluidizing gas to bed 33' are hydrogen, carbon monoxide, and steam. Carbon monoxide and steam react with the active solid according to Reaction 2, thereby converting $CaO \cdot MgO$ to $CaCO_3 \cdot MgO$. The molar quantities of carbon monoxide and steam in the gas to bed 33' are both adjusted to be in considerable excess over the molar quantity of $CaO \cdot MgO$ present in solid entering the bed 33'. The excess carbon monoxide and steam partly react according to the water gas shift reaction:

$$CO + H_2O = CO_2 + H_2 \qquad (5)$$

since the solids present in bed 33' are catalytic with respect to this reaction. Gaseous effluent from bed 33', accordingly, contains carbon dioxide as well as hydrogen, carbon monoxide, and steam. This effluent is introduced into fluidized bed 167 via nozzle 220, situated partway between top and bottom of this bed. Bed 33' should operate at as low a temperature level as possible without incurring risk of formation of calcium hydroxide.

The function of bed 33' in FIG. 7 is the same as the function of bed 33 in FIGS. 1 and 2, viz., to convert substantially all reactive values of $CaO \cdot MgO$ in the solid to $CaCO_3 \cdot MgO$, before the solid is subjected to the conditions of fluidized bed 37 housed in reactor 36. The arrangement of FIG. 7 is advantageous if the flowsheet is arranged to convert a substantial amount of carbon monoxide to hydrogen by means of Reaction 2. If this is done, the active solid leaving standpipe 58, under best operating practice, will contain a substantial proportion of $CaO \cdot MgO$. Accordingly, if the arrangement of FIGS. 1 and 2 is used, a large amount of carbon dioxide must be handled by compressor 126, in order to supply sufficient carbon dioxide to satisfy the requirements of bed 33. The size of compressor 126 can be reduced, under these circumstances, by adopting the arrangement of FIG. 7.

Air is compressed in compressor 43, typically to about 65 p.s.i.a. Part of the air is committed to combustor 50, and part is cooled in heat-exchanger 45 (against BFW) and in heat-exchanger 230 (against atmospheric cooling water), and is committed to known apparatus for the low-temperature rectification of air. The rectification of air produces a waste stream of nitrogen and a product stream of oxygen, which is compressed in compressor 232 to a pressure somewhat higher than the pressure of combustor 115, for example about 90 p.s.i.a.

Part of the air from exchanger 45 is further compressed in compressor 46, heated in exchanger 47 (against flue gas) preferably to about 1000° F., and used as fluidizing gas to fluidized bed 28.

Intermediate-pressure BFW from pump 129 is in part heated in heat-exchanger 235 (against lean fuel gas). High-pressure BFW from pump 130 is in part heated first by heat-transfer surface 227 (against fluidized bed 226), and then by heat-transfer surface 224 (against fluidized bed 223), and in heat-exchanger 233 (against lean fuel gas.)

Flue gas on its way to the atmosphere from turbine 52 is cooled, in part, in heat-exchanger 47 (against air) and 221 (against oil feed).

The quantity of steam which may be added to crude hydrogen and carbon monoxide ahead of fluidized bed 167 is limited in the example of FIG. 7 by comparison with a flowsheet in which air depleted in oxygen, from a manganic-oxide-oxygen-absorber-desorber, is used as part of the fluidizing gas to fluidized bed 28. The total flow of gas through bed 28 is less in the example of FIG. 7, and so the quantity of carbon dioxide which may be expelled from $CaCO_3 \cdot MgO$ (at any given combination of total operating pressure and temperature) is less. One might use nitrogen waste from the low-temperature rectification of air as a portion of the fluidizing gas to bed 28;

but this does not seem to make for improved cycle efficiency, since the advantage of the greater allowable conversion of carbon monoxide to hydrogen in bed 167 is offset by the fuel required to raise the temperature of nitrogen waste to the level of bed 28. I believe, however, that the advantage of converting carbon monoxide to hydrogen exists at turbine-inlet temperature in the neighborhood of 1600° F., but decreases and ultimately disappears at higher temperatures. Hence, at very high turbine inlet temperatures, the limitation on the quantity of steam which may be added ahead of fluidized bed 167 is not a disadvantage.

The purity of byproduct hydrogen, from fluidized bed 226, with respect to content of carbon oxides and of hydrogen sulfide, depends upon the quantity of steam added prior to fluidized bed 223 and upon the operating temperature levels in beds 223 and 226. Generally speaking, the temperatures should be as low as possible in each of these two beds, but the partial pressure of water vapor should not be allowed to exceed the decomposition pressure of calcium hydroxide. Thus, the lowest safe operating temperature of bed 223 will be determined by the amount of steam added prior to this bed, and the temperature of bed 226 will be determined by the amount of unconverted steam leaving bed 223. Bed 223 may usually operate in the temperature range from about 1200° F. to 1300° F., if the pressure level is in the preferred range from about 500 to about 600 p.s.i.a.; and bed 226 may usually operate in the temperature range from about 950° F. to about 1050° F.

The quantity of steam added prior to bed 223 will be determined in part by the amount of steam added prior to bed 167, since the latter amount of steam affects the quantity of carbon monoxide entering bed 223.

A primary consideration governing the quantity of steam which one will wish to add prior to bed 223 is the quality of the byproduct hydrogen which one desires. If a few percent of carbon oxides may be tolerated in the byproduct hydrogen, the quantity of hydrogen sulfide in the hydrogen may be kept very low by adjusting the steam quantity added prior to bed 223 to a value somewhat less than the carbon monoxide content of the gas at this point. On the other hand, if a very low content of carbon oxides is desired, this may be achieved by adding a quantity of steam in small excess of the carbon monoxide content; but if this is done, the hydrogen will contain a small amount of hydrogen sulfide, which could be removed, say, by use of iron oxide boxes (not shown).

FIGS. 8a, 8b, and 8c (collectively termed FIG. 8), when joined according to the scheme designated FIG. 8 shown alongside FIG. 5, depict an alternative embodiment of my cycle employing heavy residual fuel oil, particularly suitable for use at high turbine-inlet temperatures, such as may be afforded if turbine blades and other critical turbine parts are cooled by a circulating coolant, such as metallic sodium, lithium, potassium, lead, bismuth, or the like.

Certain equipment items in FIG. 8 function substantially in the same manner as corresponding items of FIGS. 1, 2, and 7, and will not again be described or discussed in complete detail. From FIG. 1, these items are: reactors 32, 36, 61–64; exchangers 3, 34, 38, 40, 41, 44, 54–57, 117, 120, 122, 124; valves 65–93; pumps 1, 121, 123, 125, 127–130; compressors 43, 46, 126; turbine 118; drum 42; and electric generators 53 and 119. From FIG. 2, these items are: exchangers 177, 178; and compressor 179. From FIG. 7, the item is exchanger 221.

Oil admixed with steam is introduced via nozzles 180a into fluidized bed 28a housed in reactor 27a. Additional oil admixed with flue gas is introduced via nozzle 180b into fluidized bed 28b housed in reactor 27b. Oxygen is the fluidizing gas to bed 28a, while air is the fluidizing gas to bed 28b. Oil undergoes partial combustion in both beds, and the effluents from beds 28a and 28b are a rich and a lean fuel gas respectively. Solid, consisting primarily of CaS·MgO and CaCO$_3$·MgO, enters fluidized beds 28a and 28b across solid-flow-regulating valves 39a and 39b from aerated standpipes 60a and 60b respectively. Both beds 28a and 28b operate at a temperature level sufficiently high so that carbon dioxide is expelled from CaCO$_3$·MgO. If the pressure level of the two beds is in the preferred range from about 500 to about 600 p.s.i.a., the necessary temperature levels of the two beds will generally fall in the range from about 1800° F. to about 1850° F. In both beds, nearly all sulfur in oil is absorbed in the form CaS·MgO. Gaseous effluent from the two beds carries solid, consisting primarily of CaO·MgO and CaS·MgO, in dilute-phase transport upward through lines 29a and 29b into cyclone-separators 30a and 30b, which deliver solids into aerated standpipes 58a and 58b respectively.

The major portion of rich fuel gas from cyclone-separator 30a is committed to partial combustor 215, while a minor portion is cooled in heat-exchanger 240 (against BFW), boosted in pressure in blower 241, and added to carbon dioxide which serves as fluidizing gas to fluidized bed 33.

A minor portion of lean fuel gas from cyclone-separator 30b is combusted with air in combustor 242; and the resulting flue gas is cooled in heat-exchangers 243, 244, 245, and 246 (against steam, air, itself, and BFW, respectively), boosted in pressure in blower 247, reheated in heat-exchanger 245 (against itself), and admixed with oil to be added via nozzles 180b to fluidized bed 28b.

Air is compressed in compressor 43; a portion is heated in heat-exchanger 251 (against flue gas) and committed to combustor 50, and a portion is cooled in heat-exchanger 44 (against BFW) and further compressed in compressor 46. The amount of cooling of air done by heat-exchanger 44 is controlled so that the temperature of air leaving compressor 46 is that required for cyclic operation of oxygen absorber-desorbers 61 through 64 in a thermally autogenic manner. A portion of air from compressor 46 is committed to partial combustor 216, a second portion to one of oxygen absorber-desorbers 61 through 64, a third portion is heated in heat-exchanger 244 (against flue gas) and used as fluidizing gas to fluidized bed 28b, and a fourth portion is used at combustor 242.

The major portion of lean fuel gas from cyclone-separator 30b is burned in partial combustor 216 with an amount of air insufficient for complete combustion. Partial combustor 216 serves to raise the temperature of air depleted in oxygen from one of oxygen absorber-desorbers 61 through 64 to the temperature desired at the turbine inlet. Effluent from partial combustor 216 is expanded in turbine 249. This gas still contains fuel values, which are burned with air in combustor 50, the air having been heated in heat-exchanger 251 (against flue gas). Effluent from combustor 50 is expanded in turbine 252 to a pressure a little above atmospheric. Effluent from turbine 252 is first cooled in heat-exchanger 281 (against steam) and 251 (against air). The blades of turbines 249 and 252, as well as other critical metal parts, are cooled by heat-transfer surfaces 250 and 253 respectively, the heat-transfer medium being a liquid metal, such as metallic sodium. The liquid metal is circulated by pump 254 and cooled in heat-exchanger 255 (against BFW).

Rich fuel gas is burned with an insufficient amount of oxygen in partial combustor 215, the effluent from which consists of steam, carbon dioxide, carbon monoxide, and hydrogen. This effluent is expanded in expansion turbine 256, and the remaining fuel values are burned with oxygen in combustor 258. Effluent from combustor 258, consisting primarily of steam and carbon dioxide, is expanded in expansion turbine 259 to a pressure slightly above atmospheric. The blades and other critical metal parts of turbines 256 and 259 are cooled by heat-transfer surfaces 257 and 260, the heat-transfer medium being a liquid metal, which is pumped in pump 261 and cooled in heat-exchanger 262 (against BFW).

Alternate arrangements for cooling and protecting high-temperature elements of turbines 249, 252, 256, and 259 are known and may sometimes be preferable to cooling by the circulation of a liquid metal. For example, steam (preferably not highly superheated) could be caused to flow through slots in the turbine blades, thereby cooling the blades and joining the expanding cycle fluid. Or, BFW could be supplied to the blades, which would then be cooled by the evaporation of water.

Another alternate arrangement which might sometimes be preferred would be to compress carbon dioxide leaving pump 125 and to cause it to flow through slots in the turbine blades and into the expanding cycle fluid.

Oxygen from regulating-valve 92 is cooled in heat-exchangers 264 and 265 (against oxygen) and in heat-exchanger 266 (against BFW). Oxygen from regulating-valve 93 is cooled in heat-exchangers 267 and 268 (against oxygen) and in heat-exchanger 269 (against BFW), is compressed in compressor 270 and cooled in heat-exchanger 271 (against BFW). The oxygen streams from exchangers 266 and 271 are combined, and further compressed in compressors 272, 274, and 276. Heat-exchangers 273 and 275 cool effluent from compressors 272 and 274, respectively (against BFW). A portion of oxygen from compressor 276 is heated in heat-exchanger 265 (against oxygen) and used as fluidizing gas to fluidized bed 28a. A second portion of oxygen from compressor 276 is heated in heat-exchanger 268 (against oxygen) and committed to combustor 258. A third portion of oxygen from compressor 276 is cooled in heat-exchanger 277 (against BFW), compressed in compressor 278, cooled in heat-exchanger 279 (against BFW), compressed in compressor 280, heated in heat-exchangers 264 and 267 (against oxygen), and committed to partial combustor 215.

Intermediate-pressure BFW from pump 129 is in part heated in heat-exchangers 178 and 240 (against rich fuel gas), 246 (against flue gas), 266, 269, 271, 273, 275, 277, and 279 (against oxygen). High-pressure BFW from pump 130 is in part heated in heat-exchangers 255 and 262 (against liquid metal). Steam is superheated in heat-exchangers 243 and 281 (against flue gas).

As turbine-inlet temperature is increased, there is a decline in the quantity of steam which can be handled with a given amount of fuel to combustors 215 and 258. This means that less heat can be used for steam-raising and superheating via indirect heat exchange. It therefore becomes advantageous to choose processing arrangements which throw off as little waste heat as possible, particularly at lower temperature levels.

As turbine-inlet temperature is increased, it pays to operate air-compressor 46, fuel-gas-compressor 179, and the several oxygen compressors at higher inlet temperatures. If this is not done, the available low-level heat is more than can be used in heating low-pressure BFW from pump 128. Accordingly, in FIG. 8, heat-exchanger 45 (appearing in FIGS. 1 and 7) is omitted; heat-exchanger 178 and heat-exchangers removing heat of oxygen compression are used to heat intermediate-pressure BFW from pump 129.

The quantity of solid circulated in the embodiment of FIG. 8 is outstandingly low by comparison with the embodiments of FIGS. 1 and 7, although the circulation of solid could be decreased in FIG. 7 by raising the operating temperature level of fluidized bed 167 and allowing steam and carbon dioxide to appear in the gaseous effluent from this bed. Also, the quantity of $CaCO_3 \cdot MgO$ formed by Reactions 2 and 4 is far less. Thus, heat generated by the cooling of solid from cyclone-separators 30a and 30b, as well as heat generated by the formation of

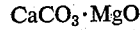

$CaCO_3 \cdot MgO$ is far less in FIG. 8. This is an advantage when the turbine-inlet temperature is increased to a high level.

A similar reason accounts for the fact that, in embodiments such as FIGS. 2 and 7, it does not pay to convert carbon monoxide to hydrogen by adding steam ahead of fluidized bed 167 if a high turbine-inlet temperature is used; moreover, it pays to raise the temperature of bed 167 so that steam and carbon dioxide appear in its gaseous effluent. At high turbine-inlet temperatures, the heat thrown off by the Reactions 2 and 4 becomes a detriment to best cycle efficiency. Similar reasoning accounts for the advantage of FIG. 3 over FIG. 6 at high turbine-inlet temperatures.

FIG. 9 is an embodiment of my cycle employing natural gas which is attractive for use at an ultra-high turbine-inlet temperature. Conventional, low-temperature rectification of air is used to supply oxygen to the cycle, and the embodiment of FIG. 9 is characterized by the fact that no flue gas is generated. The major part of steam-raising and steam-superheating heat is afforded by the cooling of steam and carbon dioxide ahead of low-pressure turbine 118, and the remaining heat is entirely derived from the after-cooling of various compressors.

In FIG. 9, exchangers 120, 122, and 124, pumps 121, 123, 125, and 127–130, and electric generator 119 function substantially in the manner described earlier in connection with FIG. 1.

Natural gas is compressed in compressors 191, 194, and 197, with intercooling (against BFW) in heat-exchangers 193 and 196 following compressors 191 and 194 respectively. Natural gas from compressor 197 is heated to about 900° F. in heat-exchanger 291 (against steam and carbon dioxide), and committed to partial combustor 215, along with oxygen and superheated steam.

Air is compressed (typically to about 65 p.s.i.a.) in compressor 43, cooled in heat-exchangers 45 and 230 (against BFW and atmospheric cooling water respectively), and committed to conventional equipment 231 for the low-temperature rectification of air. Nitrogen waste from this equipment is rejected, and oxygen is compressed in compressors 292, 294, 297, and 301, with intercooling following compressors 292, 294, and 297 in heat-exchangers 293, 295, and 299, respectively (against BFW).

Oxygen from compressor 301 is heated to about 900° F. in heat-exchanger 303 (against steam and carbon dioxide), and a major portion is committed to partial combustor 215, along with methane and superheated steam. The quantity of oxygen supplied to partial combustor 215 is insufficient for complete combustion, and effluent from this combustor consists of steam, carbon dioxide, hydrogen, and carbon monoxide. This effluent enters expansion turbine 304 at an ultra-high temperature, say 3500° F. A minor portion of oxygen from compressor 301 and heat-exchanger 303 is injected into turbine 304 at several injection nozzles 305a spaced at intervals of an expansion stage downstream from the inlet to the turbine.

These injections of oxygen consume a portion of the hydrogen and carbon monoxide present in the expanding gas mixture, and serve successively to reheat the mixture to the same ultra-high temperature of the inlet to the turbine. A minor portion of oxygen withdrawn at an intermediate stage of compressor 301 is heated to about 900° F. in heat-exchanger 302 (against steam and oxygen) and injected at several injection nozzles 305b spaced at intervals of an expansion stage downstream from the foregoing nozzles 305a. A minor portion of oxygen discharged from compressor 297 is heated to about 900° F. in heat-exchanger 300 (against steam and oxygen) and injected at several injection nozzles 305c downstream of nozzles 305b. A minor portion of oxygen withdrawn at an intermediate stage of compressor 297 is heated to about 900° F. in heat-exchanger 298 (against steam and carbon dioxide), and injected at several nozzles 305d downstream of nozzles 305c. A minor portion of oxygen discharged from compressor 294 is heated to about 900° F. in heat-exchanger 296 (against steam and carbon dioxide), and injected at several nozzles 305e downstream of nozzles 305d. The quantities of oxygen injected through the various nozzles are adjusted so that hydrogen and carbon monoxide are substantially used up following the last nozzle 305e. The blades of turbine 304, as well as other critical metal parts, are cooled by heat-transfer surface 257, the heat-transfer medium being a liquid metal such as lithium. The liquid metal is circulated by pump 261, and cooled in heat-exchanger 262 (against BFW).

The pressure at the last oxygen-injection point, the last nozzle 305e, should, in general, still be fairly high. If the pressure and temperature at the inlet of turbine 304 are 2400 p.s.i.a. and 3500° F. respectively, the pressure following last nozzle 305e typically should preferably be of the order of 500 p.s.i.a. Further expansion in turbine 304 to a pressure a little above atmospheric serves to cool the mixture of steam and carbon dioxide, typically to a level in the general neighborhood of 1900° F. at the foregoing turbine-inlet conditions. (The pressure following last nozzle 305e and temperature at the outlet of turbine 304 will vary in the general neighborhoods of the respective values stated above in accordance with the amount of heat passing across heat-transfer surface 257.)

Steam and carbon dioxide from turbine 304 are cooled in heat-exchangers 117a (against steam), 291 (against natural gas), 296, 298, 300, 302 and 303 (against oxygen), and 117b (against BFW); and the mixture is finally expanded in turbine 118 to the pressure which can be maintained in condenser 120 by the available atmospheric cooling water. Low-pressure BFW from pump 128 is heated only in heat-exchanger 45 (against air). Intermediate-pressure BFW is heated in heat-exchangers 193 and 196 (against natural gas), and in 293, 295 and 299 (against oxygen). High-pressure BFW from pump 130 is heated in heat-exchangers 117b (against steam and oxygen) and 262 (against liquid metal). Finally, steam is superheated in heat-exchanger 117a (against steam and carbon dioxide).

At a steam pressure of 2400 p.s.i.a. and turbine-inlet temperature of 3500° F., I believe that the arrangement of FIG. 9 is capable of giving a heat rate of the order of 6100 B.t.u./kwh. of electricity sent out, affording a saving in the order of 35 percent of the fuel required for generation of electricity from natural gas according to good present-day power-plant practice. These values are for a temperature of about 100° F. in condenser 120.

In a region, such as Los Angeles, which suffers from presence of air pollutants of photochemical origin, FIG. 9 would have the advantage of discharging very little if any nitrogen oxides, since almost no nitrogen is present in zones of high-temperature combustion.

FIG. 10 is an embodiment of my cycle employing natural gas, using the manganic-oxide absorption-desorption method of oxygen production, and suitable for use at an ultra-high turbine-inlet temperature, say 3500° F.

The following equipment items of FIG. 10 function substantially in the manner already described in connection with FIG. 1: reactors 61–64; exchangers 120, 122, 124; valves 65–93; pumps 121, 123, 125, 127–130; turbine 118; and electric generator 119.

Natural gas is compressed in compressor 311, in one "go," to a pressure preferably of the order of 560 p.s.i.a. A portion of the discharge from compressor 311 is heated to about 900° F. in heat-exchanger 195 (against flue gas) and committed to combustor 199. The remainder is cooled in heat-exchanger 196 (against BFW), further compressed in compressor 197, heated to about 900° F. in heat-exchanger 198 (against flue gas), and committed to combustor 111, along with oxygen and superheated steam.

Air is compressed in compressor 312, in one "go," to a pressure about 20 p.s.i. higher than the discharge of compressor 311. The compressed air is cooled in heat-exchanger 313 (against boiling BFW), and committed to one of the oxygen absorber-desorbers 61 through 64.

The amount of cooling of air done by heat-exchanger 313 is adjusted so that the temperature of air leaving this heat-exchanger is that required for cyclic operation of oxygen absorber-desorbers 61 through 64 in a thermally autogenic manner.

A small quantity of air is abstracted from compressor 312 at an intermediate stage at which the pressure is about the same as the discharge of compressor 311, and this air is committed to combustor 199 together with natural gas and air depleted in oxygen from one of the oxygen absorber-desorbers 61 through 64. Flue gas effluent from combustor 199 enters expansion turbine 321, in which flue gas is expanded, in one "go," to a pressure a little above atmospheric. Turbine blades, and other critical metal parts, of turbine 321 are cooled across heat-exchange surface 250 by a circulating liquid metal coolant such as lithium, which is pumped by pump 254 and cooled in heat-exchanger 255 (against BFW). Flue gas from turbine 321 is cooled in heat-exchangers 195 and 198 (against natural gas), heat-exchanger 281 (against boiling BFW), and in heat-exchangers 54, 56, and 57 (against BFW).

Oxygen from regulating-valve 92 is cooled in heat-exchangers 264 and 266 (against oxygen and BFW respectively). Oxygen from regulating-valve 93 is cooled in heat-exchangers 267 and 269 (against oxygen and BFW respectively), and is compressed in compressor 314, to which oxygen from heat-exchanger 266 is added at an intermediate stage. Oxygen from compressor 314 is cooled in heat-exchanger 315 (against BFW), and further compressed in compressors 316, 318, and 320, with intercooling in heat-exchangers 317 and 319 (against BFW), following compressors 316 and 318 respectively. Oxygen from compressor 320 is heated to about 900° F. in heat-exchangers 264 and 267 (against oxygen) and committed, along with natural gas and superheated steam, to combustor 111.

Steam and carbon dioxide from combustor 111, at an ultra-high temperature, is admitted to expansion turbine 322 and expanded, in one "go," to a pressure a little above atmospheric. Turbine blades and other critical metal parts of turbine 322 are protected by cooling action of heat-exchange surface 257, the coolant being a liquid metal circulated by pump 261 and cooled in heat-exchanger 262 (against BFW).

Effluent from turbine 257 is cooled in heat-exchangers 117a, 117b, and 117c (against steam, boiling BFW, and BFW, respectively).

Low-pressure BFW from pump 128 is heated solely by heat-exchanger 57 (against flue gas). Intermediate-pressure BFW, from pump 129, is heated in heat-exchangers 56 (against flue gas), 196 (against natural gas), 266, 269, 315, 317, and 319 (against oxygen). High-pressure BFW is heated in heat-exchangers 54 (against flue gas), 117c (against steam and carbon dioxide), and 255 and 262 (against liquid metal). A mixture of steam and BFW is heated in heat-exchangers 117b (against steam and carbon dioxide), 281 (against flue gas), and 313 (against air). Finally, steam is superheated in heat-exchanger 117a (against steam and carbon dioxide).

An example calculated for 2400 p.s.i.a. and 3500° F. at the inlet to turbine 322 (and with 2700° F. at the inlet to turbine 321) leads me to believe that the arrangement of FIG. 10 is capable of affording a heat rate of the order of 6100 B.t.u./k.w.h. of electricity sent out. As is the case in this example, I have found that it is sometimes desirable to use a lower temperature at the inlet of the flue-gas expansion turbine or turbines than at the inlet of the steam-and-carbon-dioxide expansion turbine or turbines.

Complicated considerations enter into a judgment of the relative merits, for purpose of my cycle, of my manganic-oxide absorption-desorption method of oxygen production and of the conventional, low-temperature method. From the many examples which I have calculated, I now believe that over a wide range of turbine-inlet temperature, the manganic-oxide method affords a given cycle thermal efficiency at a lower turbine-inlet temperature than would be required to obtain the same efficiency with use of the low-temperature method. Consideration must also be given to the relative capital cost of the two methods, and I now believe that my manganic-oxide method is the cheaper to build.

At ultra-high turbine-inlet temperatures, the thermal-efficiency advantage of the manganic-oxide method disappears. This is because the quantity of flue gas produced from a cycle employing the low-temperature method may advantageously be decreased, and finally be made zero, as the turbine-inlet temperature is increased. The quantity of flue gas from the cycle using the manganic-oxide method, on the other hand, can never be less than the quantity of air depleted in oxygen, leaving one of absorber-desorbers 61 through 64, plus the products of the combustion which is required to heat it to the turbine-inlet temperature. Sufficient steam must always be raised to use up the heat thrown off when this flue gas is cooled in heat-exchangers 54, 56, and 57, as well as other unavoidable heat. At ultra-high turbine-inlet temperatures, the quantity of low-level heat from flue-gas cooling becomes a disadvantage. Theoretically, as turbine-inlet temperature is increased without limit, a cycle based upon the low-temperature method will give the higher efficiency.

FIGS. 11 and 12 depict alternative flow-paths for the circulation of solid in the embodiment of FIG. 2, for which reference should be made to FIG. 2b. (The same reference characters are used for the same parts in FIGS. 11 and 12 as in FIG. 2b.) FIGS. 11 and 12 illustrate but do not exhaust the possibilities of variation in these flow-paths.

In FIG. 11, reactor 166 is mounted above reactors 32 and 36, and delivers solid to reactor 32 via solid-flow-regulating valve 331, and to reactor 27 via aerated standpipe 59 and solid-flow-regulating valve 26. Solid flows from reactor 32 to reactor 36 via solid-flow-regulating valve 35, and from reactor 36 to reactor 27 via aerated standpipe 60 and solid-flow-regulating valve 39. The arrangement of FIG. 11 has an advantage over that of FIG. 2 in the respect that the solid arriving at reactor 32 does not contain as high a proportion of CaO·MgO in FIG. 11 as in FIG. 2. Accordingly, a smaller quantity of carbon dioxide must be supplied by compressor 126, under the arrangement of FIG. 11, in order to supply an amount of carbon dioxide sufficient for the needs of reactors 32 and 36. On the other hand, the arrangement of FIG. 11 has the disadvantage of placing reactor 166 at a higher elevation.

In FIG. 12, solid is entrained by gaseous effluent from reactor 166, and is transported upward through pipe 332 into cyclone-separator 333, which delivers solid to aerated standpipe 334. The major portion of solid is delivered from aerated standpipe 334 into reactor 27 via solid-flow-regulating valve 335. A minor portion of solid is delivered to reactor 32 via branch 336 from standpipe 334 and via solid-flow-regulating valve 337.

FIG. 13 illustrates schematically a typical design which may be used for combustors such as 111, 113, 115, and 201 of FIG. 4, or partial combustor 215 of FIG. 5. Oxygen flows through a central pipe 391, clean fluid fuel flows into and through an annulus 392 situated around pipe 391, and a lesser flow of "secondary" steam flows into and through an annulus 393 situated around annulus 392. The three flows mix in venturi throat 394 and within combustion chamber 395, where oxygen and clean fuel react by combustion. A greater flow of "primary" steam flows into and through an annulus 396 situated around combustion chamber 395, and this steam mixes with combustion products from chamber 395 in venturi thoat 397 and in a transfer line 398 which conveys the mixture to one of expansion turbines such as 112, 114, 116, and 202 of FIG. 4. Passages 399a and 399b provide means for cooling the tips of oxygen pipe 391 and clean-fuel annulus 392, respectively. BFW is a preferred coolant to be caused to flow through passages 399a and 399b.

I do not wish my invention to be limited to the particular embodiments of the accompanying figures. Present-day mechanical techniques make possible the use of a wide range of steam pressure and a wide range of turbine-inlet temperature. Those skilled in this art will understand that these ranges may be varied to obtain arrangements which are advantageous for particular combinations of temperature and pressure. These arrangements would not depart from the spirit of my invention and might modify the disposition of heat-exchangers and the disposition and pressures of reheat steps between expansion turbine stages. Generally speaking, heat-exchanger 51 is advantageously made smaller, carrying less duty, as turbine-inlet temperature is increased; also the pressure of the last reheat of steam and carbon dioxide is advantageously made greater, at a given turbine-inlet steam pressure. A variety of known apparatuses exist for producing a fuel gas from coal, lignite, peat, oil shale, heavy residual oil, and other fuels. Many of these known apparatuses will lend themselves to combination with my ideas in flowsheet arrangements differing from my examples only in detail, not in spirit. Those skilled in this art will recognize that arrangements can be devised having as their primary object the production of one or more materials such as hydrogen, a synthesis gas comprising hydrogen and carbon monoxide, a rich fuel gas (e.g., like so-called "town gas"), a lean fuel gas (e.g., like so-called "producer gas"), oxygen, and sulfur, and having the production of byproduct power as a secondary object, and differing from my examples only in detail, not in spirit.

Only such limitations should be imposed as are indicated in the appended claims.

I claim:
1. In a top heat power cycle a process comprising the following steps:
combining substantially pure oxygen and hydrogen in a combustor at a pressure not less than 2000 p.s.i.g.;
adding high pressure superheated steam to the combustor and supplying the products of combustion with the high pressure superheated steam at not less than 1500° F. to the intake of a steam turbine;
withdrawing the exhaust from said turbine and subjecting it to a second combustor operating at the exhaust pressure from the first turbine and delivering the thus reheated exhaust products to a second turbine operating at a lower pressure and likewise proceeding through a series of turbines with combustors interposed between the turbines whereby the steam and gases entering the series of turbines are maintained at a substantially constant high temperature and useful work is produced; condensing water from said exhaust.

2. In a power cycle the process comprising the following steps: pumping liquid water to a high pressure, adding a first portion of heat to said water indirectly across heat-transfer surface, adding a second portion of heat directly in form of products from the combustion of a clean fluid fuel with substantially pure oxygen, expanding the resulting hot gases through a series of power-developing expansion turbine stages terminating in a stage discharging gases at sub-atmospheric pressure, cooling said gases by indirect heat exchange at a point between two adjacent expansion stages in said series thereby supplying a part of said first portion of heat, condensing water from said gases, pumping non-condensible gases to the atmosphere, and pumping water to said high pressure to repeat the cycle.

3. The process of claim 2 in which said gases are at a pressure below 5 p.s.i.g. at said point of said cooling by indirect heat exchange.

4. The process of claim 2 in which said sub-atmospheric pressure is maintained by condensing water from said gases in a condenser supplied with a cooling medium selected from the group consisting of atmospheric cooling water and atmospheric air; in which said gases are at about atmospheric pressure at said point of said cooling by indirect heat exchange; and in which said indirect heat exchange is regulated so that said gases enter the expansion stage succeeding said point of said cooling at a temperature such that expansion of said gases in the subsequent expansion stages of said series will cool said gases to about the temperature of said condenser.

5. In a power cycle the process comprising the following steps; pumping liquid water to a high pressure; adding a first portion of heat to said water indirectly across heat-transfer surface thereby converting at least a major part of said water to steam; adding a second portion of heat directly in form of products from the partial combustion of a clean fluid fuel with substantially pure oxygen, said oxygen being supplied in an amount insufficient for complete combustion of said fuel, and said products including chemical species having fuel value; expanding the resulting hot gases through a series of power-developing expansion turbine stages terminating in a stage discharging gases at a pressure not substantially below atmospheric, adding at least one additional portion of heat to said gases at a point between two adjacent expansion stages in said series, said additional portion of heat being added directly in form of products from the combustion of said chemical species with substantially pure oxygen added to said gases at said point; cooling said gases discharged from said series by indirect heat exchange thereby supplying a part of said first portion of heat; regulating said heat exchange so that said discharged gases are cooled at least to a temperature not substantially greater than the temperature at which their further expansion in a power-developing expansion turbine would cool said gases approximately to their dew-point temperature; subsequently condensing water from said gases and separating non-condensible gases from said water, and pumping water to said high pressure to repeat the cycle.

6. In a power cycle the process comprising the following steps: pumping liquid water to a high pressure; adding a first portion of heat to said water indirectly across heat-transfer surface thereby converting at least a major part of said water to steam; adding a second portion of heat directly in form of products from the combustion of a clean fluid fuel with an excess amount of substantially pure oxygen; expanding the resulting hot gases containing oxygen through a series of power-developing expansion turbine stages terminating in a stage discharging gases at a pressure not substantially below atmospheric; adding at least one additional portion of heat to said gases at a point between two adjacent expansion stages in said series, said additional portion of heat being added directly in form of products from the combustion of said excess amount of oxygen with additional clean fluid fuel added to said gases at said point; cooling said gases discharged from said series by indirect heat exchange thereby supplying a part of said first portion of heat; regulating said heat exchange so that said discharged gases are cooled at least to a temperature not substantially greater than the temperature at which their further expansion in a power-developing expansion turbine would cool said gases approximately to their dew-point temperatutre; subsequently condensing water from said gases and separating non-condensible gases from said water, and pumping water to said high pressure to repeat the cycle.

7. In a power cycle the process comprising the following steps: pumping liquid water to a high pressure, adding a first portion of heat to said water indirectly across heat-transfer surface, adding a second portion of heat directly in form of products from the combustion of a clean fluid fuel with oxygen, expanding the resulting hot gases through a series of power-developing expansion turbine stages, condensing water from said gases; and compressing air to a pressure of at least several atmospheres, cooling said air by indirect heat exchange thereby supplying a part of said first portion of heat, committing said air to apparatus for the liquefaction and rectification of air at low temperature, and supplying oxygen from said apparatus to said combustion of said clean fluid fuel.

8. In a power cycle the process comprising the following steps: compressing air to a pressure of at least several atmospheres, cooling said air by a first indirect heat exchange, committing said air to apparatus for the liquefaction and rectification of air at low temperature, said apparatus supplying oxygen; pumping liquid water to a high pressure, adding a first portion of heat to said water indirectly across heat-transfer surface, adding a second portion of heat directly in form of products from the combustion of a clean fluid fuel with a portion of said oxygen, expanding the resulting hot gases through a series of power-developing expansion turbine stages terminating in a stage discharging gases at sub-atmospheric pressure, adding at least one additional portion of heat to said gases at a point between two adjacent expansion stages in said series, said additional portion of heat being added directly in form of products from the combustion of a clean fluid fuel with an additional portion of said oxygen, cooling said gases by a second indirect heat exchange at a point between two adjacent expansion stages later in said series, condensing water from said gases, and pumping non-condensible gases to the atmosphere; and regulating said high pressure and said portions of heat so that a major part of said first portion of heat which is made available at temperatures below about 500 F. is supplied by said first indirect heat exchange and also so that a major part of said first portion of heat which is made available at temperatures above about 500° F. is supplied by said second indirect heat exchange.

9. In a power cycle the process comprising the following steps: pumping liquid water to a high pressure, adding a first portion of heat to said water indirectly across heat-transfer surface, adding a second portion of heat directly in form of products from the combustion of a clean fluid fuel with oxygen, expanding the resulting hot gases through a series of power-developing expansion turbine stages, condensing water from said gases, partially combusting a raw fuel with a gasification medium selected from the group consisting of oxygen and mixtures of oxygen and steam, to produce a crude rich fuel gas; deriving said clean fluid fuel by subjecting said crude rich fuel gas to processes for removal of dust and sulfur; and supplying waste heat from said processes as a part of said first portion of heat.

10. In a power cycle the process comprising the following steps: a first gasification of a first portion of a raw fuel at a first high pressure with a first gasification medium selected from the group consisting of oxygen and mixtures of oxygen and steam, said first gasification producing a crude rich fuel gas; a second gasification of a second portion of a raw fuel at a second high pressure with a second gasification medium selected from the group consisting of air, mixtures of air and carbon dioxide, and mixtures of air and flue gas rich in carbon dioxide, said second gasification producing a crude lean fuel gas; subjecting said crude rich and lean fuel gases to processes for removal of dust and sulfur, said processes producing a clean rich fuel gas and a clean lean fuel gas; pumping liquid water to a third high pressure, adding a first portion of heat to said water indirectly across heat-transfer surface, adding a second portion of heat directly in form of products from the combustion of said clean rich fuel gas with oxygen, expanding the resulting hot gases through a series of power-developing expansion turbine stages, condensing water from said gases; arranging for use of waste heat from said processes for removal of dust and sulfur as a part of said first portion of heat; combusting said clean lean fuel gas with air at substantially said second high pressure to produce a flue gas; expanding said flue gas through a power-developing expansion turbine to a pressure near atmospheric; and cooling said flue gas by indirect heat exchange thereby supplying a part of said first portion of heat.

11. In a power cycle suited for production of a stream of byproduct hydrogen the process comprising the following steps: pumping liquid water to a first high pressure, adding a first portion of heat to said water indirectly across heat-transfer surface, adding a second portion of heat directly in form of products from the combustion by oxygen of a clean fuel consisting primarily of hydrogen and carbon monoxide, expanding the resulting hot gases through a series of power-developing expansion turbine stages, condensing water from said gases, and separating non-condensible gases including carbon dioxide from said water; partially combusting a sulfurous fuel at a second high pressure with an oxidant selected from the group consisting of oxygen and mixtures of steam and oxygen, to produce a fuel gas consisting primarily of hydrogen and carbon monoxide but containing hydrogen sulfide; deriving said clean fuel by contacting said fuel gas at substantially said second high pressure with a solid containing intermingled microscopic crystallites of calcium and magnesium oxides; diverting a fractional stream of said clean fuel from said combustion by oxygen, adding thereto a quantity of steam at least substantially equal to the content of carbon monoxide in said fractional stream, and contacting said fractional stream at substantially said second high pressure with a similar solid, to produce said stream of byproduct hydrogen; collecting said solids from said contactings and deriving a gas rich in hydrogen sulfide therefrom by reacting said solids at substantially said second high pressure with a gas containing steam and carbon dioxide, said carbon dioxide being supplied at least in part from said non-condensible gases; producing elemental sulfur from said gas rich in hydrogen sulfide; using waste heat thrown off by the aforesaid steps deriving said clean fuel, said stream of byproduct hydrogen, said gas rich in hydrogen sulfide, and said elemental sulfur, as a part of said first portion of heat; calcining said solid at substantially said second high pressure and returning said calcined solids to said contactings.

12. In a power cycle the process comprising the following steps: pumping liquid water to a high pressure, adding a first portion of heat to said water indirectly across heat-transfer surface, adding a second portion of heat directly in form of products from the combustion of a first secondary fuel with oxygen, expanding the resulting hot gases through a series of power-developing expansion turbine stages, condensing water from said gases; deriving at least a part of said first portion of heat from the combustion of a second secondary fuel with air; treating a primary fuel by a process selected from the group consisting of cracking, carbonization, and gasification processes having the characteristic of splitting said primary fuel into a fraction rich in hydrogen and a fraction lean in hydrogen; and deriving said first secondary fuel from said fraction rich in hydrogen and deriving said second secondary fuel from said fraction lean in hydrogen.

13. In a power cycle the process comprising the following steps: pumping liquid water to a high pressure, adding a first portion of heat to said water indirectly across heat-transfer surface, adding a second portion of heat directly in form of products from the combustion of a clean fluid fuel with substantially pure oxygen, expanding the resulting hot gases through a series of power-developing expansion turbine stages, adding at least one additional portion of heat directly in form of products from the combustion of the clean fluid fuel with substantially pure oxygen at a point intermediate two adjacent stages in said series, cooling said gases discharged from said series by indirect heat exchange thereby supplying a part of said first portion of heat, condensing water from said gases, and pumping water to said high pressure to repeat the cycle.

14. In a power cycle the process comprising the following steps: pumping liquid water to a high pressure, adding a first portion of heat to said water indirectly across heat-transfer surface, adding a second portion of heat directly in form of products from the combustion of a clean fluid fuel with oxygen, expanding the resulting hot gases through a series of power-developing expansion turbine stages terminating in a stage discharging gases at sub-atmospheric pressure, said sub-atmospheric pressure being maintained by condensing water from said gases in a condenser supplied with a cooling medium selected from the group consisting of atomspheric cooling water and atmospheric air, cooling said gases by indirect heat exchange at a point between two adjacent expansion stages in said series thereby supplying a part of said first portion of heat, said gases being at about atmospheric pressure at said point of said cooling by indirect heat exchange, regulating said indirect heat exchange so that said gases enter the expansion stage succeeding said point of said cooling at a temperature such that expansion of said gases in the subsequent expansion stages of said series will cool said gases to about the temperature of said condenser, pumping non-condensible gases from said condenser to the atmosphere, and pumping water to said high pressure to repeat the cycle.

15. The process of claim 14 in which said clean fluid fuel is substantially pure hydrogen.

16. In a power cycle the process comprising the following steps: pumping liquid water to a high pressure, adding a first portion of heat to said water indirectly across heat-exchange surface thereby converting at least a major part of said water to steam, adding a second portion of heat directly in form of products from the combustion of a clean fluid fuel with substantially pure oxygen, then expanding the resulting hot gases through a series of power-developing expansion turbine stages terminating in a stage discharging gases at a pressure not substantially below atmospheric, adding at least one additional portion of heat to said gases directly in form of products from the combustion of a clean fluid fuel with substantially pure oxygen at a point intermediate two adjacent stages in said series, cooling said gases discharged from said series by indirect heat exchange thereby supplying a part of said first portion of heat, regulating said heat exchange so that said discharged gases are cooled at least to a temperature not substantially greater than the temperature at which their further expansion in a power-developing expansion turbine would cool said gases approximately to their dew-point temperature, subsequently condensing water from said gases and separating non-condensible gases from said water, and pumping water to said high pressure to repeat the cycle.

17. The process of claim 16 including the following additional steps: compressing air to a pressure of at least several atmospheres, combusting a fuel with said air to produce a flue gas substantially at said pressure, cooling said flue gas by indirect heat exchange thereby supplying a part of said first portion of heat, and expanding said flue gas through a power-developing expansion turbine to a pressure near atmospheric.

18. The process of claim 16 including the following additional steps: gasifying a raw fuel with a gasification medium selected from the group consisting of oxygen and mixtures of oxygen and steam, to produce a crude rich fuel gas; deriving said clean fluid fuel by subjecting said crude rich fuel gas to processes for removal of dust and sulfur; and supplying waste heat from said processes as a part of said first portion of heat.

19. In a power cycle the process comprising the following steps: pumping liquid water to a first high pressure, adding a first portion of heat to said water indirectly across heat-transfer surface, adding a second portion of heat directly in form of products from the combustion of a clean fluid fuel with substantially pure oxygen, expanding the resulting hot gases through a series of power-developing expansion turbine stages, and condensing water from said gases; compressing air to a second high pressure, passing said compressed air for an interval of time over a first bed of a solid absorbent having the power to absorb oxygen from said air while generating heat and thereby raising the temperature of said first bed; incorporating air depleted in oxygen leaving said first bed in combustion with a fuel to generate a part of said first portion of heat, and expanding flue gas derived from said combustion incorporating said air depleted in oxygen to substantially atmospheric pressure through a power-developing expansion turbine; and at the conclusion of said interval of time, switching the flow of said compressed air to a second similar bed of solid absorbent, reducing the pressure in said first bed thereby allowing oxygen to desorb therefrom and thereby lowering the temperature of said first bed, and supplying said substantially pure oxygen to said combustion of said clean fluid fuel.

20. In a power cycle the process comprising the following steps: pumping liquid water to a high pressure, adding a first portion of heat to said water indirectly across heat-transfer surface, adding a second portion of heat directly in form of products from the combustion of a clean carbonaceous fluid fuel with substantially pure oxygen, expanding the resulting hot gases through a series of power-developing expansion turbine stages, condensing water from said gases, and separating non-condensible gases including carbon dioxide from said water; deriving said clean carbonaceous fluid fuel from a sulfurous fuel by steps including treatment with a solid containing intermingled microscopic crystallites of magnesium oxide and calcium oxide; subsequently deriving a gas rich in hydrogen sulfide from said solid by contacting said solid with a gas containing steam and carbon dioxide, said carbon dioxide being supplied at least in part from said non-condensible gases.

21. The process of claim 20 in which said sulfurous fuel contains carbon monoxide, and including a step adding steam to said treatment, and conducting said treatment at a temperature and pressure such that at least a part of said carbon monoxide reacts with steam and calcium oxide to form hydrogen and calcium carbonate.

22. In a power cycle the process comprising the following steps: pumping liquid water to a first high pressure, adding a first portion of heat to said water indirectly across heat-transfer surface, adding a second portion of heat directly in form of products from the combustion of a clean carbonaceous fluid fuel with substantially pure oxygen, expanding the resulting hot gases through a series of power-developing expansion turbine stages, condensing water from said gases, and separating non-condensible gases including carbon dioxide from said water; deriving said clean carbonaceous fluid fuel from a sulfurous fuel by steps including treatment at a second high pressure with a solid containing intermingled microscopic crystallites of calcium and magnesium oxides; deriving a gas rich in hydrogen sulfide from said solid by contacting said solid at substantially said second high pressure with a gas containing steam and carbon dioxide, said carbon dioxide being supplied at least in part from said non-condensible gases; producing elemental sulfur from said gas rich in hydrogen sulfide; using waste heat thrown off by the aforesaid steps deriving said clean carbonaceous fluid fuel, said gas rich in hydrogen sulfide, and said elemental sulfur as a part of said first portion of heat; calcining said solid at substantially said second high pressure by direct contact of said solid with the combustion of a fuel by a combustant selected from the group consisting of air and air depleted in oxygen, where oxygen in said combustant is insufficient for complete combustion of said fuel, so that said calcining furnishes an offgas constituting a lean fuel gas containing carbon dioxide expelled from calcium carbonate; returning said calcined solid to said treatment of said sulfurous fuel; using said lean fuel gas in combustion to generate a part of said first portion of heat, and also expanding flue gas derived from said combustion of said lean fuel gas to substantially atmospheric pressure through a power-developing expansion turbine.

23. In a power cycle the process comprising the following steps: pumping liquid water to a first high pressure, adding a first portion of heat to said water indirectly across heat-transfer surface, adding a second portion of heat directly in form of products from the combustion of substantially pure hydrogen with substantially pure oxygen, expanding the resulting hot gases through a series of power-developing expansion turbine stages terminating in a stage discharging gases at sub-atmospheric pressure, condensing water from said gases, and pumping non-condensible gases to the atmosphere; compressing air to a second high pressure, passing said compressed air for an interval of time over a first bed of solid absorbent having the power to absorb oxygen from said air while generating heat and thereby raising the temperature of said first bed; at the conclusion of said interval of time, switching the flow of said compressed air to a second similar bed of solid absorbent; reducing the pressure in said first bed thereby allowing oxygen to desorb therefrom and thereby lowering the temperature of said first bed; using oxygen desorbed from said first bed in aforesaid combustion with hydrogen and also in partial combustion at substantially said second high pressure with a fluid fuel, to produce a fuel gas consisting mainly of hydrogen and carbon monoxide; admixing steam with said fuel gas in an amount at least substantially close to the carbon monoxide content of said fuel gas, and reacting said fuel gas at substantially said second high pressure with a solid containing intermingled microscopic crystallites of calcium and magnesium oxides, to produce said hydrogen used in said combustion with oxygen; calcining said solid at substantially said second high pressure by direct contact of said solid with the combustion of a fuel incorporating air depleted in oxygen leaving said first bed, and returning said calcined solid to said reaction with said fuel gas; expanding flue gas derived from said combustion incorporating said air depleted in oxygen through a power-developing expansion turbine, and also cooling said flue gas to provide a part of said first portion of heat.

24. In a power cycle the process comprising the following steps: pumping liquid water to a high pressure, adding a first portion of heat to said water indirectly across heat transfer surface, adding a second portion of heat directly in form of products from the combustion of a rich fuel gas with substantially pure oxygen, expanding the resulting hot gases through a series of power-developing expansion turbine stages, and condensing water from said gases; producing said rich fuel gas from a sulfurous fuel by adding said sulfurous fuel to a fluidized bed at a high pressure, said fluidized bed comprising a solid containing intermingled microscopic crystallites of calcium and magnesium oxides; fluidizing said fluidized bed with oxygen and steam, thereby gasifying said sulfurous fuel to produce said rich fuel gas.

25. In a power cycle the process comprising the following steps: pumping liquid water to a high pressure, adding a first portion of heat to said water indirectly across heat-transfer surface, adding a second portion of heat directly in form of products from the combustion of a clean fluid fuel with substantially pure oxygen, expanding the resulting hot gases through a series of power-developing expansion turbine stages, and condensing water from said gases; producing a lean fuel gas from a sulfurous fuel by adding said sulfurous fuel to a fluidized bed at a high pressure, said fluidized bed comprising a solid containing intermingled microscopic crystallites of calcium and magnesium oxides; fluidizing said fluidized bed with a gas selected from the group consisting of air, air depleted in oxygen, mixtures of air and carbon dioxide, and mixtures of air and flue gas, thereby gasifying said sulfurous fuel to produce said lean fuel gas; using said lean fuel gas in combustion to generate a part of said first portion of heat, and also expanding flue gas derived from said combustion of said lean fuel gas to substantially atmospheric pressure through a power-developing expansion turbine.

26. Apparatus for generating power in a top heat power cycle which includes means for pumping liquid water to a high pressure, means for adding a first portion of heat to said water indirectly across heat-transfer surface, means for adding a second portion of heat directly in form of products from the combustion of a clean fluid fuel with oxygen, a series of power-developing expansion turbine stages for expanding the resulting hot gases to a sub-atmospheric pressure, a condenser maintaining said sub-atmospheric pressure by condensing water from said gases, means for supplying said condenser with a cooling medium selected from the group consisting of atmospheric cooling water and atmospheric air, means for cooling said gases by indirect heat exchange at a point between two adjacent expansion stages in said series thereby supplying a part of said first portion of heat, said gases being at about atmospheric pressure at said point of said cooling by indirect heat exchange, means for regulating said indirect heat exchange so that said gases enter the expansion stage succeeding said point of said cooling at a temperature such that expansion of said gases in the subsequent expansion stages of said series will cool said gases to about the temperature of said condenser, means for pumping non-condensible gases from said condenser to the atmosphere and means for supplying condensed water from said condenser to said means for pumping liquid water.

27. Apparatus as in claim 26 including means for supplying hydrogen to act as said clean fluid fuel in said combustion with oxygen.

28. Apparatus for generating power in a top heat power cycle which includes means for pumping liquid water to a high pressure, means for adding a first portion of heat to said water indirectly across heat-exchange surface thereby converting at least a major part of said water to steam, means for adding a second portion of heat directly in form of products from the combustion of a clean fluid fuel with substantially pure oxygen, a series of power-developing expansion turbine stages for expanding the resulting hot gases to a pressure not substantially below atmospheric, means for adding at least one additional portion of heat directly in form of products from the combustion of a clean fluid fuel with substantially pure oxygen at a point intermediate two adjacent stages in said series, means for cooling said gases discharged from said series by indirect heat exchange thereby supplying a part of said first portion of heat, means for regulating said heat exchange so that said discharged gases are cooled at least to a temperature not substantially greater than the temperature at which their further expansion in a power-developing expansion turbine would cool said gases approximately to their dew-point temperature, heat exchange means for condensing water from said gases, means for separating non-condensible gases from said water, and means for supplying condensed water from said heat-exchange means to said means for pumping liquid water.

29. In a power cycle the process comprising the following steps: pumping liquid water to a high pressure, adding a first portion of heat to said water indirectly across heat-transfer surface, adding a second portion of heat directly in form of products from the combustion of a clean carbonaceous fluid fuel with substantially pure oxygen, expanding the resulting hot gases through a series of power-developing expansion turbine stages, condensing water from said gases, and separating non-condensible gases including carbon dioxide from said water; deriving said clean carbonaceous fluid fuel at least in part from a rich fuel vapor produced by introducing a sulfurous hydrocarbon oil into a fluidized bed of a porous solid containing intermingled microscopic crystallites of magnesium oxide and calcium oxide, fluidizing said fluidized bed at high pressure and high temperature with a gas containing a substantial portion of species selected from the group comprising hydrogen and a mixture of carbon monoxide and steam, thereby producing from said oil said rich fuel vapor and a coke laid down upon and within said porous solid, withdrawing said solid together with said coke from said fluidized bed and calcining said withdrawn solid to expel carbon dioxide by combusting fuel including said coke with a combustant having an oxygen content which is insufficient for complete combustion of said fuel including said coke, so that offgas from said calcining is a fuel gas containing said carbon dioxide expelled from said solid, returning calcined solid from said calcining to said fluidized bed; subjecting a portion of said solid withdrawn from said fluidized bed to steps which include treatment with a gas containing steam and carbon dioxide being supplied at least in part from said non-condensible gases, said treatment yielding a gas rich in hydrogen sulfide.

References Cited by the Examiner

UNITED STATES PATENTS

| | | | |
|---|---|---|---|
| 432,815 | 7/1890 | Brin | 23—221 |
| 588,617 | 8/1897 | Stuart | 23—221 |
| 1,988,456 | 1/1935 | Lysholm | 60—39.55 |
| 2,057,971 | 10/1936 | Pfirrmann | 208—112 |
| 2,338,119 | 1/1944 | Kroenig | 208—112 |
| 2,423,527 | 7/1947 | Steinschlaeger | 60—39.17 X |
| 2,614,541 | 10/1952 | Armacost | 122—4 |
| 2,678,531 | 5/1954 | Miller | 60—39.05 |
| 2,787,886 | 4/1957 | Wood | 60—39.17 |
| 2,793,497 | 5/1957 | Walter | 60—39.55 |
| 2,832,194 | 4/1958 | Kuhner | 60—39.17 |
| 2,839,892 | 6/1958 | Rosenthal | 60—39.05 |
| 2,869,323 | 1/1959 | Van Nest | 60—39.55 |
| 2,885,337 | 5/1959 | Keith | 208—8 |
| 2,913,388 | 11/1959 | Howell | 208—8 |
| 2,917,456 | 12/1959 | Ashley | 208—213 |
| 2,951,032 | 8/1960 | Inwood | 208—213 |
| 2,970,434 | 2/1961 | Warren | 60—39.18 |
| 3,002,340 | 10/1961 | Landerman | 60—35.6 |
| 3,040,519 | 6/1962 | Rae | 60—39.17 X |
| 3,187,725 | 6/1965 | Strange | 122—4 |

MARK NEWMAN, *Primary Examiner.*

RALPH D. BLAKESLEE, *Examiner.*

UNITED STATES PATENT OFFICE
CERTIFICATE OF CORRECTION

Patent No. 3,276,203                                      October 4, 1966

Arthur M. Squires

It is hereby certified that error appears in the above numbered patent requiring correction and that the said Letters Patent should read as corrected below.

Column 2, line 11, for "annularly" read -- annually --; column 6, line 65, for "absorbption" read -- absorption --; column 8, lines 26 and 47, for "vis.", each occurrence, read -- viz. --; column 9, line 26, for "650° p.s.i.a." read -- 650 p.s.i.a. --; column 11, line 32, for "$CaO_3.MgO$" read -- $CaCO_3.MgO$ --; line 40, for "exchanges" read -- exchangers --; column 15, line 72, for "asseses" read -- assesses --; column 19, line 8, after "calcium" insert a period; column 21, line 39, for "preferaby" read -- preferably --; column 25, line 60, after "mean" insert -- fuel --; column 27, line 30, after "more" insert -- of --; column 28, line 40, for "57°" read -- 570 --; column 36, line 10, for "depleed" read -- depleted --; column 39, line 64, for "temperautre" read -- temperature --; column 42, line 13, for "condening" read -- condensing --; line 15, for "atomspheric" read -- atmospheric --.

Signed and sealed this 29th day of August 1967.

(SEAL)
Attest:

ERNEST W. SWIDER                                          EDWARD J. BRENNER
Attesting Officer                                       Commissioner of Patents

UNITED STATES PATENT OFFICE
CERTIFICATE OF CORRECTION

Patent No. 3,276,203

October 4, 1966

Arthur M. Squires

It is hereby certified that error appears in the above numbered patent requiring correction and that the said Letters Patent should read as corrected below.

Column 2, line 11, for "annularly" read -- annually --; column 6, line 65, for "absorbption" read -- absorption --; column 8, lines 26 and 47, for "vis.", each occurrence, read -- viz. --; column 9, line 26, for "650° p.s.i.a." read -- 650 p.s.i.a --; column 11, line 32, for "CaO$_3$.MgO" read -- CaCO$_3$.MgO --; line 40, for "exchanges" read -- exchangers --; column 15, line 72, for "asseses" read -- assesses --; column 19, line 8, after "calcium" insert a period; column 21, line 39, for "preferaby" read -- preferably --; column 25, line 60, after "mean" insert -- fuel --; column 27, line 30, after "more" insert -- of --; column 28, line 40, for "57°" read -- 570 --; column 36, line 10, for "depleed" read -- depleted --; column 39, line 64, for "temperautre" read -- temperature --; column 42, line 13, for "condening" read -- condensing --; line 15, for "atomspheric" read -- atmospheric --.

Signed and sealed this 29th day of August 1967.

(SEAL)
Attest:

ERNEST W. SWIDER
Attesting Officer

EDWARD J. BRENNER
Commissioner of Patents